(12) United States Patent
Kim et al.

(10) Patent No.: US 10,673,605 B2
(45) Date of Patent: Jun. 2, 2020

(54) SEMI-STATIC AND DYNAMIC TDD CONFIGURATION FOR 5G-NR

(71) Applicant: Apple Inc., Cupertino, CA (US)

(72) Inventors: Yuchul Kim, Santa Clara, CA (US); Wei Zeng, San Diego, CA (US); Xiangying Yang, Cupertino, CA (US); Dawei Zhang, Saratoga, CA (US)

(73) Assignee: Apple Inc., Cupertino, CA (US)

(*) Notice: Subject to any disclaimer, the term of this patent is extended or adjusted under 35 U.S.C. 154(b) by 8 days.

(21) Appl. No.: 15/950,368

(22) Filed: Apr. 11, 2018

(65) Prior Publication Data

US 2018/0367289 A1 Dec. 20, 2018

Related U.S. Application Data

(60) Provisional application No. 62/519,898, filed on Jun. 15, 2017, provisional application No. 62/556,868, filed on Sep. 11, 2017.

(51) Int. Cl.
*H04L 5/14* (2006.01)
*H04L 5/00* (2006.01)
*H04W 72/04* (2009.01)

(52) U.S. Cl.
CPC .............. *H04L 5/14* (2013.01); *H04L 5/0078* (2013.01); *H04L 5/0092* (2013.01);
(Continued)

(58) Field of Classification Search
CPC ....... H04L 5/14; H04L 5/0078; H04L 5/0094; H04L 5/0096; H04L 5/1469; H04L 5/0092; H04W 72/0453; H04W 72/0446
See application file for complete search history.

(56) References Cited

U.S. PATENT DOCUMENTS

| 4,924,236 A | 5/1990 | Schuss |
| 9,532,369 B2 | 12/2016 | Susitaival et al. |

(Continued)

FOREIGN PATENT DOCUMENTS

| EP | 0 279 050 A1 | 12/1987 |
| EP | 1 248 479 A2 | 9/2002 |

(Continued)

OTHER PUBLICATIONS

Zhang, et al.; "TDD Single Tx Switched UL Solution"; filed Apr. 14, 2019, 61 pages.

(Continued)

*Primary Examiner* — Jianye Wu
(74) *Attorney, Agent, or Firm* — Kowert, Hood, Munyon, Rankin & Goetzel, P.C.

(57) ABSTRACT

TDD configuration may be dynamically and/or semi-statically signaled to user equipment devices by a base station. Semi-static TDD configuration may include: an initial portion for downlink transmission; a flexible portion; and a terminal portion for uplink transmission. TDD structure of the flexible portion may be determined later by transmission of dynamic physical layer configuration information such as downlink control information (DCI) and/or slot format indicator (SFI). (The SFI may be included in a group common PDCCH of a slot.) The downlink portion and/or the uplink portion may include subsets whose nominal transmit direction is subject to override by transmission of dynamic physical layer configuration information.

20 Claims, 45 Drawing Sheets

(52) U.S. Cl.
CPC .......... *H04L 5/0094* (2013.01); *H04L 5/0096* (2013.01); *H04L 5/1469* (2013.01); *H04W 72/0446* (2013.01); *H04W 72/0453* (2013.01)

(56) References Cited

U.S. PATENT DOCUMENTS

| | | | |
|---|---|---|---|
| 9,723,626 B2* | 8/2017 | Golitschek Edler Von Elbwart | ............... H04W 48/16 |
| 2009/0274078 A1 | 11/2009 | Zhao | |
| 2015/0358998 A1* | 12/2015 | Golitschek Edler Von Elbwart | ............... H04W 48/16 370/280 |
| 2015/0372798 A1 | 12/2015 | Zhao | |
| 2017/0332359 A1 | 11/2017 | Tsai et al. | |
| 2018/0167965 A1* | 6/2018 | Wang | ................ H04L 1/0006 |
| 2018/0309513 A1 | 10/2018 | Kim | |

FOREIGN PATENT DOCUMENTS

| | | | | |
|---|---|---|---|---|
| EP | 2 955 966 A1 | | 12/2015 | |
| EP | 2955966 A1 | * | 12/2015 | ............... H04L 5/14 |
| EP | 3 171 561 A1 | | 5/2017 | |
| EP | 3 185 361 A1 | | 6/2017 | |
| WO | WO 2016/003173 A1 | | 1/2016 | |
| WO | WO 2017/032408 | | 3/2017 | |
| WO | WO 2017/035300 | | 3/2017 | |
| WO | WO 2017/166195 A1 | | 10/2017 | |

OTHER PUBLICATIONS

International Search Report and Written Opinion, Application No. PCT/US2018/028684, dated Jul. 17, 2018, 14 pages.
Written Opinion, Application No. PCT/US2018/028684, dated Apr. 1, 2019, 11 pages.
Intel Corporation: "Group Common PDCCH"; R1-1702219; 3GPP Draft; 3rd Generation Partnership Project (3GPP), Mobile Competence Centre, 650, Route Des Lucioles, F-06921 Sophia-Antipolis Cedex, France; vol. RAN WG1, No. Athens, Greece: Feb. 12, 2017; four pages.
CMCC; "Discussion on semi-static TDD configurations"; 3GPP Draft; RI-1703410; 3rd Generation Partnership Project (3GPP); vol. RAN WG1, No. Athens, Greece; Feb. 12, 2017; four pages.
CMCC; "Discussion on the semi-static DL and UL transmission"; 3GPP Draft; RI-1708394; 3rd Generation Partnership Project (3GPP); vol. RAN WG1, No. Hangzhou; May 14, 2017; three pages.
International Search Report and Written Opinion, Application No. PCT/US2018/033778, dated Oct. 4, 2018, 14 pages.

\* cited by examiner

*LTE TDD Configurations*

| TDD Conf | TTI Index | | | | | | | | | | UL:DL:S |
|---|---|---|---|---|---|---|---|---|---|---|---|
| | 0 | 1 | 2 | 3 | 4 | 5 | 6 | 7 | 8 | 9 | |
| 0 | D | S | U | U | U | D | S | U | U | U | 6:2:2 |
| 1 | D | S | U | U | D | D | S | U | U | D | 4:5:2 |
| 2 | D | S | U | D | D | D | S | U | D | D | 2:6:2 |
| 3 | D | S | U | U | U | D | D | D | D | D | 3:6:1 |
| 4 | D | S | U | U | D | D | D | D | D | D | 2:7:1 |
| 5 | D | S | U | D | D | D | D | D | D | D | 1:8:1 |
| 6 | D | S | U | U | U | D | S | U | U | D | 5:3:2 |

Special Subframe Format
(Unit: OFDM Symbol in SCS=15kHz)

| Format | Normal CP | | | Extended CP | | |
|---|---|---|---|---|---|---|
| | DwPTS | GP | UpPTS | DwPTS | GP | UpPTS |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | - | - | - |
| 8 | 11 | 1 | 2 | - | - | - |

FIG. 5C

| SS Format | OFDM Symbol Index (15kHz) Slot w/ Normal CP | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | ■ | ■ | ■ | | | | | | | | | | | ■ |
| 1 | ■ | ■ | ■ | ■ | ■ | ■ | ■ | ■ | ■ | | | | | ■ |
| 2 | ■ | ■ | ■ | ■ | ■ | ■ | ■ | ■ | ■ | ■ | ■ | | | ■ |
| 3 | ■ | ■ | ■ | | ■ | ■ | ■ | ■ | ■ | ■ | | | | ■ |
| 4 | ■ | ■ | ■ | ■ | ■ | ■ | ■ | ■ | ■ | ■ | ■ | ■ | | ■ |
| 5 | ■ | ■ | ■ | ■ | ■ | ■ | ■ | ■ | | ■ | | | ■ | ■ |
| 6 | ■ | ■ | ■ | ■ | ■ | ■ | ■ | ■ | ■ | ■ | | | ■ | ■ |
| 7 | ■ | ■ | ■ | ■ | ■ | ■ | ■ | ■ | ■ | ■ | | | ■ | ■ |
| 8 | ■ | ■ | ■ | | | | | | | ■ | ■ | | | ■ |

*FIG. 5D*

UL Reference Configuration: 0 | D | S | U | U | U | D | S | U | U | U |

DL Reference Configuration: 5 | D | S | U | D | D | D | D | D | D | D |

FIG. 6

Current Configurations Supported
0,1,2,3,4,5

Effective eIMTA
Frame Structure

| TTI Index | | | | | | | | | | |
|---|---|---|---|---|---|---|---|---|---|---|
| 0 | 1 | 2 | 3 | 4 | 5 | 6 | 7 | 8 | 9 |
| D | S | U | F | F | D | S/D | F | F | F |

FIG. 7

| Format Index | Type | NR-PDCCH |
|---|---|---|

| 4 | DL(-only) | Y | SFI indicates DL with PDCCH |
| 5 | DL-centric | Y | SFI indicates DL with PDCCH and short PUCCH with one OS |
| 5a | DL-centric-a | Y | SFI indicates DL with PDCCH and short PUCCH with two OS |
| 6 | DL(-only) | N | SFI indicates DL without PDCCH |
| 7 | DL-centric | N | SFI indicates DL without PDCCH and short PUCCH with one OS |
| 7a | DL-centric-a | N | SFI indicates DL without PDCCH and short PUCCH with two OS |

*FIG. 10*

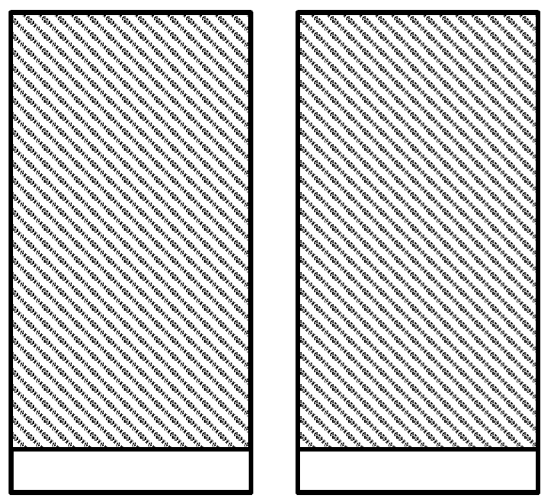
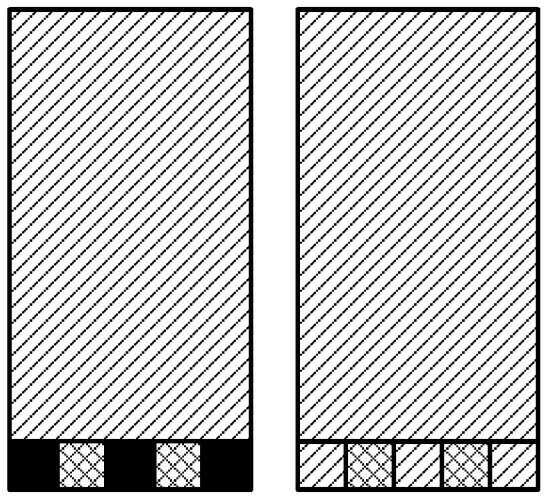
FIG. 16

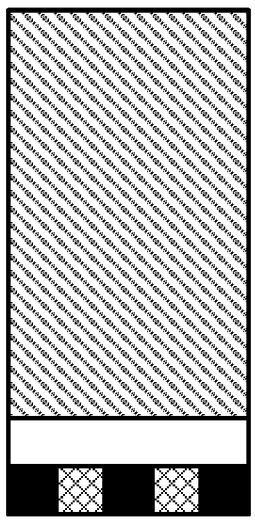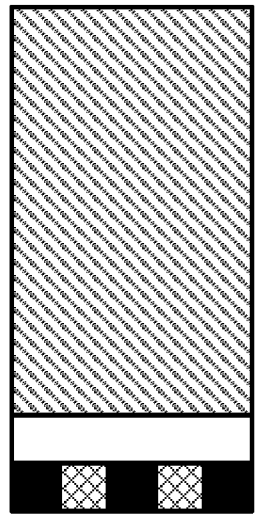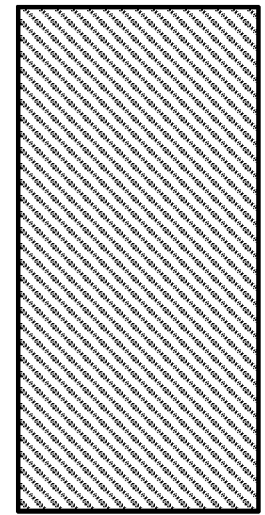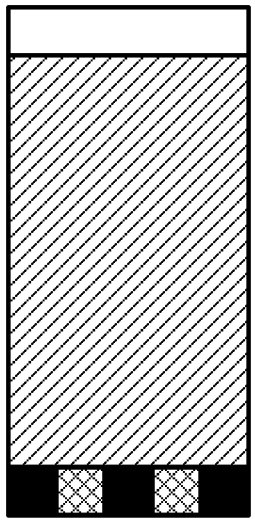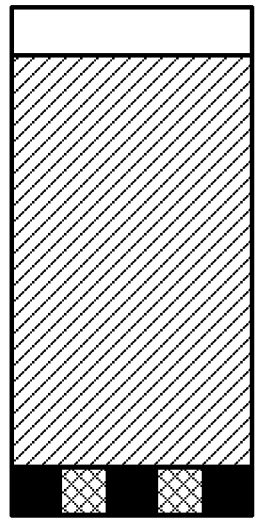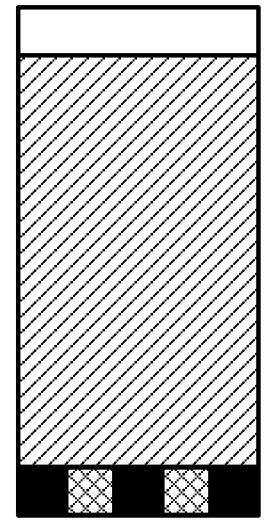
FIG. 17  FIG. 18  FIG. 19

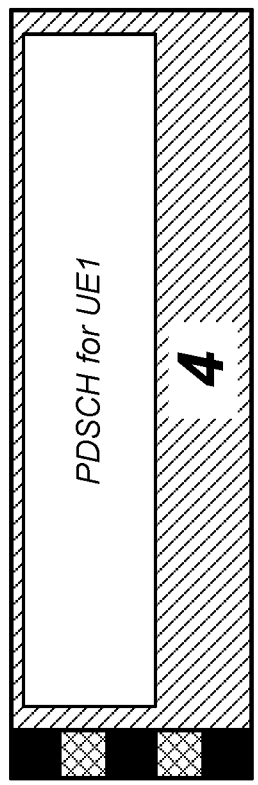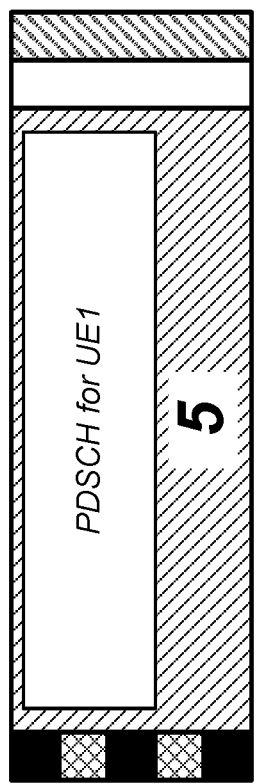
FIG. 23
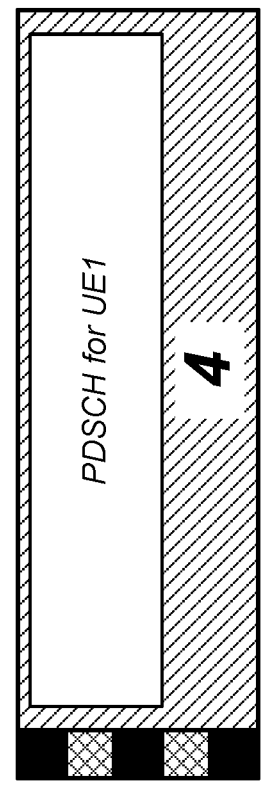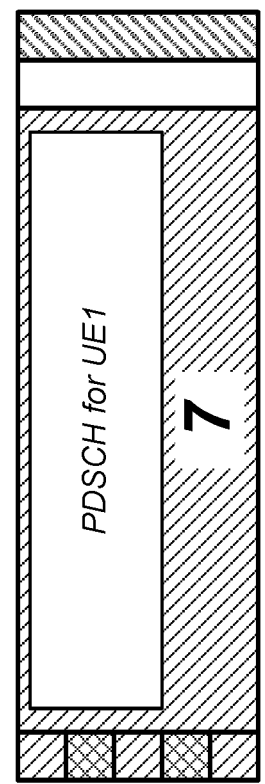
FIG. 24

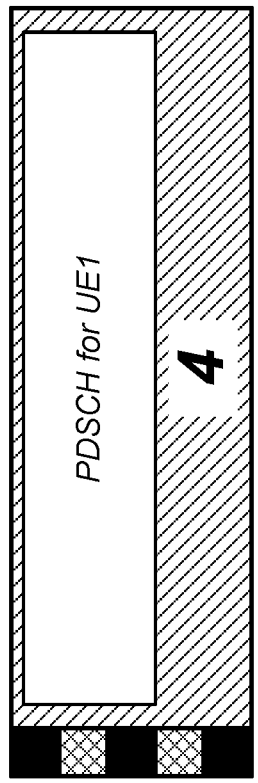
FIG. 25
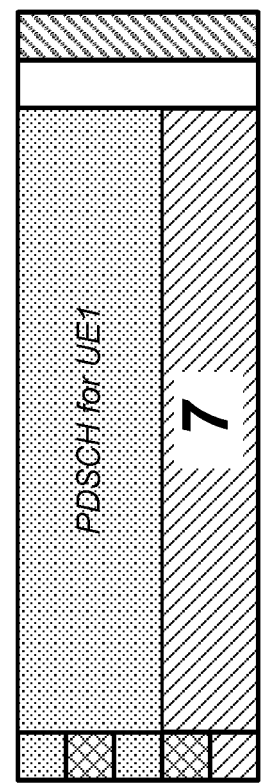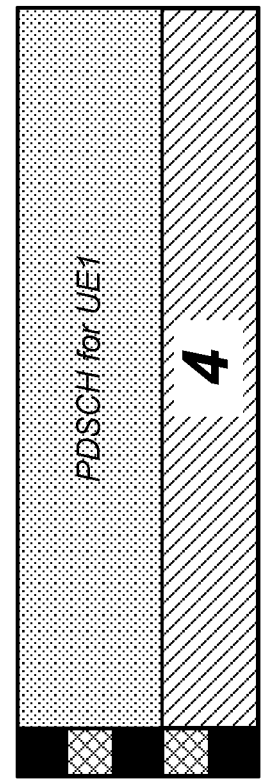
FIG. 26

2900

> Transmit a first slot format indicator (SFI) within a first slot of a radio frame, wherein the first SFI indicates a first transmission direction for at least a first portion of the first slot, wherein the first transmit direction is either uplink transmission or downlink transmission
> 2910

> Receive a first slot format indicator (SFI) from a first slot of a radio frame, wherein the first SFI indicates a first transmission direction for at least a first portion of the first slot, wherein the first transmit direction is either uplink transmission or downlink transmission, wherein the SFI is included in a group common PDCCH of a PDCCH region of the first slot, wherein the PDCCH region spans the first N symbol durations of the first slot, wherein N is greater than or equal to one.
> 3010

FIG. 30

| TTI Index | | | | | | | | | | |
|---|---|---|---|---|---|---|---|---|---|---|
| TDD Config | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 1 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
*FIG 32A*
| Shifted TDD Configuration with Ending UL Slot | | | | | | | | | | Shift |
|---|---|---|---|---|---|---|---|---|---|---|
| Slot Index | | | | | | | | | | |
| 0 | 1 | 2 | 3 | 4 | 5 | 6 | 7 | 8 | 9 | |
| D | S | U | U | U | D | S | U | U | U | 0 |
| D | D | S | U | U | D | D | S | U | U | 1 |
| D | D | D | S | U | D | D | D | S | U | 2 |
| D | D | D | D | D | D | S | U | U | U | 5 |
| D | D | D | D | D | D | D | S | U | U | 6 |
| D | D | D | D | D | D | D | D | S | U | 7 |
*FIG. 32B*
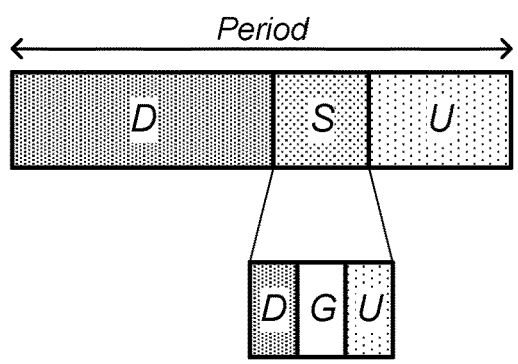
*FIG. 32C*

| NR UL/DL Transmission Direction Configuration with UL Ending Slot (SCS-15kHz) | | | | | | | | | | | Period (ms) | DL Length (Slot, Symbol) | UL Length (Slot, Symbol) | F Length (Slot, Symbol) | Shift to Match with LTE TDD Configuration (ms) |
|---|---|---|---|---|---|---|---|---|---|---|---|---|---|---|---|
| 0 | 1 | 2 | 3 | 4 | 5 | 6 | 7 | 8 | 9 | | | | | | |
| D | S | U | U | U | | | | | | 5 | 1,x | 3,z | 0,y | 0 |
| D | D | S | U | U | | | | | | 5 | 2,x | 2,z | 0,y | 1 |
| D | D | D | S | U | | | | | | 5 | 3,x | 1,z | 0,y | 2 |
| D | D | D | D | D | D | S | U | U | U | 10 | 6,x | 3,z | 0,y | 5 |
| D | D | D | D | D | D | D | S | U | U | 10 | 7,x | 2,z | 0,y | 6 |
| D | D | D | D | D | D | D | D | S | U | 10 | 8,x | 1,z | 0,y | 7 |

*FIG. 33*

| SCS | \multicolumn{7}{c}{Period to by supported} | | | | | | |
|---|---|---|---|---|---|---|---|
| | 10 ms | 5 ms | 2 ms | 1 ms | 0.5 ms | 0.25 ms | 0.125 ms |
| 15kHz | ✓ (10 slots) | ✓ (5 slots) | ✓ (2 slots) | ✓ (1 slot) | - | - | - |
| 30kHz | ✓ (20) | ✓ (10) | ✓ (4 slots) | ✓ (2) | ✓ (1 slot) | - | - |
| 60kHz | ✓ (40) | ✓ (20) | ✓ (8) | ✓ (4) | ✓ (2) | ✓ (1 slot) | - |
| 120kHz | ✓ (80) | ✓ (40) | ✓ (16) | ✓ (8) | ✓ (4) | ✓ (2) | ✓ (1 slot) |
| 240kHz | ✓ (160) | ✓ (80) | ✓ (32) | ✓ (16) | ✓ (8) | ✓ (4) | ✓ (2) |

FIG. 38

| Cell Size | # of OS (15kHz) | # of OS (30kHz) | # of OS (60kHz) | # of OS (120kHz) | Length in Sec | UB of Max* Cell Radius (=C*Length/2) |
|---|---|---|---|---|---|---|
| Small Cell ↕ Large Cell | | | | 1 | 0.008925ms | 1.25km |
| | | 1 | 1 | 2 | 0.01785ms | 2.5km |
| | 1 | 2 | 2 | 4 | 0.0357ms | 5km |
| | 2 | 4 | 4 | 8 | 0.0714ms | 10km |
| | 3 | 6 | 8 | 16 | 0.1428ms | 21km |
| | 4 | 8 | 12 | 24 | 0.2143ms | 32km |
| | 9 | 18 | 16 | 32 | 0.2857ms | 42km |
| | 10 | 20 | 36 | 72 | 0.6428ms | 96km |
| | | | 40 | 80 | 0.714ms | 107km |

☐ Supported in LTE

Max*: DL-to-UL switching time is assumed to be zero.
UB: Upper Bound
OS: OFDM Symbol

FIG. 39

NR Configurations for Coexistence with LTE

| TDD Configuration | 0 | 1 | 2 | 3 | 4 | 5 | 6 | 7 | 8 | 9 | Shift | Period |
|---|---|---|---|---|---|---|---|---|---|---|---|---|
| 0 | D | S | U | U | U |   |   |   |   |   | 0 | 5ms |
| 1 | D | D | S | U | U |   |   |   |   |   | 1 | 5ms |
| 2 | D | D | D | S | U |   |   |   |   |   | 2 | 5ms |
| 3 | D | D | D | D | D | D | S | U | U | U | 5 | 10ms |
| 4 | D | D | D | D | D | D | D | S | U | U | 6 | 10ms |
| 5 | D | D | D | D | D | D | D | D | S | U | 7 | 10ms |

NR (15kHz)

| TDD Configuration | Slot Number | | | | | | | | | | Shift | Period |
|---|---|---|---|---|---|---|---|---|---|---|---|---|
| | 0 | 1 | 2 | 3 | 4 | 5 | 6 | 7 | 8 | 9 | | |
| 6 | D | F | F | F | U | | | | | | 0,1,2 | 5ms |
| 7 | D | D | D | D | D | D | F | F | F | U | 5,6,7 | 10ms |

FIG. 42

NR (15kHz)

| TDD Configuration | Slot Number | | | | | | | | | | Shift | Period |
|---|---|---|---|---|---|---|---|---|---|---|---|---|
| | 0 | 1 | 2 | 3 | 4 | 5 | 6 | 7 | 8 | 9 | | |
| 8 | D | F | F | F | F | F | F | F | F | U | - | 10ms |
| 9 | D | F | F | F | U | | | | | | | 5ms |
| 10 | F | | | | | | | | | | | 1ms |

NR (30kHz)

| TDD Configuration | Slot Number | | | | | | | | | | | | | | | | | | | | Shift | Period |
|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | | |
| 11 | D | F | F | F | F | F | F | F | F | F | F | F | F | F | F | F | F | F | F | U | - | 10ms |
| 12 | D | F | F | F | F | F | F | F | F | U | | | | | | | | | | | | 5ms |
| 13 | D | F | | | | | | | | | | | | | | | | | | | | 1ms |
| 14 | F | | | | | | | | | | | | | | | | | | | | | 0.5ms |

FIG. 43

| TDD Configuration | Slot Number | | | | | | | | | | Period |
|---|---|---|---|---|---|---|---|---|---|---|---|
| | 0 | 1 | 2 | 3 | 4 | 5 | 6 | 7 | 8 | 9 | |
| 6 | D fixed | D non-fixed | D non-fixed | U non-fixed | U fixed | | | | | | 5ms |
| 7 | D fixed | D non-fixed | D non-fixed | D non-fixed | D non-fixed | D non-fixed | U fixed | U fixed | U fixed | U fixed | 10ms |

NR (15kHz)

Receive first TDD configuration information, wherein the first TDD configuration information includes parameters that define a semi-static TDD configuration for a frame structure, wherein the parameters include:
  a frame length specifying a duration of the frame structure;
  a first length specifying a duration of a downlink portion of the frame structure, wherein the downlink portion occupies an initial position within the frame structure;
  a second length specifying a duration of an uplink portion of the frame structure, wherein the uplink portion occupies a terminal position within the frame structure; wherein an intermediate portion of the frame structure occurs after the downlink portion and before the uplink portion, wherein TDD structure of the intermediate portion is not determined by the first TDD configuration information.
4710

Receive a TDD configuration index, wherein the TDD configuration index has a value selected from a predefined set of values, wherein the values of the predefined set identify respective semi-static TDD configurations, wherein a first subset of the values of the predefined set identify semi-static TDD configurations that agree up to time shift with respective TDD configurations of 3GPP LTE.
4810

Receive physical layer configuration information from a first of a plurality of slots in a current frame, wherein the physical layer configuration information dynamically determines TDD status (e.g., transfer direction) for at least a portion of an indicated slot of the current frame, wherein the indicated slot is the first slot or a second slot occurring after the first slot in the current frame.
4910

FIG. 49

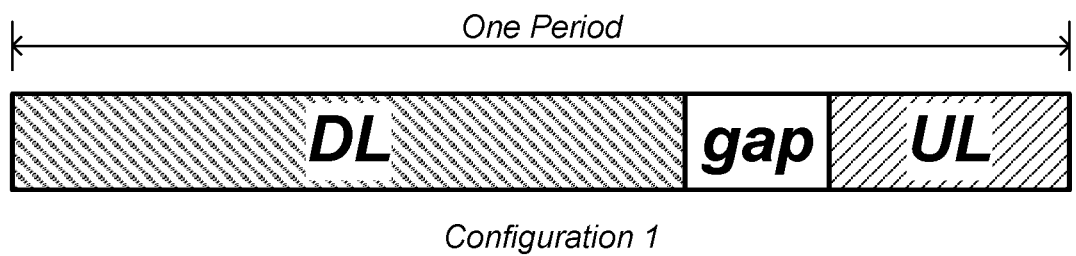
Configuration 1
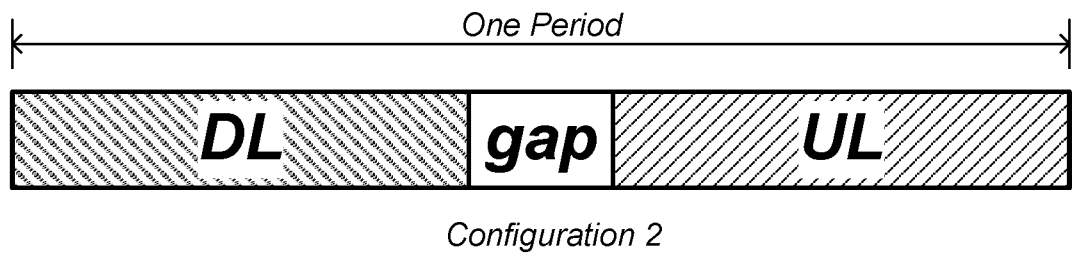
Configuration 2
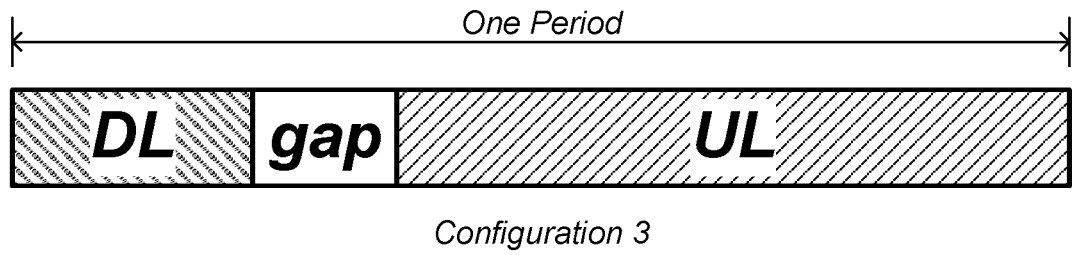
Configuration 3
FIG. 50

5600

Periodically transmit a slot format indicator according to a transmission period, wherein each transmission of the slot format indicator indicates a corresponding dynamic assignment of one or more transmission directions for one or more slots in a corresponding frame with length equal to the transmission period
5610

For a current frame corresponding to a current transmission of the slot format indicator, perform TDD operation for the one or more slots of the current frame based on the dynamic assignment indicated by the current transmission of the slot format indicator
5620

Receive downlink control information that assigns a time-frequency resource set to the user equipment device and indicates a transmission direction for the time-frequency resource set, wherein the indicated transmission direction overrides flexible status indicated for the time-frequency resource set by a previously received slot format indicator
5710

Perform transmission or reception in the time-frequency resource set according to the indicated transmission direction
5720

FIG. 57

SEMI-STATIC AND DYNAMIC TDD CONFIGURATION FOR 5G-NR

PRIORITY CLAIM

This application claims priority to U.S. provisional application Ser. No. 62/519,898 titled "Semi-Static and Dynamic TDD Configuration for 5G-NR," filed Jun. 15, 2017, and U.S. provisional application Ser. No. 62/556,868 titled "Semi-Static and Dynamic TDD Configuration for 5G-NR," filed Sep. 11, 2017, which are both hereby incorporated by reference in their entirety as though fully and completely set forth herein.

TECHNICAL FIELD

The present application relates to wireless communication, and more particularly, to mechanisms for flexibly signaling the transmission format of slots in a radio frame.

DESCRIPTION OF THE RELATED ART

There exists a need for mechanisms of signaling to UEs the time division duplex (TDD) structure of slots or groups of slots in a radio frame.

SUMMARY

Embodiments are presented herein of apparatuses, systems, and methods for utilizing a flexible slot indicator in wireless communication.

In one set of embodiments, a method for operating a base station may include the following operations.

The method may include transmitting, by a radio of the base station, a first slot format indicator (SFI) within a first slot of a radio frame, wherein the first SFI may indicate a first transmission direction for at least a first portion of the first slot, wherein the first transmit direction is either uplink transmission or downlink transmission. The SFI may be included in a group common PDCCH of a PDCCH region of the first slot, wherein the PDCCH region spans the first N symbol durations of the first slot, wherein N is greater than or equal to one. In some embodiments, N is equal to one. In some embodiments, the first SFI indicates that the PDCCH region includes at least one PDCCH. In some embodiments, the first SFI indicates that the PDCCH region does not include a PDCCH.

In some embodiments, the first SFI also indicates a second transmit direction for a second portion of the first slot, wherein the second transmit direction is a direction opposite to the first transmit direction. In some embodiments, the first SFI also indicates a second transmit direction for at least a portion of a second slot, wherein the second slot follows immediately after the first slot, wherein the second transmit direction is a direction opposite to the first transmit direction. In some embodiments, the first transmit direction is uplink transmission, wherein the first SFI indicates a slot aggregation level for uplink transmission. In some embodiments, the first transmit direction is downlink transmission, wherein the first SFI indicates a slot aggregation level for downlink transmission.

In some embodiments, the SFI can cancel RRC configured periodic signals tx/rx such as CSI-RS measurements or SRS transmission.

In some embodiments, the SFI could be divided into two parts (transmission direction and aggregation level), and encoded separately.

In some embodiments, the first transmit direction is downlink transmission, wherein an extent of slot aggregation for the downlink transmission is indicated in a DCI of a radio frame containing the first slot.

In some embodiments, the method also includes transmitting, by the radio, a second SFI in a second slot of the radio frame, wherein the second slot follows immediately after the first slot, wherein the second SFI indicates a second transmit direction for at least a portion of the second slot, wherein the second transmit direction is either uplink transmission or downlink transmission, wherein the second SFI is included in a group common PDCCH of a PDCCH region of the second slot.

In some embodiments, the second SFI indicates that the PDCCH region of the second slot does not include a PDCCH.

In some embodiments, the method also includes transmitting, by the radio, a second SFI in a second slot of the radio frame, wherein the second SFI indicates that at least a portion of the second slot is blank, wherein the second SFI is included in a group common PDCCH of a PDCCH region of the second slot.

In some embodiments, the method also includes transmitting, by the radio, a second SFI in a second slot of the radio frame, wherein the second SFI indicates that at least a portion of the second slot is to be used for a side link (such as UE to UE, or V2X), wherein the second SFI is included in a group common PDCCH of a PDCCH region of the second slot.

In some embodiments, the slots of the radio frame are two or 7 or 14 symbols in length.

In one set of embodiments, a method for operating a user equipment device may include receiving, by a radio of the user equipment device, TDD configuration information, wherein the TDD configuration information includes parameters that define a semi-static TDD configuration for a frame structure. The parameters may include:
  a frame length specifying a duration of the frame structure;
  a first length specifying a duration of a downlink portion of the frame structure, wherein the downlink portion occupies an initial position within the frame structure; and
  a second length specifying a duration of an uplink portion of the frame structure, wherein the uplink portion occupies a terminal position within the frame structure;
An intermediate portion of the frame structure may occur after the downlink portion and before the uplink portion, wherein TDD structure of the intermediate portion is not determined by the TDD configuration information.

In response to receiving the TDD configuration information, the method may include performing TDD operation including: receiving, by the radio, downlink data from within the downlink portion of the frame structure; and transmitting, by the radio, uplink data within the uplink portion of the frame structure.

In some embodiments, the method may also include: receiving one or more physical layer signals (such as SFI and/or DCI) that dynamically determine the TDD structure of the intermediate portion; and performing TDD operation over the intermediate portion based on the dynamically determined TDD structure.

In one set of embodiments, a method for operating a user equipment device may include receiving, by a radio of the user equipment device, a TDD configuration index. The TDD configuration index may have a value selected from a predefined set of values. The values of the predefined set may identify respective semi-static TDD configurations. A first subset of the values of the predefined set may identify semi-static TDD configurations that agree up to time shift (cyclic or non-cyclic) with respective TDD configurations of 3GPP LTE, e.g., as variously described below.

In some embodiments, the predefined set includes a second subset of values, disjoint from the first subset, wherein, for each value in the second subset, the corresponding semi-static TDD configuration includes: an initial portion including one or more consecutive slots for downlink transfer; a terminal portion including one more consecutive slots for uplink transfer; and an intermediate portion including one or more consecutive slots whose TDD structure is to be dynamically determined by physical layer configuration information.

In one set of embodiments, a method for operating a user equipment device may include receiving, by a radio of the user equipment device, physical layer configuration information from a first of a plurality of slots in a current frame. The physical layer configuration information may dynamically determine TDD status (e.g., transfer direction) for at least a portion of an indicated slot of the current frame, wherein the indicated slot is the first slot or a second slot occurring after the first slot in the current frame.

In some embodiments, the physical layer configuration information may include a slot format indicator, wherein the slot format indicator is included in a group common PDCCH of the first slot.

In some embodiments, the physical layer configuration information includes downlink control information (DCI).

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present embodiments can be obtained when the following detailed description of the preferred embodiment is considered in conjunction with the following drawings.

FIGS. 5C and 5D illustrate exemplary special subframe formats, according to some embodiments;

FIG. 6 illustrates an exemplary UL reference configuration and a DL reference configuration, according to some embodiments;

FIG. 7 illustrates an exemplary effective TDD frame structure resulting from the example of FIG. 6, according to some embodiments;

FIGS. 9 and 10 illustrate exemplary slot formats, according to some embodiments;

FIGS. 11-28 illustrate exemplary slot formats, according to some embodiments;

FIGS. 29 and 30 illustrate exemplary methods for using slot format indicators, according to some embodiments;

FIGS. 32A-C illustrate exemplary TDD configurations that may be made compatible with TDD configurations of LTE, according to some embodiments;

FIG. 33 illustrates an exemplary specialized subframe, according to some embodiments;

FIG. 38 illustrates period-SCS combinations, according to some embodiments;

FIG. 39 illustrates an exemplary table showing a set of supported gap lengths for NR, according to some embodiments;

FIGS. 40-43 illustrate exemplary TDD configurations that may be applicable to NR, according to some embodiments;

FIGS. 44-46 illustrate exemplary formats corresponding to potential overriding of transmit direction, according to some embodiments;

FIGS. 47-49 illustrate exemplary methods for semi-static TDD configuration, according to some embodiments;

FIGS. 50 illustrate exemplary configurations having variable lengths for downlink and uplink, according to some embodiments;

FIGS. 52-60 illustrate exemplary methods for assigning transmission directions, according to various embodiments.

Figure 1:
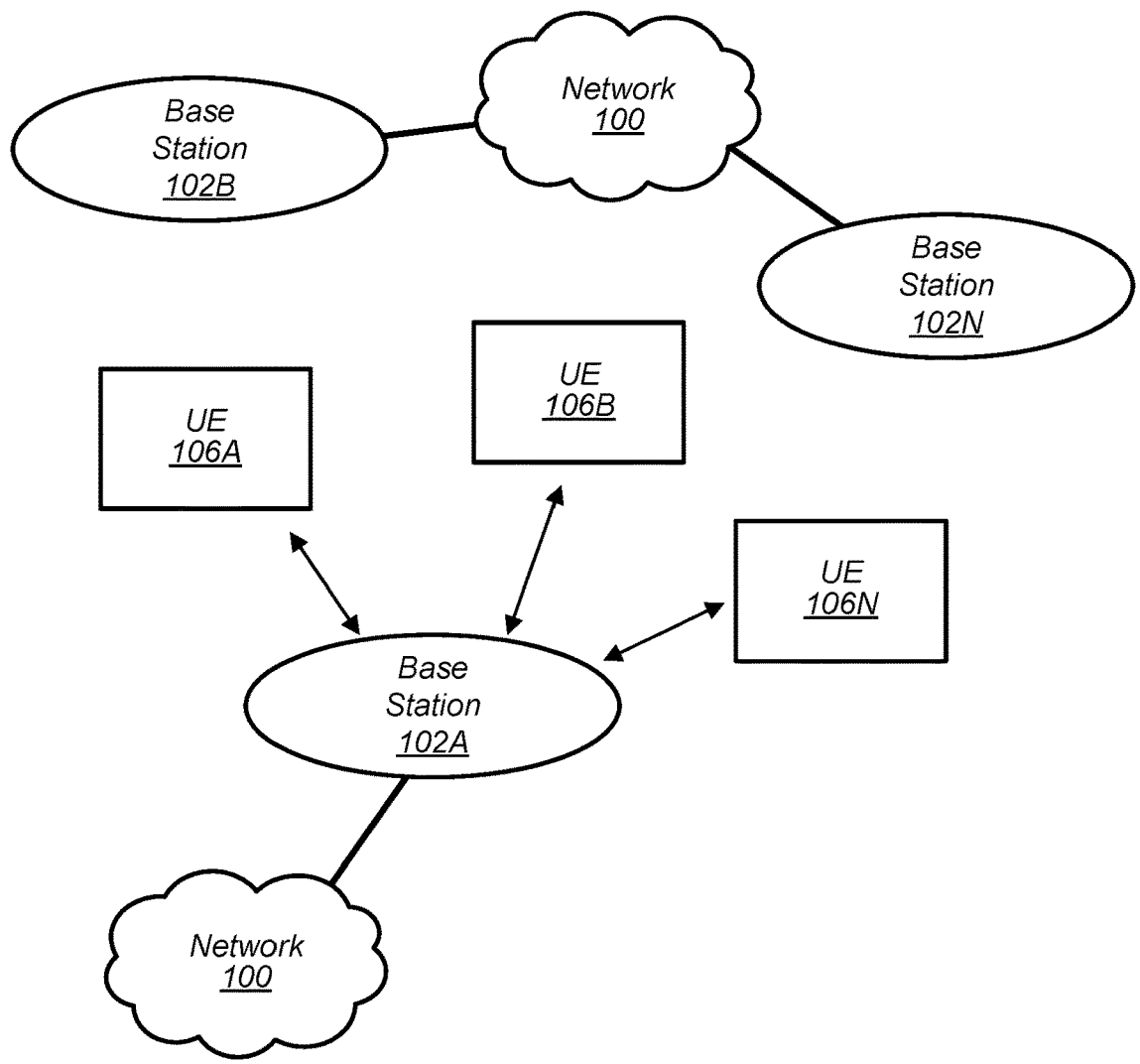
FIG. 1 illustrates an exemplary (and simplified) wireless communication system, according to some embodiments.

While embodiments described herein susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the present embodiments as defined by the appended claims.

DETAILED DESCRIPTION

Acronyms
  ARQ: Automatic Repeat Request
  CSI: Channel State Information

CSI-RS: CSI Reference Signal
DCI: Downlink Control Information
DL: Downlink
gNB: gNodeB
LTE: Long Term Evolution
NW: Network
NR: New Radio
PCFICH: Physical Control Format Indicator Channel
PDCCH: Physical Downlink Control Channel
PDSCH: Physical Downlink Shared Channel
PHICH: Physical Hybrid-ARQ Indicator Channel
PUCCH: Physical Uplink Control Channel
PUSCH: Physical Uplink Shared Channel
RAT: Radio Access Technology
RNTI: Radio Network Temporary Identifier
RRC: Radio Resource Control
SIB: System Information Block.
SIBn: System Information Block Type n
SL: Side Link
SRS: Sounding Reference Signal
SSF: Special Subframe
TDD: Time Division Duplex.
TTI: Transmit Time Interval
UE: User Equipment
UL: Uplink Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
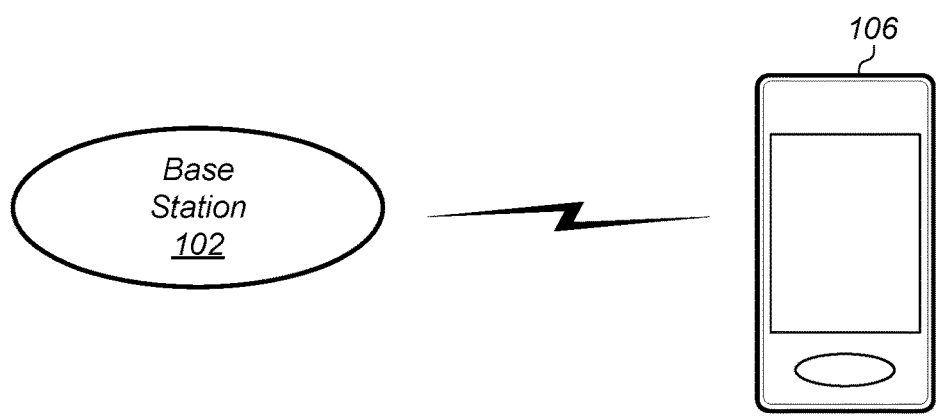
FIG. 2 illustrates an exemplary base station in communication with an exemplary wireless user equipment (UE) device, according to some embodiments.

FIGS. 1 and 2—Communication System

FIG. 1 illustrates an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1xRTT, 1xEV-DO, HRPD, eHRPD), Wi-Fi, WiMAX, New Radio (NR), etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may provide a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1xRTT, 1xEV-DO, HRPD, eHRPD), etc.), NR. The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to one embodiment. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE, 1xRTT, and NR (or LTE or GSM), and separate radios for communicating using each of Wi-Fi and Bluetooth. Other configurations are also possible.

Figure 3:
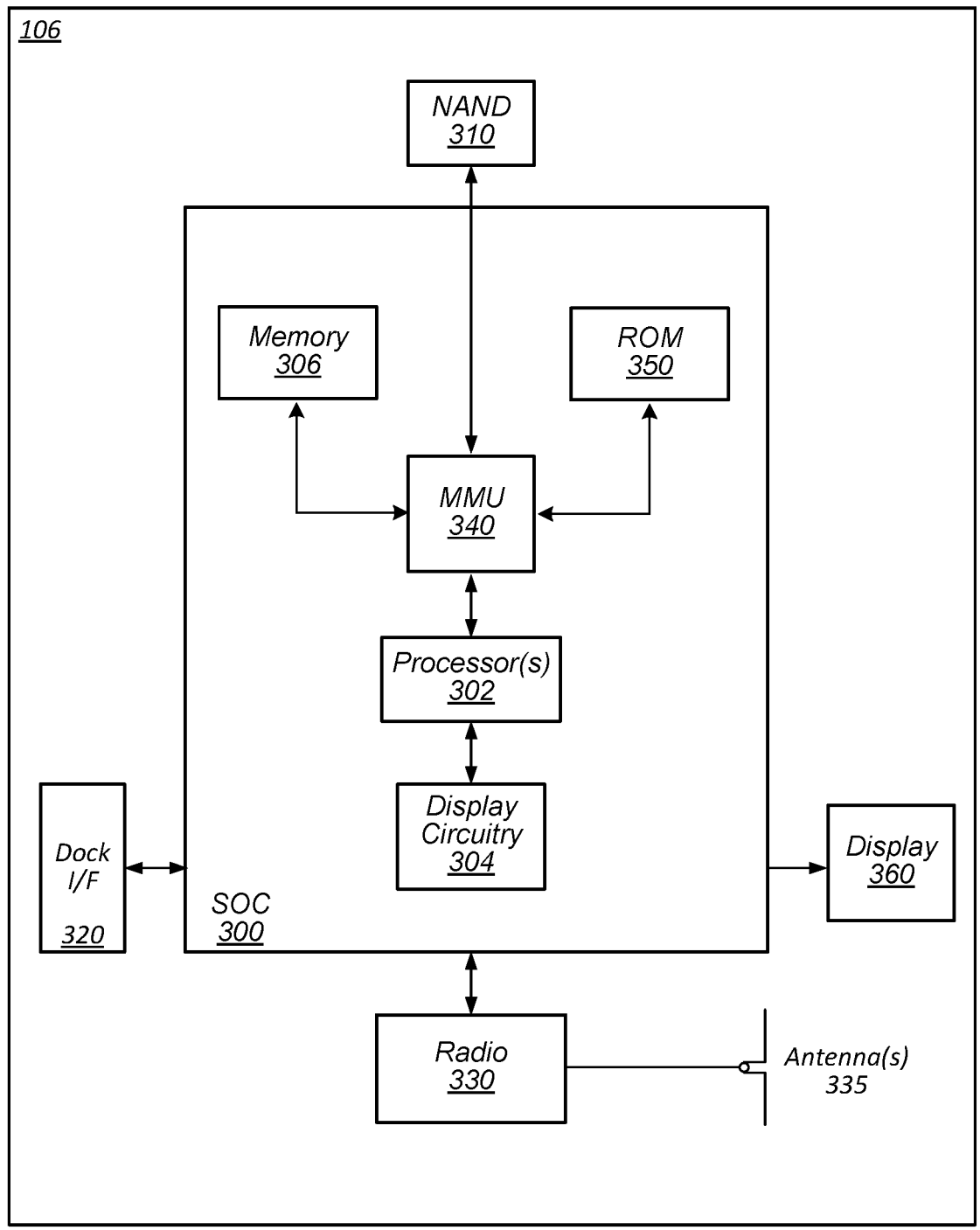
FIG. 3 illustrates an exemplary block diagram of a UE, according to some embodiments.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication standards in some embodiments.

As described further subsequently herein, the UE 106 may include hardware and software components for implementing features relating to the use of the slot format indicator as variously described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
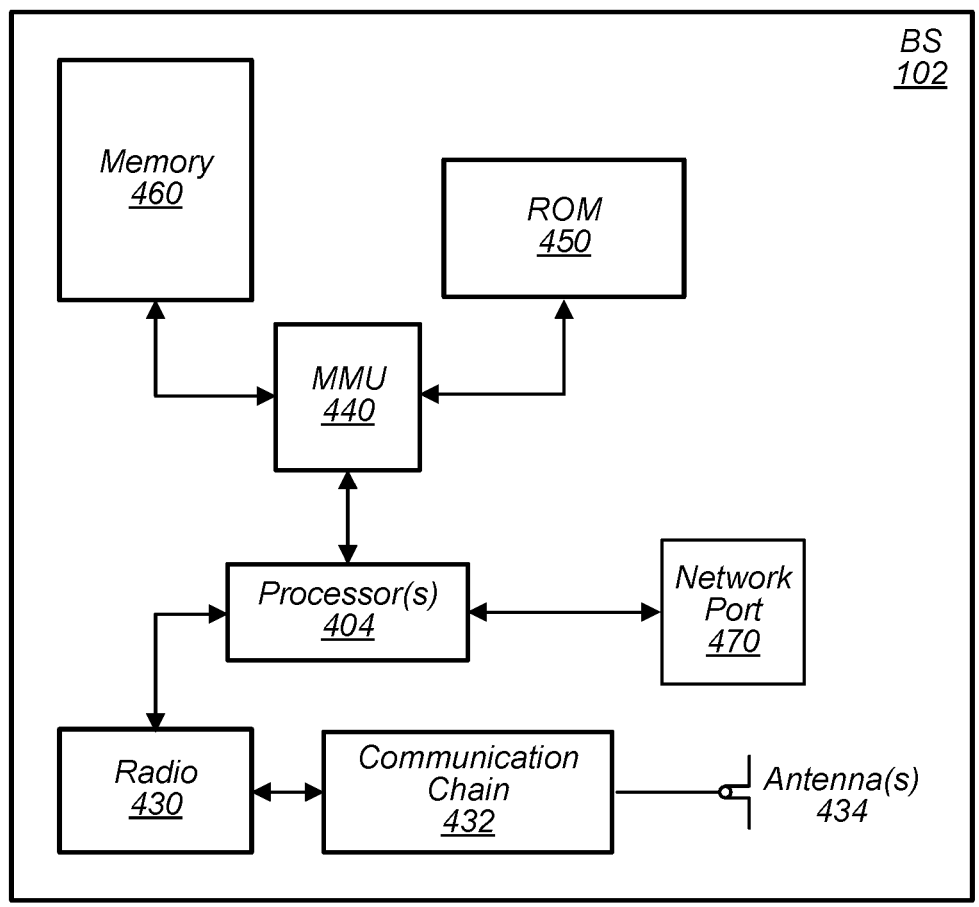
FIG. 4 illustrates an exemplary block diagram of a base station, according to some embodiments.

FIG. 4—Exemplary Block Diagram of a Base Station

FIG. 4 illustrates an exemplary block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, NR, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include a NR radio for performing communication according to NR as well as a Wi-Fi radio for performing communication according to Wi-Fi. In such a case, the base station 102 may be capable of operating as both a NR base station and a Wi-Fi access point. As another possibility, the base station 102 may include a multi-mode radio, which is capable of performing communications according to any of multiple wireless communication technologies (e.g., NR and Wi-Fi; NR and LTE; LTE and CDMA2000; UMTS and GSM; etc.).

As described further subsequently herein, the BS 102 may include hardware and software components for implementing features relating to the use of the slot format indicator as variously described herein.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein.

Group Common PDCCH

Group common PDCCH is a channel carrying information intended for a group of user equipments (UEs). The qualifier "common" does not necessarily imply common per cell.

Potential use cases for the group common PDCCH include:

(1) indicating slot format in dynamic TDD (UL, DL, SL, blank, etc.);
(2) indicating control resource set duration, in which case the UE can determine whether some blind decodings can be skipped;
(3) indicating starting position of downlink data.

The physical channel structure of the group common PDCCH may be realized using a PCFICH like approach. Alternatively, the PDCCH design may be reused.

The network (NW) may configure a UE to monitor the group common PDCCH using RRC signaling. In other words, the network may send RRC signal(s) to a UE to indicated whether the UE is to decode the group common PDCCH or not.

TDD Configuration in LTE

Figures 5A, 5B:
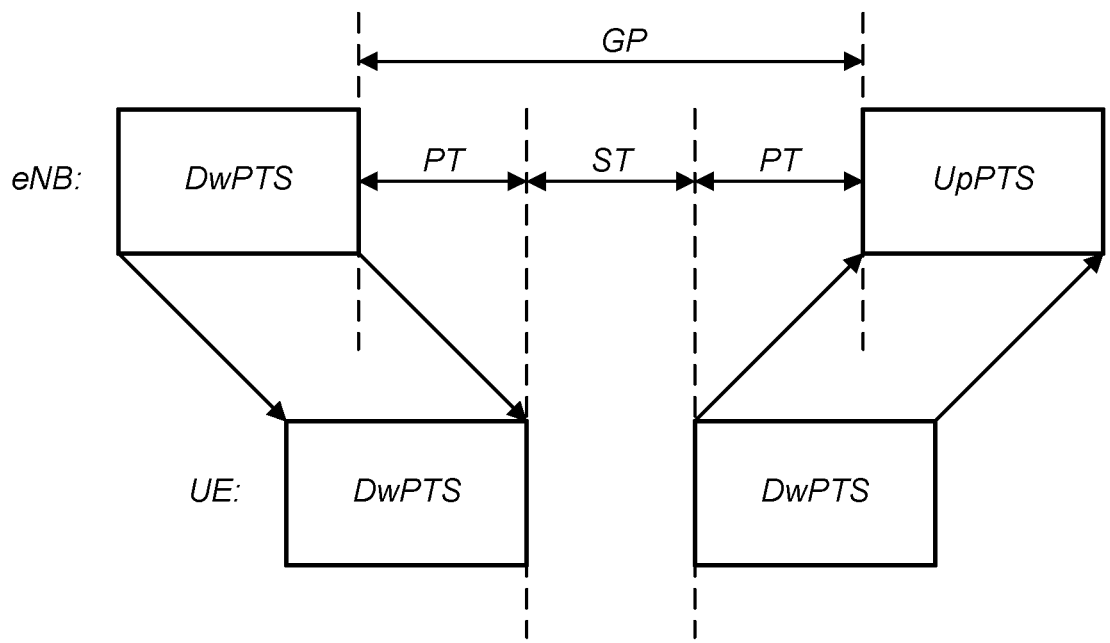
FIG. 5A illustrates exemplary TDD configurations, according to some embodiments.
FIG. 5B illustrates an exemplary special subframe, according to some embodiments.

In LTE Release 8, the TDD configuration is defined to indicate the direction of transmissions in each slot of a radio frame. (A radio frame may be 10 ms in duration.) The TDD configuration is semi-static configuration information and is signaled to UEs through the system information block of Type 1 (denoted SIB1). Seven different TDD configurations were defined, as shown in FIG. 5A. (The symbol D denotes downlink; S denotes special subframe for switching from downlink to uplink; U denotes uplink.)

Special Subframe (SSF)

As shown in FIG. 5B, a special subframe is composed of three parts: DwPTS, GP and UpPTS.

DwPTS is considered as a normal downlink subframe carrying RS, control information and data. (RS is an acronym for Reference Signal.)

GP is a guard period. The guard period is large enough to cover the round trip time (RTT) from the cell and switching time at UE. (In FIG. 5B, PT denotes Propagation Time and ST denotes switching time. It takes time for the UE to switch from reception to transmission.) The length of the guard period determines maximum cell size.

UpPTS may be used for uplink transmission of sounding reference signal (SRS) or random access channel (RACH).

While DwPTS, GP and UpPTS have lengths (in time) that add to a subframe length, the combination of the lengths is configurable among 9 formats. In other words, there are nine possible states for the vector (length DwPTS, length GP, length UpPTS). FIG. 5C is a table illustrating the nine special subframe formats, where a unit corresponds to an OFDM symbol with 15 kHz subcarrier spacing. FIG. 5D illustrates the nine special subframe formats in a more graphical manner.

eIMTA in LTE Release 12 eIMTA is an acronym for "enhanced Interference Mitigation and Traffic Adaptation". In eIMTA, configuration could be changed dynamically through the downlink control information (DCI).

In eIMTA, the TDD configuration in determined as follows. The TDD Frame structure is generated from combining an UL reference configuration and a DL reference configuration. An example of an UL reference configuration and a DL reference configuration are shown in FIG. 6. FIG. 7 shows the effective TDD frame structure resulting from the example of FIG. 6. F denotes a TTI that is either downlink (D) or uplink (U). In eIMTA, only a slot designated with F could be dynamically changed. The current configurations supported with the frame structure of FIG. 7 are 0,1,2,3,4,5.

The uplink reference configuration is semi-statically configured, obtained by the UE from SIB1. The uplink reference configuration is used by non-eIMTA-capable devices, and is known as the "uplink-downlink configuration" in an earlier release (~R11). The uplink reference configuration is an uplink heavy configuration. DL subframes in the uplink reference configuration are guaranteed to be DL: e.g., for transmission of PHICH.

The downlink reference configuration is semi-statically configured, obtained by the UE from dedicated RRC signaling, specific to eIMTA-capable devices. UL subframes in this configuration is guaranteed to be UL: e.g., for HARQ feedback.

The current uplink-downlink configuration determines which subframes of the current frame are uplink and which are downlink. The current uplink-downlink configuration is chosen from among 7 possible configurations and within the limits set by flexible subframes obtained from reference configurations. The current uplink-downlink configuration is broadcasted regularly to follow traffic variation. The current uplink-downlink configuration is broadcasted using DCI format 1C on PDCCH to all eIMTA devices (using eIMTA-RNTI).

Flexible Slot Format Indicator in Dynamic TDD

Figure 8:
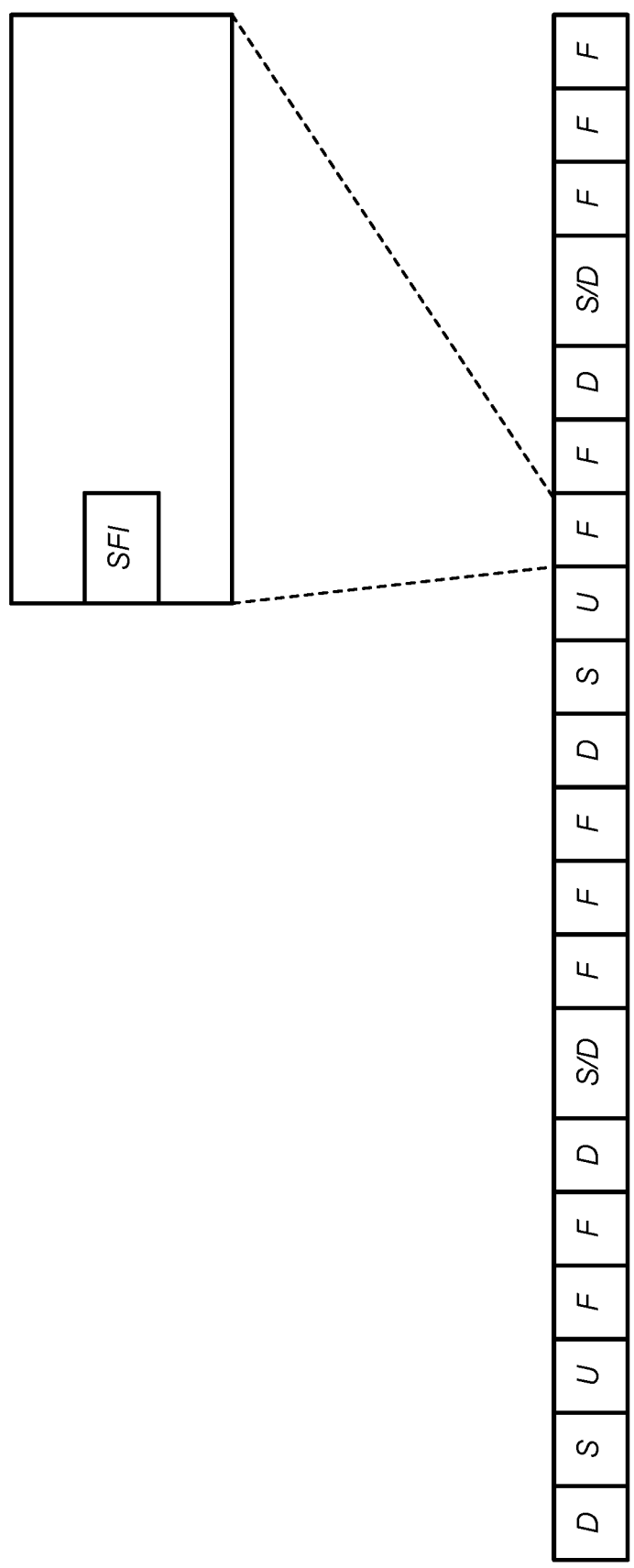
FIG. 8 illustrates an example of a TDD frame structure including slots of each kind, according to some embodiments.

In LTE, a slot may be a downlink slot (D), an uplink slot (U), a special frame slot (S) or a flexible slot (F). FIG. 8 shows an example of a TDD frame structure including slots of each kind. The notation "S/D" indicates that the corresponding slot could be either S or D.

In NR, the slot format indicator (SFI) indicates whether a slot is downlink (DL), uplink (UL), sidelink (SL), blank (reserved), etc. FIG. 8 shows a slot format indicator (SFI) in an initial portion of an F slot. The SFI may override the transmission direction indicated by a current TDD configuration of the frame. For example, if the current TDD configuration indicates that the F slot should be uplink, the SFI may override the transmission direction to downlink. Thus, the SFI provides a dynamic override capability at the granularity of a slot.

In some embodiments, the SFI may be included only in F slots. In other embodiments, an SFI may be included in any of the slots of the frame.

The slot format indicator (SFI) may be included in group common PDCCH. The SFI may signal the slot format at least for the current slot in a dynamic TDD system. In some embodiments, the SFI may signal the slot format for one or more consecutive slots including the current slot.

The SFI is common information delivered to a group of UEs. The SFI may indicate whether the slot is UL, DL, SL, blank(reserved), etc.

The SFI is decodable by group of UEs, e.g., a group of UEs designated by RRC signaling.

In some embodiments, non-served UEs can use the received SFI to avoid unnecessary blind decodings, for power saving.

SFI Encoding Based on Table—SFI for UL

Figure 9:
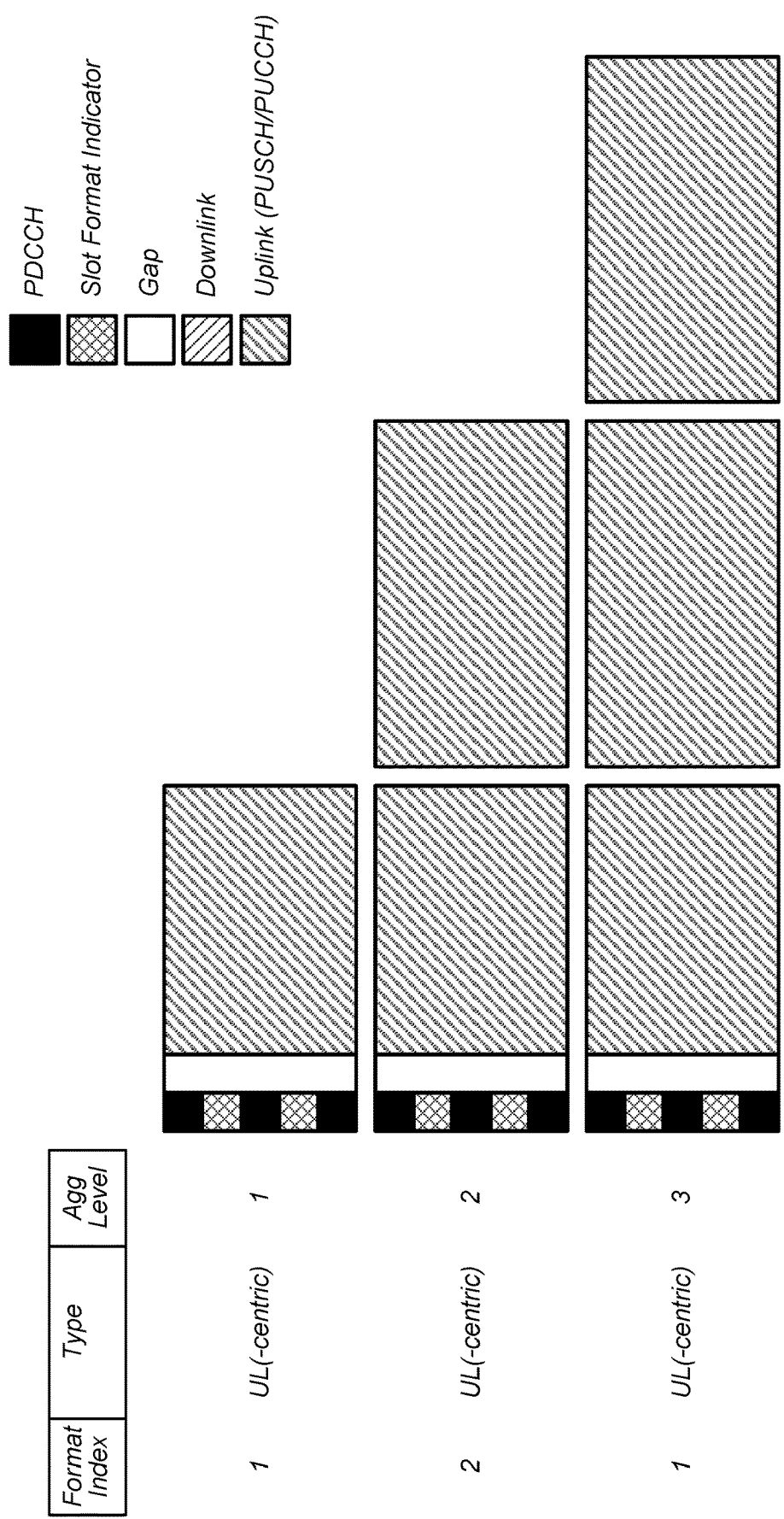

In some embodiments, the SFI may indicate any of the uplink-centric slot formats shown in FIG. 9. These slot formats vary in aggregation level, e.g., the number of slots that are combined together to form a continuous uplink region. The main use cases for these uplink-centric slot formats are PUSCH and/or PUCCH transmission.

UL-centric slots may include PDCCH for transmitting UL grants to UE.

UL aggregation level (AL), e.g., 1,2,3, . . . , may be encoded in SFI.

The SFI may signal UL slot aggregation, and accordingly, no PDCCH is included in any of the following slots.

When UL slot aggregation is indicated, non-served UEs can sleep through the uplink portion of the first slot and through all of the following slot(s). (A UE will determine from the PDCCH of the first slot whether or not it is scheduled in the aggregated set of slots.) For example, when AL=3, the UE can sleep through the uplink portion of the first slot and through all of the second and third slots.

SFI Encoding Based on Table—SFI for DL

In some embodiments, the SFI may indicate any of the downlink-centric formats shown in FIG. 10. These downlink-centric formats are for the current slot, i.e., the slot which contains the SFI. The SFI may be transmitted in every downlink slot. The main use cases for these downlink-centric formats are PDSCH transmission, with and without slot aggregation.

The SFI for DL does not encode aggregation level (AL) since the SFI may be sent in every DL slot, and DL aggregation is signaled UE-specifically in the downlink control information (DCI).

Some of the states of the SFI for DL indicate the presence of PDCCH in the PDCCH region. Other states indicate that PDCCH is not present.

Examples of SFI and DL Slot Aggregation

Figure 11:
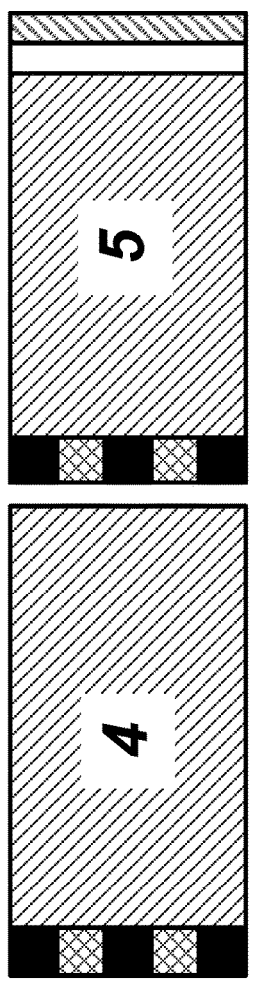

FIG. 11 shows an example of slot aggregation, where additional scheduling in the middle of the aggregation is allowed, by virtue of the PDCCH that is included in the PDCCH region of the second slot. (In some embodiments, the PDCCH region of each slot may span the first OFDM symbol of the slot.) Two slots are aggregated. Some UEs are scheduled with Aggregation Level equal to 2. Furthermore, some UEs can be scheduled in the second slot, by virtue of the PDCCH in the second slot. Acknowledgements for DL data transmissions are sent at the end of second slot.

Figure 12:
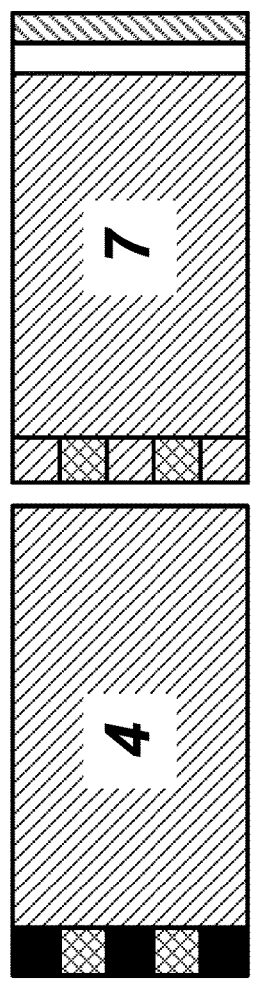
Figure 13:
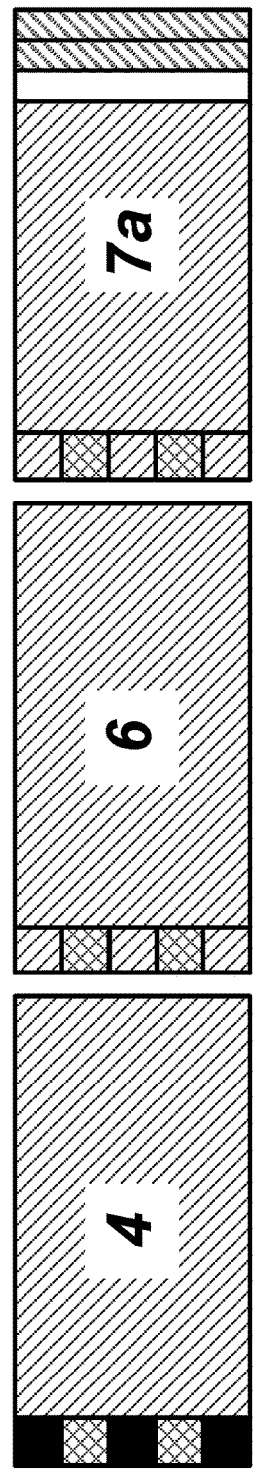

FIGS. 12 and 13 show examples of slot aggregation with no additional scheduling in the middle of the aggregation. FIG. 12 shows an example where two slots are aggregated; FIG. 13 shows an example where three slots are aggregated. All the scheduled UEs are scheduled from the first slot via the PDCCH of the first slot. No UE is scheduled from the second slot (or from any non-initial slot), so there is no PDCCH in the second slot. A non-scheduled UE can avoid making blind decoding attempts in search of PDCCH in the second slot (or in non-initial slots).

SFI for DL (Alternative Approach)

Figure 14A:
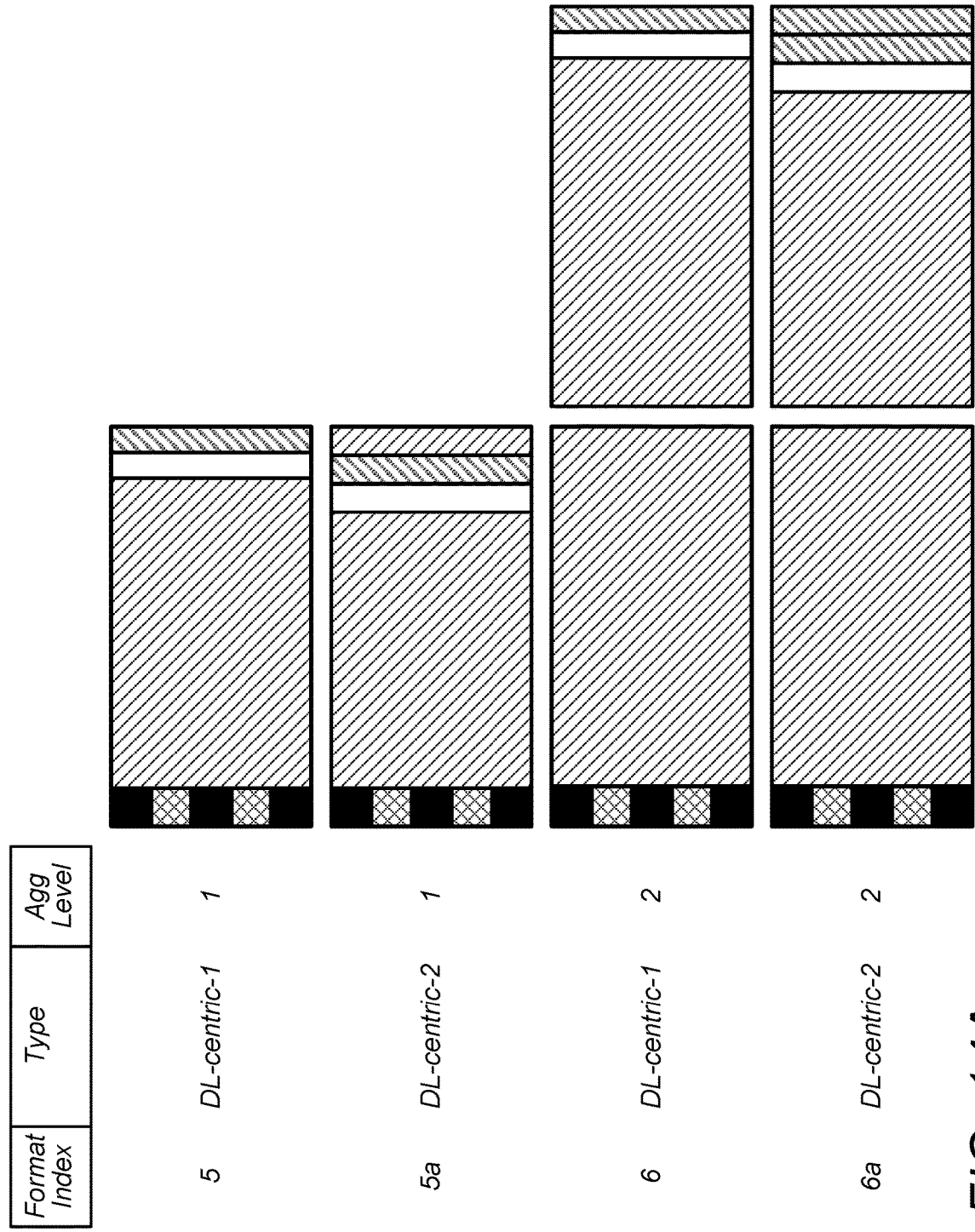
Figure 14B:
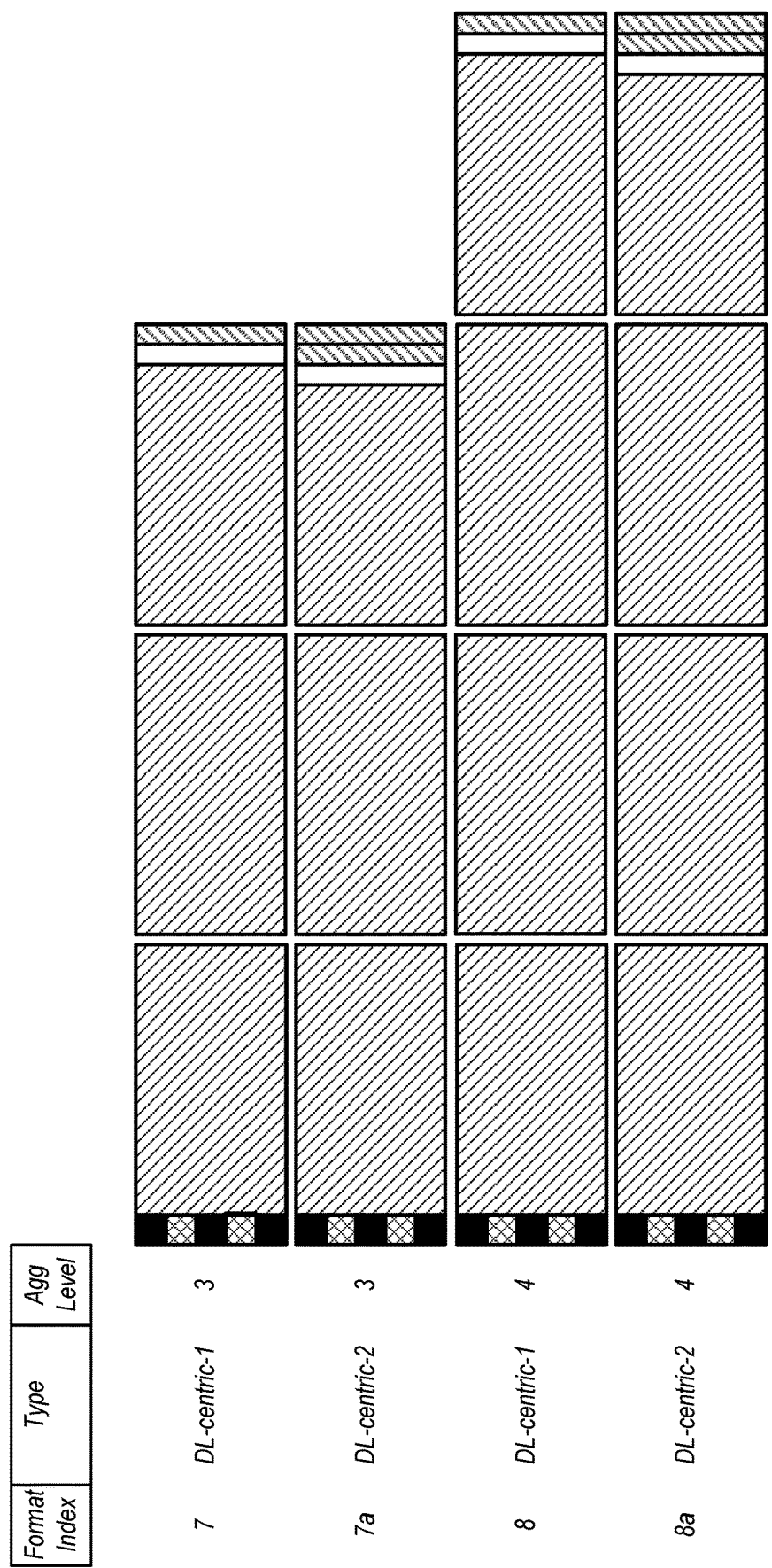

Alternatively, the SFI for DL could be defined on the assumption that no PDCCH region is allowed in non-initial slots of an aggregation. As shown in FIGS. 14A and 14B, only the initial slot includes a PDCCH region. (In some embodiments, the PDCCH region may span the first OFDM symbol of the slot, and includes a group common PDCCH and a set of one or more PDCCHs.)

The SFI for DL, which occurs in the group common PDCCH of the PDCCH region of the initial slot, indicates the DL(-centric) slot format for all the aggregated slots (where AL>=1). The main use cases are PDSCH transmission with and without slot aggregation. The SFI for DL does indicate Aggregation Level (AL) since SFI could be sent only in the initial DL slot.

SFI for Blank(Reserved)/Side Link (SL)

Figure 15:
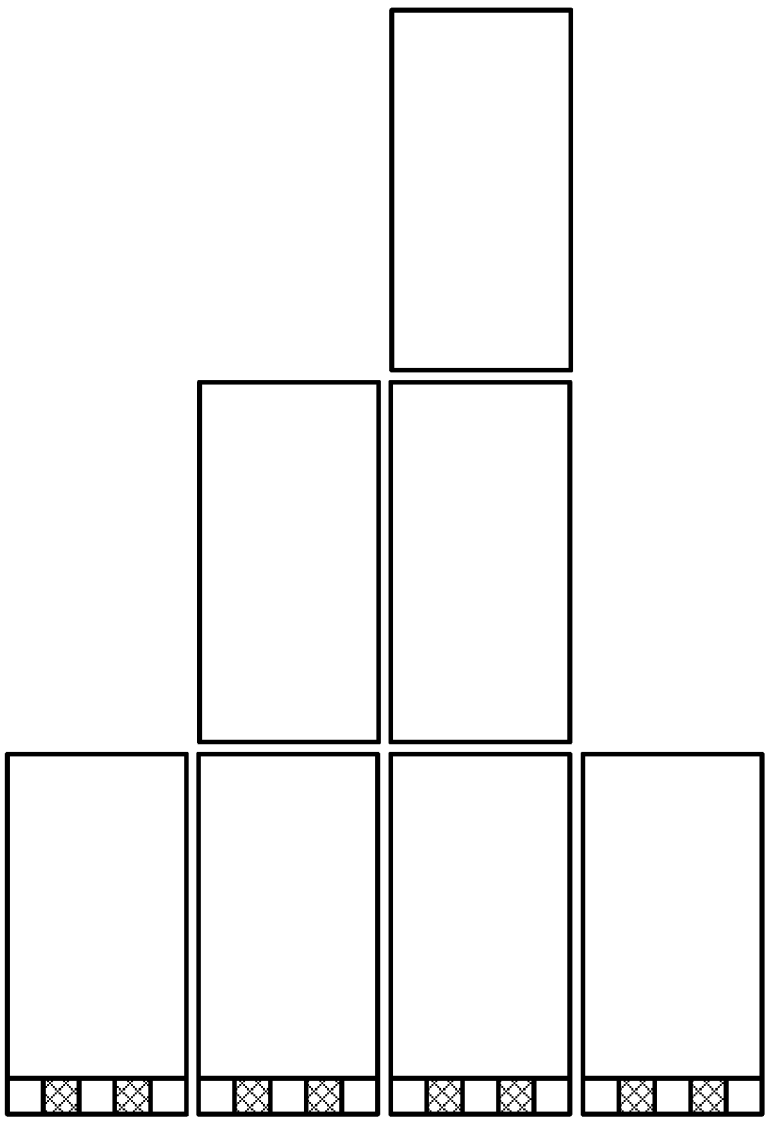

In some embodiments, some of the states of the SFI are used for indicating a blank slot that is used for forward compatibility, as shown in FIG. 15. A base station does not transmit or receive a signal which a legacy UE understands during a blank region of the slot, e.g., during the set complement of resource elements containing the SFI (or containing the group common PDCCH). Similarly, a legacy UE device may power down its transmitter and receiver during a blank region of the slot. Base stations and UEs operating according to future standards (or future versions of a current standard) might transmit during this slot, e.g., NR phase II systems. AL is encoded in the SFI. Thus, a plurality of slots may be aggregated to form a blank region that continuously covers more than one slot.

In some embodiments, one or more of the states of the SFI are used to indicate that side link (SL) transmission is enabled, e.g., as illustrated in FIG. 15 with format index 13. A side link transmission is a device-to-device transmission (e.g., UE to UE, or vehicle to vehicle, etc.).

DL and UL Combination

In some embodiments, some of the states of the SFI are used to indicate a combination of downlink and uplink transmission covering two or more consecutive slots. For example, FIG. 16 illustrates two states of the SFI, each indicating a two slot combination of downlink and uplink, with the ratio of DL to UL being 1. The format index 14 indicates that PDCCH is included in the PDCCH region. The format index 15 indicates that PDCCH is not included in the PDCCH region.

Dynamic Time Division Duplex (TDD)

The SFI may be sent in a slot where dynamic change of transmission direction is supported or allowed. For example, as illustrated in FIG. 17, a slot that is designated as a downlink slot by the current TDD configuration may be dynamically changed to an uplink slot by setting the SFI of the slot to an appropriate value of the format index. This implies that in at least some embodiments the transmission direction of a slot without an SFI cannot be changed.

If there is no SFI in a slot (e.g., UL only), the transmit direction of the slot may be determined by the most recently transmitted SFI.

For the base station (e.g., gNB), the degree of dynamicity and efficiency depends on how often SFI is sent. For example, FIG. 18 illustrates a very dynamic scenario while FIG. 19 illustrates a less dynamic scenario.

SFI Based on Generalized Format

Figure 20:
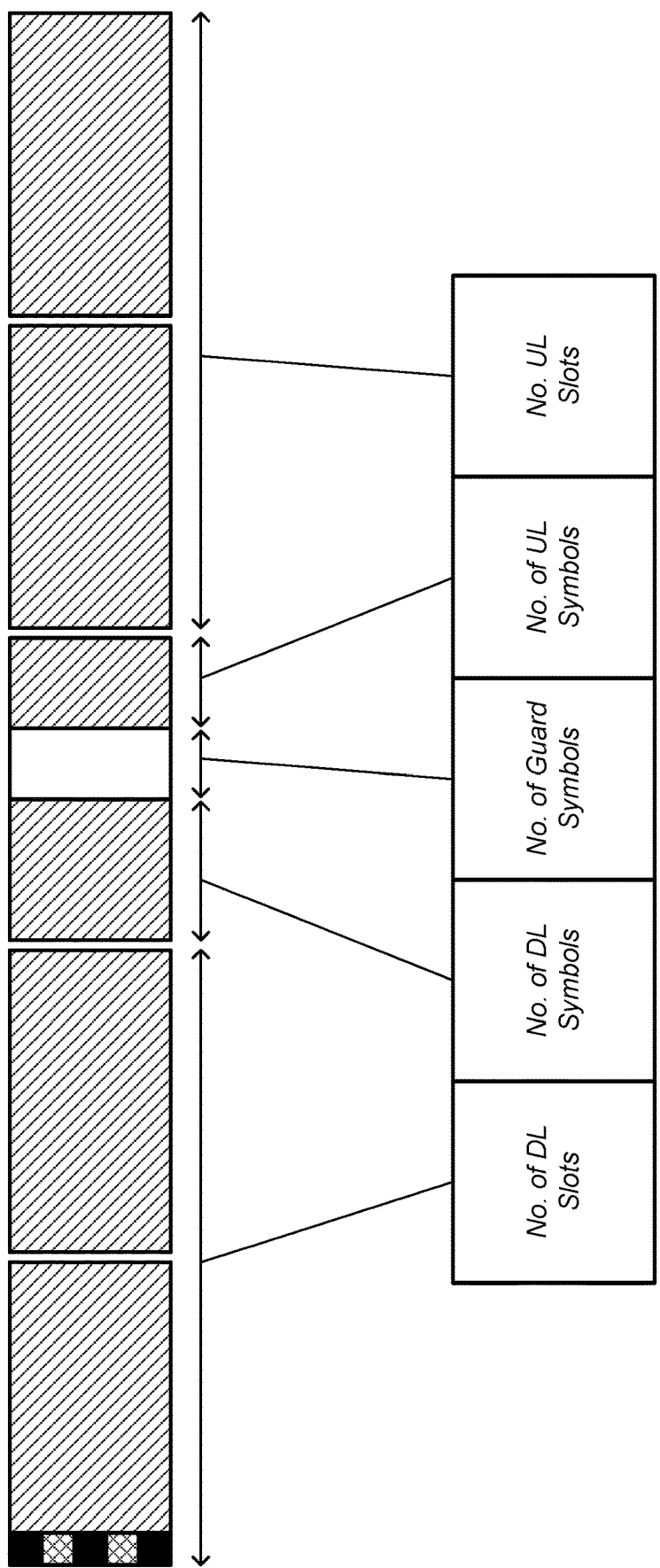

In some embodiments, the slot format indicator (SFI) may indicate both aggregation levels and number of symbols for all possible formats: downlink only, uplink centric, DL-UL combination. As shown in FIG. 20, the SFI may have five fields. Two of the fields define the length of a downlink region. Two of the fields define the length of an uplink region. One of the fields defines the length of a gap region between the downlink region and the uplink region. The boundaries between slots are not required to occur that slot boundaries.

In some embodiments, the gap region is assumed to occupy at most one whole slot. Thus, only a number of symbols is needed to specify the length of the gap region.

The downlink region occurs after (e.g., immediately after) the PDCCH region of the initial slot of the aggregated set of slots. (The PDCCH region is illustrated in FIG. 20 as the column of orange and red elements covering the first OFDM symbol.) The gap region may follow immediately after the downlink region. The uplink region may follow immediately after the gap region.

In some embodiments, the SFI includes the following five fields:

number $N_{DL}$ of DL slots;
number of DL symbols in the $(N_{DL}+1)^{th}$ slot;
number of guard symbols in the $(N_{DL}+1)^{th}$ slot;

number of uplink symbols in the $(NDL+1)^{th}$ slot; and number of uplink slots.

In embodiments where the UE knows in advance the symbol length of each slot, only two of the middle three numbers (from the list above) need to be included in the SFI. The present disclosure contemplates three realizations of the SFI corresponding respectively to the three possible ways of selected two numbers from the middle three numbers.

Scheduling with SFI

In some embodiments, the base station (e.g., gNB) can signal slot aggregation semi-statically or dynamically.

Figure 21:
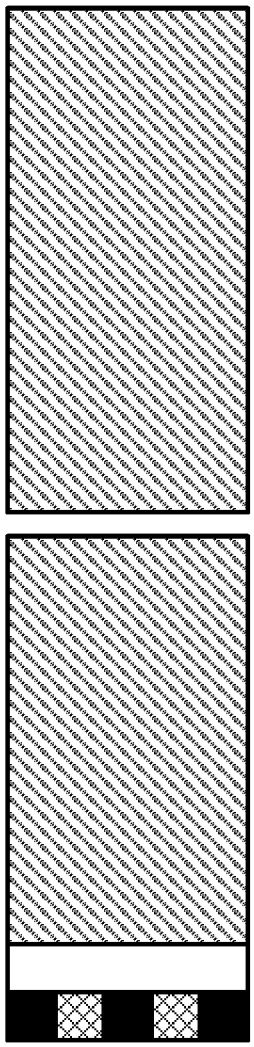

In UL slot aggregation, e.g., as shown in FIG. 21, PDCCH is preferably not transmitted in the middle of aggregation, e.g., in the non-initial slot(s). (The transmission of a PDCCH in a non-initial slot would require the insertion of a gap region to transition back to uplink transmission.)

Figure 22:
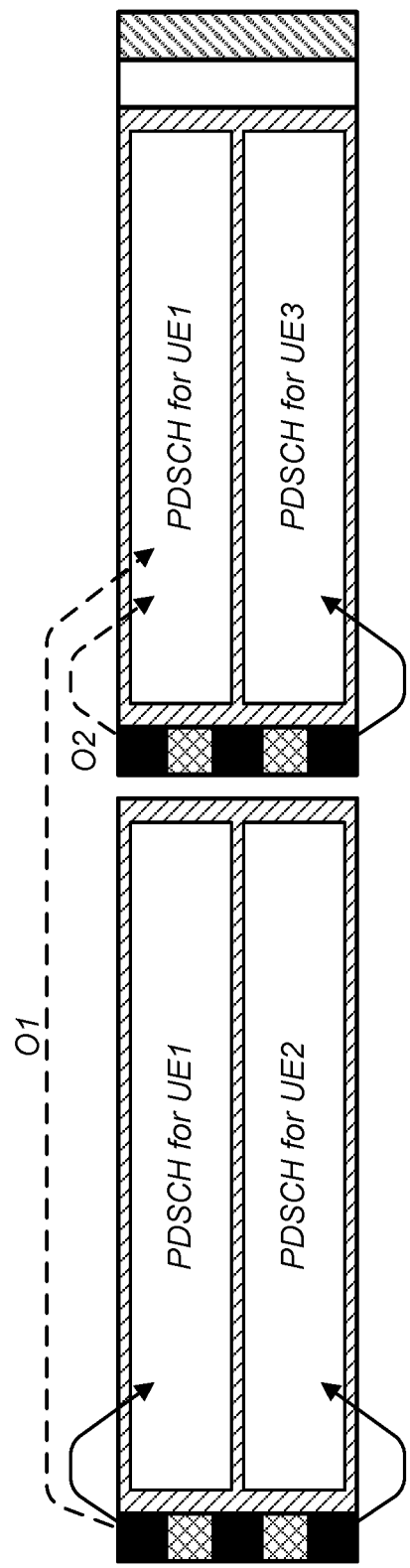

In DL, PDCCH could be allowed in the middle of an aggregation, e.g., as shown in FIG. 22. The PDSCH of a UE1 is scheduled in the first slot and lasts until the end of the aggregated slot (e.g., the second slot). In a first option, a single PDCCH in the first slot could indicate the PDSCH for UE1 in every slot. In a second option, a PDCCH in each slot independently schedules PDSCH for UE1 in that slot. The PDSCH of a UE2 is scheduled in the first slot only. The PDSCH of a UE3 is scheduled in the second slot only.

Rate Matching in PDCCH Region

In some embodiments, when a PDSCH is scheduled over multiple aggregated slots, the PDSCH is never mapped at into PDCCH region (or control resource set). In other words, elements of the PDSCH are not allowed to be transmitted in the PDCCH region. In FIGS. 23 and 24, note that the light blue color, representing the PDSCH for UE1, never occurs in the PDCCH region (the first OFDM symbol) of any slot.

In other embodiments, when a PDSCH is scheduled over multiple aggregated slots, the PDSCH is not mapped into PDCCH region (or control resource set), as shown in FIG. 25. However, as shown in FIG. 26, if there is no PDCCH scheduled in a non-first slot, then, the SFI in the non-first slot may signal that there is no PDCCH in the PDCCH region of the non-first slot, and the PDSCH for UE1 could be mapped at least partially into the PDCCH region of the non-first slot, to minimize waste of time frequency resources.

SFI for Slots of Various Different Lengths

In some embodiments, the same slot format indicator could be used in contexts where the slots are seven symbols in length and contexts where the slots are 14 symbols in length.

Figure 27:
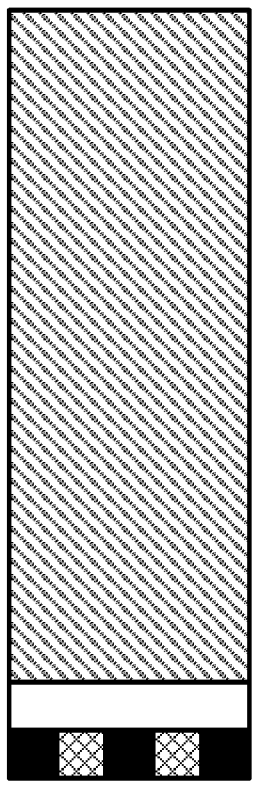

For uplink (UL), shown in FIG. 27, the number of symbols for PDCCH and the length of gap is known. Thus, the number of UL symbols may be calculated, e.g., based on the equation:

No. of UL symbols=Symbol length of slot−gap length−PDCCH length.

Figure 28:
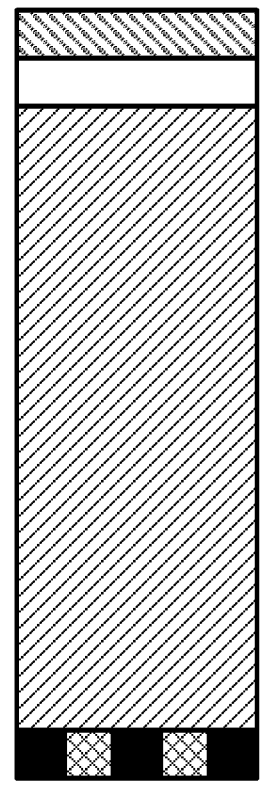

For downlink (DL), shown in FIG. 28, since the SFI indicates the number of UL symbols (if an uplink region exists within the slot), it is straight forward to compute the number of DL symbols for DL(-centric) slots, e.g., based on the equation:

No. of DL symbols=Symbol length of slot−(gap length+number of UL symbols)(UL Present=True)

In some embodiments, the SFI could be transmitted in mini-slots, to dynamically indicate the direction of each SFI-containing mini-slot.

FIG. 27 illustrates an exemplary format having an initial guard period followed by uplink (e.g., corresponding to formats 1-3 shown in FIG. 9). FIG. 28 illustrates an exemplary format having an initial downlink portion followed by a guard period and an uplink portion (e.g., corresponding to format 5 shown in FIG. 10). In some embodiments, FIG. 28 may be used in a situation where the UE may receive data during the downlink portion and may transmit an ACK during the uplink portion.

In one set of embodiments, a method 2900 for operating a base station may include the operations shown in FIG. 29.

At 2910, the method may include transmitting, by a radio of the base station, a first slot format indicator (SFI) within a first slot of a radio frame. The first SFI may indicate a first transmission direction for at least a first portion of the first slot. The first transmit direction is either uplink transmission or downlink transmission. The SFI may be included in a group common PDCCH of a PDCCH region of the first slot. The PDCCH region may spans the first N symbol durations of the first slot, wherein N is greater than or equal to one.

In some embodiments, the integer N is equal to one.

The first SFI may indicates that the PDCCH region includes at least one PDCCH. Alternatively, the first SFI may indicate that the PDCCH region does not include a PDCCH, and thus, a UE may save power by not attempting to decode (or search for) a PDCCH.

In some embodiments, the first SFI also indicates a second transmit direction for a second portion of the first slot, wherein the second transmit direction is a direction opposite to the first transmit direction. For example, the first portion may be a downlink portion and the second portion may be an uplink portion.

In some embodiments, the first SFI also indicates a second transmit direction for at least a portion of a second slot, wherein the second slot follows immediately after the first slot, wherein the second transmit direction is a direction opposite to the first transmit direction.

In some embodiments, when the first transmit direction is uplink transmission, the first SFI may indicate a slot aggregation level for the uplink transmission.

In some embodiments, when the first transmit direction is downlink transmission, an extent of slot aggregation for the downlink transmission may be indicated in a DCI of a radio frame containing the first slot.

In some embodiments, when the first transmit direction is downlink transmission, the first SFI may indicate a slot aggregation level for the downlink transmission.

The SFI could be divided into two parts (transmission direction and aggregation level), and encoded separately.

In some embodiments, the method may also include transmitting, by the radio, a second SFI in a second slot of the radio frame, wherein the second slot follows immediately after the first slot. The second SFI may indicate a second transmit direction for at least a portion of the second slot. The second transmit direction is either uplink transmission or downlink transmission. The second SFI may be included in a group common PDCCH of a PDCCH region of the second slot.

In some embodiments, the second SFI may indicate that the PDCCH region of the second slot does not include a PDCCH.

In some embodiments, the method may also include transmitting, by the radio of the base station, a second SFI in a second slot of the radio frame, wherein the second SFI indicates that at least a portion of the second slot is blank, wherein the second SFI is included in a group common PDCCH of a PDCCH region of the second slot.

In some embodiments, the method may also include transmitting, by the radio, a second SFI in a second slot of the radio frame, wherein the second SFI indicates that at least a portion of the second slot is to be used for a side link (such as UE to UE, or V2X), wherein the second SFI is included in a group common PDCCH of a PDCCH region of the second slot.

In some embodiments, the slot may be two or 7 or 14 symbols in length.

In one set of embodiments, a method 3000 for operating a user equipment (UE) device may include the operations shown in FIG. 30.

At 3010, a radio of the UE device may receive a first slot format indicator (SFI) from a first slot of a radio frame, wherein the first SFI indicates a first transmission direction for at least a first portion of the first slot, wherein the first transmit direction is either uplink or downlink. The SFI is included in a group common PDCCH of a PDCCH region of the first slot, wherein the PDCCH region spans the first N symbol durations of the first slot, wherein N is greater than or equal to one.

In some embodiments, the method may also include performing uplink transmission or downlink reception in the first portion of the first slot based on the first transmission direction. In other words, the UE radio performs uplink transmission if the first transmission direction is uplink, and performs downlink reception if the first transmission direction is downlink.

In some embodiments, the integer N is equal to one.

In some embodiments, the method may also include: in response to determining that the SFI indicates the PDCCH region of the first slot includes at least one PDCCH, decoding (or attempting to decode) the PDCCH from the PDCCH region.

In some embodiments, the method may also include: in response to determining that the first SFI indicates the PDCCH region does not include a PDCCH, omitting an attempt to decode PDCCH information from the PDCCH region.

In some embodiments, the method may also include: in response to determining that the first SFI indicates a second transmit direction for a second portion of the first slot, performing downlink reception or uplink transmission in the second portion of the first slot based on second transmit direction, wherein the second transmit direction is a direction opposite to the first transmit direction.

In some embodiments, the first SFI also indicates a second transmit direction for at least a portion of a second slot, wherein the second slot follows immediately after the first slot, wherein the second transmit direction is a direction opposite to the first transmit direction.

In some embodiments, the first transmit direction is uplink transmission, wherein the first SFI indicates a slot aggregation level for uplink transmission.

In some embodiments, the first transmit direction is downlink transmission, wherein an extent of slot aggregation for the downlink transmission is indicated in a DCI of a radio frame containing the first slot.

In some embodiments, the first transmit direction is downlink transmission, wherein the first SFI indicates a slot aggregation level for downlink transmission.

The SFI could be divided into two parts (transmission direction and aggregation level), and encoded separately.

In some embodiments, the method may also include receiving, by the radio of the UE device, a second SFI in a second slot of the radio frame, wherein the second slot follows immediately after the first slot, wherein the second SFI indicates a second transmit direction for at least a portion of the second slot, wherein the second transmit direction is either uplink transmission or downlink transmission, wherein the second SFI is included in a group common PDCCH of a PDCCH region of the second slot.

In some embodiments, the method may also include: in response to determining that the second SFI indicates the PDCCH region of the second slot does not include a PDCCH, saving power by making no attempt to decode PDCCH information from the PDCCH region of the second slot.

In some embodiments, the method may also include: receiving, by the radio of the UE device, a second SFI in a second slot of the radio frame; and in response to determining that the second SFI indicates that at least a portion of the second slot is blank, disabling uplink transmission or downlink reception in said at least a portion of the second slot, wherein the second SFI is included in a group common PDCCH of a PDCCH region of the second slot In some embodiments, the method may also include: receiving, by the radio, a second SFI in a second slot of the radio frame, performing a side link transmission in at least a portion of the second slot in response to determining that the second SFI indicates said at least a portion is to be used for a side link, wherein the second SFI is included in a group common PDCCH of a PDCCH region of the second slot.

In some embodiments, the slots are two or 7 or 14 symbols in length.

Design Principles for Unified TDD Scheme

In one set of embodiments, a TDD scheme may be designed to support both NR and coexistence with LTE. Thus, this TDD scheme may be referred to as a "unified" TDD scheme. The unified TDD scheme may coexist with LTE-TDD, which includes LTE TDD R8-R11 (static TDD) and LTE TDD R12~(eIMTA). (The symbol "~" here denotes "and following releases".) With regard to traffic adaptation, the unified TDD scheme may support both semi-static TDD configuration and dynamic TDD configuration.

Flexible Approach

In a unified framework for NR, semi-static TDD configuration may be semi-statically configured by the following information:

period (milliseconds);
length of downlink portion (D); and
length of uplink portion (U).

Figure 31:
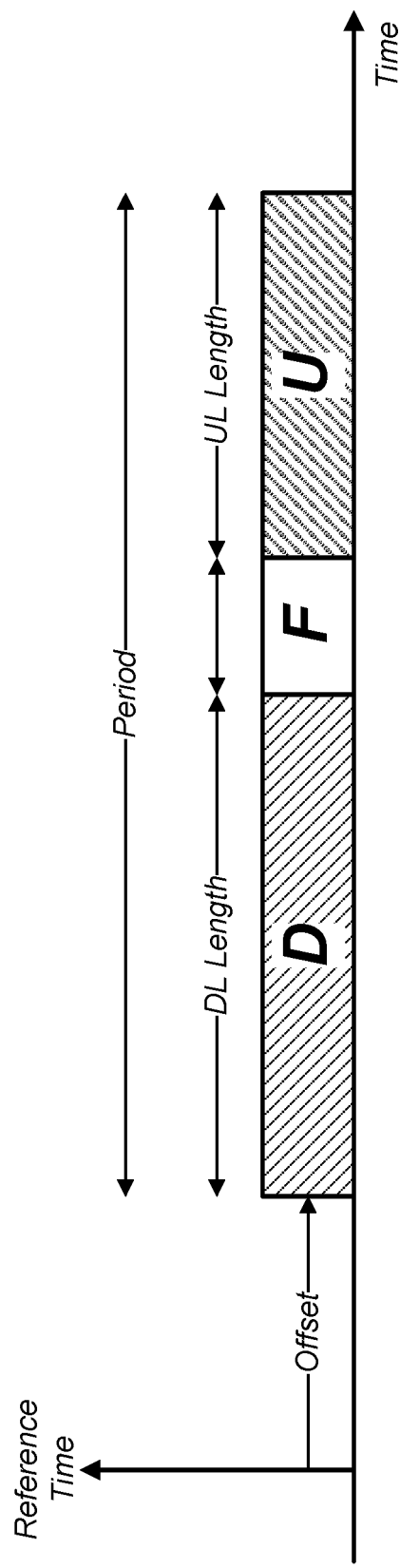
FIG. 31 illustrates an exemplary format, according to some embodiments.

See FIG. 31. Within the period, the downlink portion occurs first and the uplink portion occurs last. The downlink length and uplink length may be specified at symbol resolution. Thus, the downlink length may be specified in terms of a number of whole slots and a number of symbols, relative to reference numerology (e.g., 15 kHz or 30 kHz). Similarly, the uplink length may be specified in terms of a number of whole slots and a number of symbols, relative to reference numerology.

Resources within the period but not occurring in the downlink portion or the uplink portion are considered as being flexible (F).

Length of Flexible=Period(ms)−Length of DL (ms)−Length of UL (ms).

Resources in the flexible portion may be dynamically configured by a scheduling process for downlink transmission, uplink transmission, or unknown. Flexible resources that remain undetermined after scheduling may be treated as gap (e.g., for DL-to-UL switching). The minimum gap length (in terms of a number of slots and a number of symbols with respect to reference numerology) may also be broadcasted to all UEs.

NR TDD Configuration for Coexistence with LTE

FIGS. 32A-C illustrate how the TDD configurations of the present unified framework may be made compatible with TDD configurations of LTE. FIG. 32A shows the TDD configurations of LTE. As shown in FIG. 32B, the LTE TDD configuration identified by configuration index n may be transformed into one or two periods of a TDD configuration of the unified framework by applying a cyclic time shift of n units in time. (From the point of view of LTE, the units are subframes. From the point of view of NR, the units are slots with subcarrier spacing of 15 kHz in this figure.) FIG. 32C shows one period of the arbitrary row from FIG. 32B. Observe that the gap (G) within the special subframe (S) may be realized by the flexible portion (F) of the unified framework. See FIG. 33, where the specialized subframe S is decomposed into x downlink symbols, y flexible symbols (for gap), and z uplink symbols, where No. of symbols per subframe=$x+y+z$.

FIG. 33 assumes that the subcarrier spacing (SCS) is 15 kHz. For an arbitrary subcarrier spacing (SCS), the length numbers of FIG. 33 may be scaled by scaling factor=SCS/15 kHz. The notation (slot,symbol) is used to represent the length of a region (such as UL, DL or F) in terms of a number $N_{slot}$ of slots and a number $n_{Sym}$ of symbols. The length of the region corresponds to $N_{slot}$ whole slots plus nsym symbols.

When an NR base station (gNB) is operating on a frequency channel that is frequency adjacent to a frequency channel being used by an LTE base station, the NR base station may provide graceful coexistence with the LTE base station by:

applying a time shift to the slots of a TDD configuration of the unified framework to obtain the slots of a TDD configuration of 3GPP LTE; and performing TDD operation based on the LTE TDD configuration. (In some embodiments, TDD operation is the action of controlling the selection of transmission or reception or neither over time.)

In some embodiments, the time shift may be a cyclic time shift of the slots. For example, if a TDD configuration CU of the unified framework has five slots per period, and a sequence of periods under CU is denoted as

[A B C D E] [A B C D E] [A B C D E]. . . , then a cyclic time shift of three slots forward (or two slots backward) within each period would give an LTE TDD configuration of the form

[C D E A B] [C D E A B] [C D E A B]. . . ,

In other embodiments, the time shift may be a non-cyclic time shift, as suggested by the following expressions:

Unified: [A B C D E] [A B C D E]
 [A B C D E]. . . ,

LTE: [C D E A B][C D E A B][C D E A B]. . . ,

The periods of the LTE TDD configuration may be obtained by sampling from the periodic slot sequence of the unified framework, with a two slot shift in time. Note that period boundaries of LTE are shifted relative to period boundaries of the unified framework.

The UE of NR may apply the same time shift (cyclic or non-cyclic) to the slots of the TDD configuration of the unified framework, and perform TDD operation based on the resulting LTE TDD configuration. When there is no frequency adjacent LTE base station, the NR base station and the NR UE need not perform the above described time shifting.

Matching Special Subframe for Coexistence with LTE

Figure 34:
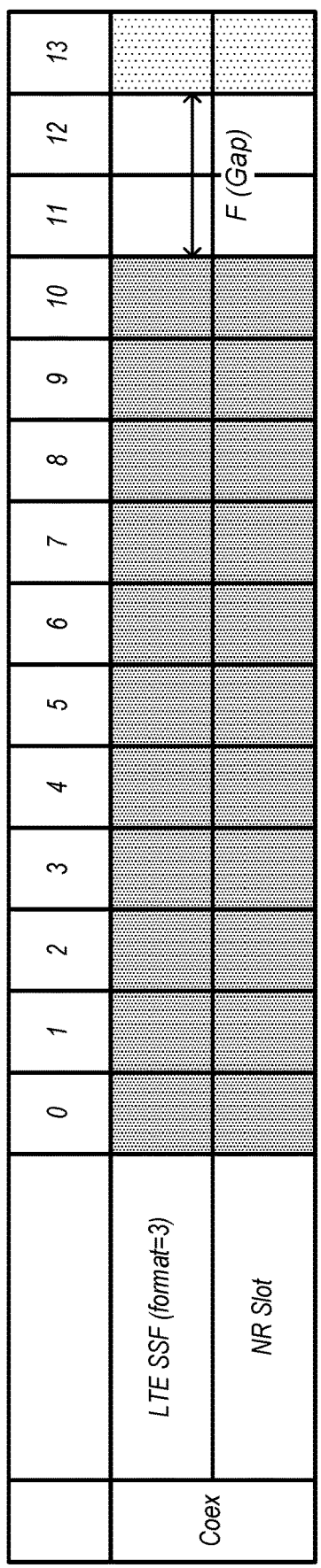
FIG. 34 illustrates exemplary alignment of LTE and NR formats, according to some embodiments.

To provide coexistence of the special slot under the unified framework with the special subframe (SSF) of LTE 3GPP, gap alignment may be provided as follows. The gNB may signal the gap length to all UEs through higher layer signaling. Regarding downlink, a downlink-scheduled UE knows from its DCI the ending time of its data transmission. The gap may start after (e.g., immediately after) the downlink transmission ends. Regarding uplink, the UE may start UL transmission based on a scheduling of ACK message, or based on being preconfigured for RACH, SRS, etc. See FIG. 34, which illustrates that the symbols of an NR slot (under the unified framework) and the symbols of LTE SSF format=3 have been aligned.

Detailed Usage of Slot

In some embodiments, the DL vs. UL transmission direction may be determined semi-statically. The detailed usage of the slot may be determined by scheduling information. The parameters K0, K1, K2, K3 (or any subset thereof) may be indicated by downlink control information (DCI), e.g., by user-specific DCI, where K0 is slot distance from DL grant to DL data
K1 is slot distance from DL data to ACK
K2 is slot distance from DL grant to UL data
K3 is slot distance from UL data to ACK.

Figure 35:
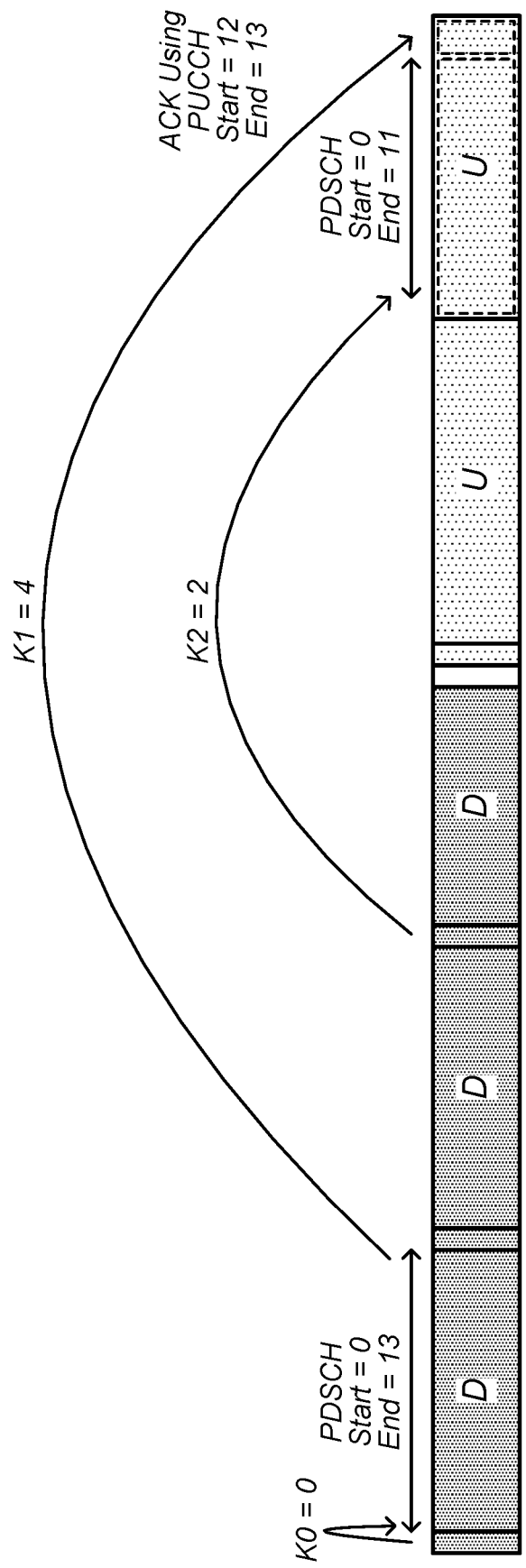
FIGS. 35 and 36 illustrate exemplary sequences of formats, according to some embodiments.

For example, as shown in FIG. 35, which assumes a period of 5 ms, the signal K0=0 in the PDCCH of the first slot from left indicates that DL resources (for transmission of DL data) are being granted to a UE in the PDSCH of the first slot. The PDSCH of the first slot extends from symbol 1 to symbol 13. As another example, the signal K1=4 in the first slot indicates that uplink acknowledgement (ACK) of the first slot's DL data will occur in the fifth slot, e.g., in symbols 12 and 13 of the fifth slot, wherein the first slot is counted as slot 0. The As yet another example, the signal K2=2 in the PDCCH of the third slot indicates that the third slot contains a DL grant for uplink transmission resources in the fifth slot. See the PUSCH in the fifth slot, which extends from symbol 0 to symbol 11 of the fifth slot.

NR TDD Configuration (for Non-Coexistence Scenario)

When operating an NR cell alone (e.g., without a frequency adjacent LTE channel), the TDD configuration of the NR cell could be signaled to UEs semi-statically, or dynamically, or a combination of semi-statically and dynamically. It is up to the operator to appropriately configure a cell, e.g., based on distance to nearby cell, cell size, etc. When operating an NR cell in the presence of a frequency adjacent LTE channel, an NR node (base station or UE) needs to align (i.e., match) its transmission directions with the LTE TDD configuration being used by the frequency adjacent LTE channel. The NR base station could signal the matching TDD configuration to UEs semi-statically. But it is also possible for the NR base station to signal the matching TDD configuration dynamically.

In at least some embodiments, a configuration referred to as being "dynamic" may mean:

the configuration is communicated through a physical layer signal (e.g., L1 signal such as DCI);

the configuration may be changed very often (e.g., every slot); and the configuration is valid only for a short time (e.g., one or a few slots).

In contrast, semi-static configuration may be a configuration based on RRC signaling, which is higher layer signaling. (RRC is an acronym for Radio Resource Control.) Higher layer signaling is not expected to be sent very often, e.g., on the order of hundreds of milliseconds. This implies that the configuration is valid for a longer time until it is changed later.

The flexible slot (F) may be used to quickly adapt to traffic load. For the flexible portion of the semi-static TDD configuration, the transmit direction is determined dynamically by physical layer signaling such as DCI and/or SFI.

In some embodiments, the transmission direction indicated by semi-static TDD configuration (or semi-static DL/UL assignment in spec term) may not conflict with transmission direction indicated by dynamic DCI. Additionally, or alternatively, in a system with semi-static TDD configuration (or semi-static DL/UL assignment) and SFI are configured, the transmission direction indicated by SFI may not conflict with that of DCI.

In some embodiments, there are at least two options for how to resolve conflicts in transmit direction indicated by semi-static configuration, SFI and DCI.

Option (1): The SFI has higher priority than semi-static configuration, with the exception that transmit direction of fixed uplink resources and the transmit direction of fixed downlink resources are not changed. Furthermore, DCI has higher priority than SFI. Finally, DCI has higher priority than semi-static configuration.

Option (2): The SFI has higher priority than semi-static configuration, with the exception that transmit direction of fixed uplink resources and the transmit direction of fixed downlink resources are not changed. Furthermore, SFI has higher priority than DCI.

Figure 36:
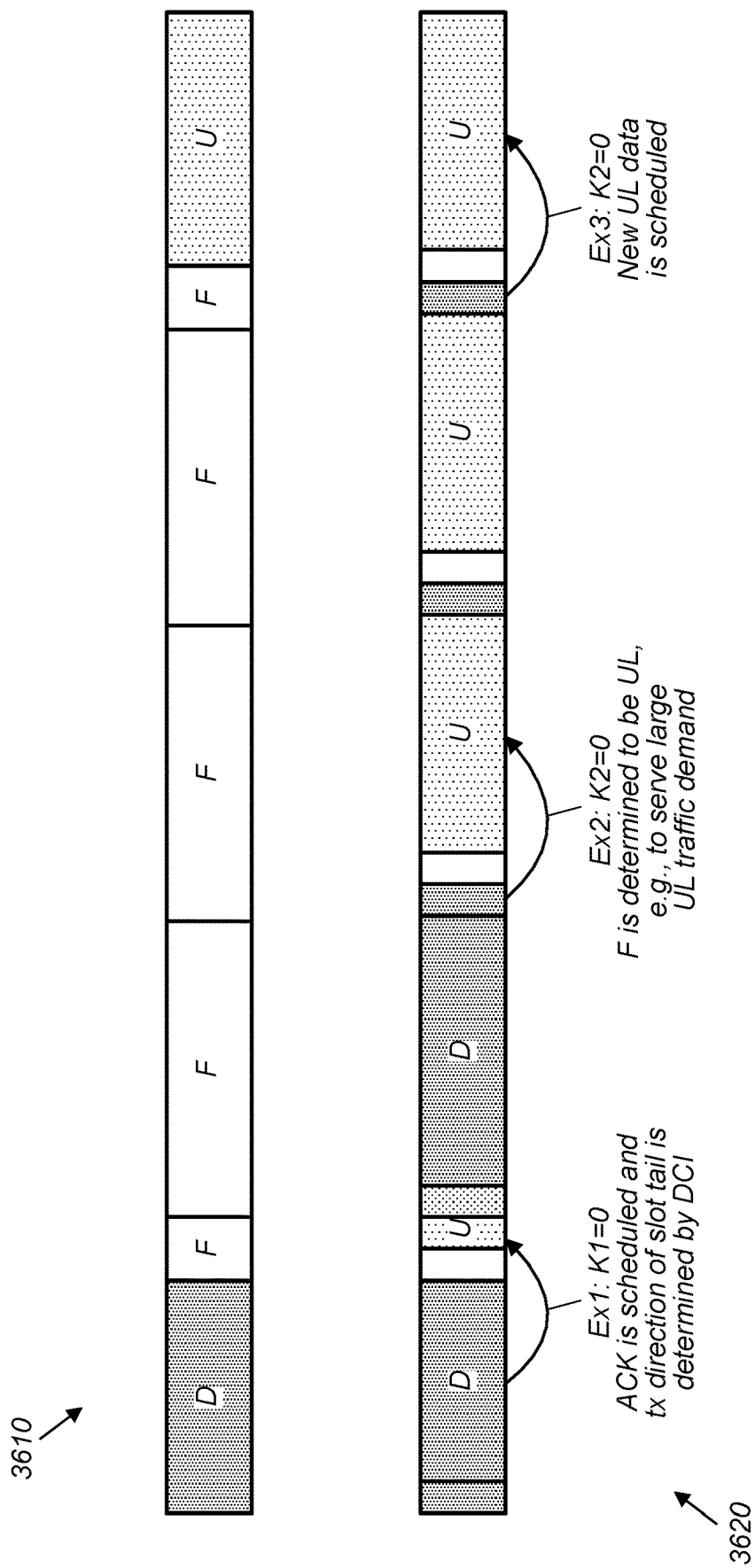

FIG. 36 illustrates how the detailed usage of slots may be determined by scheduling. At 3610, an example of a TDD configuration without scheduling is shown. The period is 5 ms; subcarrier spacing is 15 kHz; downlink has length given by (0,12); uplink has length given by (0,12). The flexible portion has length given by (3,4). At 3620, the detailed usage with scheduling is shown in terms of a number of examples.

Example 1: A self-contained downlink slot may be scheduled. As shown in FIG. 36, setting parameter K1=0 in the DCI of the first slot indicates that acknowledgement for the first slot's downlink data will also be in the first slot, e.g., at the tail end of the first slot.

Example 2: SFI and/or DCI may determine how to use a flexible slot. With K2=0, F is determined to be UL, to serve large UL traffic demand Example 3: DCI could schedule UL traffic in the UL portion of the frame structure.

Figure 37:
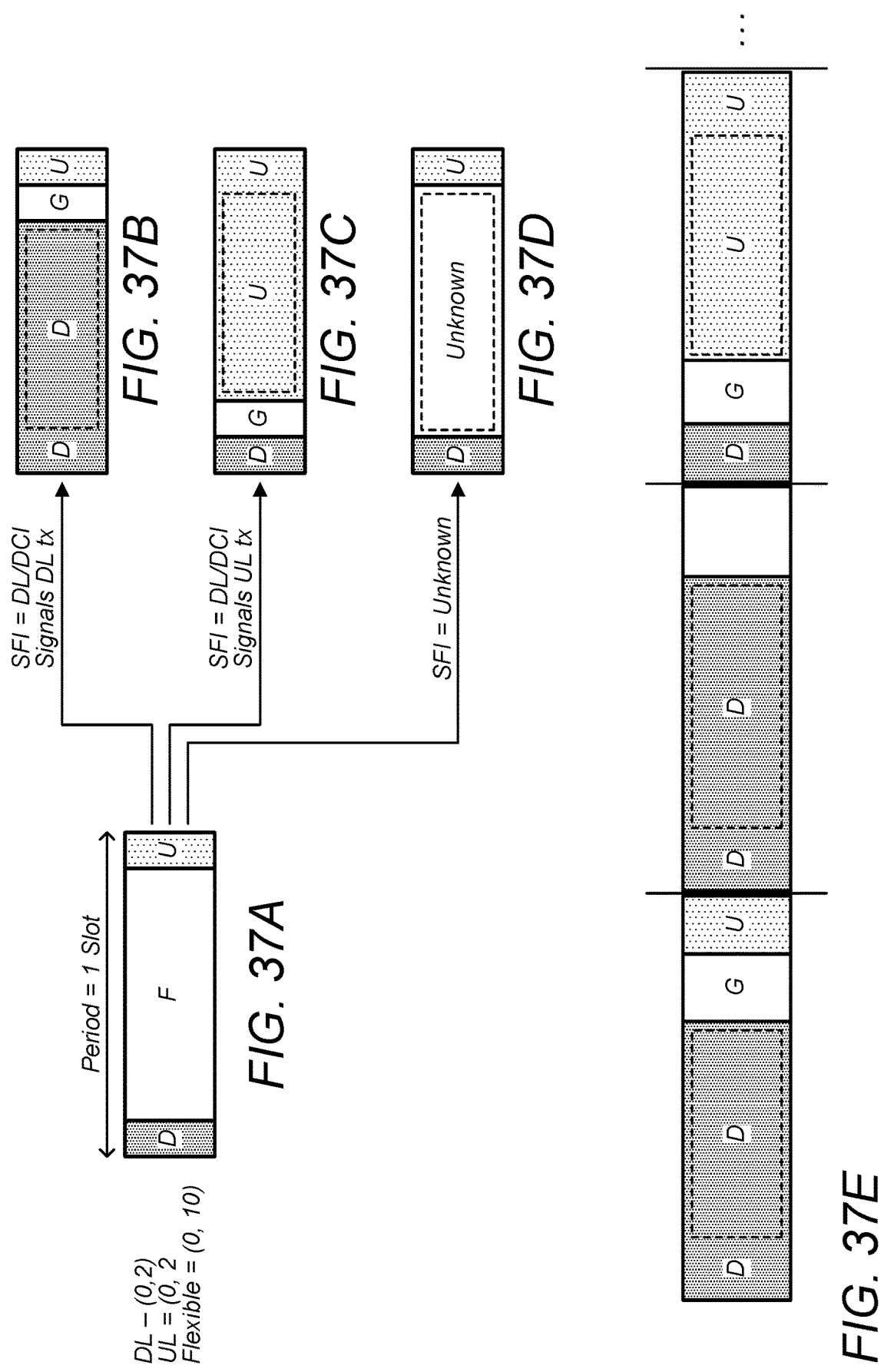
FIGS. 37A-E present an example of how the flexible portion of a frame structure having a single slot may be specialized in different ways, according to some embodiments.

FIGS. 37A-E present an example of how the flexible portion of a frame structure having a single slot may be specialized in different ways, depending on the state of the SFI and/or DCI. FIG. 37A shows a frame structure of the unified framework, with period=1 slot, DL portion having length (0,2), UL portion having length (0,2), and flexible portion having length (0,10). FIG. 37B shows the flexible portion being defined as a combination of downlink transmission and gap by setting SFI=DL or by the DCI signaling downlink transmission. FIG. 37C shows the flexible portion being defined as a combination of gap and uplink transmission by setting SFI=UL or by the DCI signaling uplink transmission. FIG. 37D shows the flexible portion being defined as "unknown" by setting SFI equal to Unknown. (During the unknown portion, the UE does not assume that the base station transmits or receives.) FIG. 37E shows several periods in succession, and illustrates how the flexible portion of the semi-static TDD configuration dynamically changes in different periods, based on changes in the state of the SFI and/or DCI.

Period Values

Different sets of values for the period may be supported in different embodiments. In some embodiments, at least the periods 10 ms and 5 ms are supported, to provide for coexistence with LTE. In other embodiments, the set of allowable periods includes at least 10 ms, 5 ms, 2 ms and 1 ms. In yet other embodiments, the set of allowable periods includes at least 10 ms, 5 ms, 2 ms and 1 ms, 0.5 ms, 0.25 ms, 0.125 ms. (The last three values may be instrumental in providing support for URLLC. URLLC is an acronym for Ultra Reliable Low Latency Communication.) In yet other embodiments, the period-SCS combinations shown in FIG. 38 are supported.

Gap and Cell Radius

A gap is needed whenever transition happens from downlink to uplink. The size of the gap is equal to the two one-way propagation delays plus switching time:

gap length=2*propagation delay+switching time.

Furthermore, cell radius is equal to the speed of light C times half the gap length:

C*gap length/2=cell radius (assuming switching time=0).

For operation at less than 6 GHz, it may be desirable to have cell radius be comparable to that in LTE. For operation at greater than 6 GHz cell radius could be smaller than that of LTE. Gap size may be common for all UEs in the cell. Gap size may be semi-statically configured. It seems that gap granularity for the special subframe (SSF) of LTE is a bit coarse (since it was defined based only on SCS=15 kHz).

Gap Length

In LTE, six different values of gap length were indirectly defined in 9 special subframe formats. (See the highlighted portions in the last six rows of the table in FIG. 39.) NR may also need smaller cell size(s) to support high frequency (e.g., greater than 6 GHz) operation. The Table in FIG. 39 shows a set of supported gap lengths for NR, according to some embodiments. Note that the Table includes gap lengths less than 0.0714 ms. The frequency occurring in the column headings (x KHz) is subcarrier spacing.

Signaling

In some embodiments, the NR base station (i.e., gNB) may send a new semi-static TDD configuration every period using an L1 signal such as DCI.

In some embodiments, the NR base station may send the semi-static TDD configuration information multiple times, to ensure that all UEs receive it.

In some embodiments, the semi-static TDD configuration information may include a time (e.g., a radio frame number) from which the new TDD configuration is valid.

In some embodiments, dynamic signal(s) may be used to provide dynamic TDD configuration of slot(s). The dynamic signal may be a slot format indicator (SFI), which indicates the type of one or more slots from a set of allowable types. In one embodiment, the set of allowable types includes DL, UL, Unknown and Empty.

In some embodiments, the dynamic signal may be a DCI. The DCI schedules data. The scheduling may be for DL transmission or UL transmission.

Unified Framework for TDD Configuration—Fixed Configuration Approach

In one set of embodiments, a set of fixed TDD configurations may be defined for NR, e.g., as specified in FIGS. 40-43. The NR base station may transmit (e.g., broadcast) an index indicating which of the fixed TDD configurations is to be put into effect.

As shown in FIG. 40, a first subset of the set of fixed TDD configurations is designed to support coexistence with LTE. In particular, each configuration of the first subset can be used to generate a corresponding TDD configuration of LTE by applying a corresponding time shift, with repetition in the case of the first three rows. The special subframe S in each configuration of FIG. 40 includes a flexible portion that agrees with the gap of the LTE special subframe.

FIGS. 41 and 42 show fixed TDD configurations for NR, with 15 kHz subcarrier spacing. Each of these configurations, except for configuration no. 10, includes:
- an initial portion having one or more consecutive slots that are designated as downlink;
- a terminal portion having one slot that is designated as uplink; and
- an intermediate portion between the initial portion and the terminal portion.

The intermediate portion is designated as flexible. The detailed use of the flexible slots may be determined by dynamic physical layer configuration information such as SFI and/or DCI. The configurations 6 and 7 shown in FIG. 41 may be used to provide coexistence with LTE configurations by applying an appropriate time shift (with repetition in the case of configuration 6) and appropriately specifying the dynamic physical layer configuration information. Configuration no. 10 has a single slot, which is designated as flexible.

FIG. 43 shows fixed TDD configurations for NR with 30 kHz subcarrier spacing.

Overriding Semi-Statically Configured Transmit Direction

Figure 44:
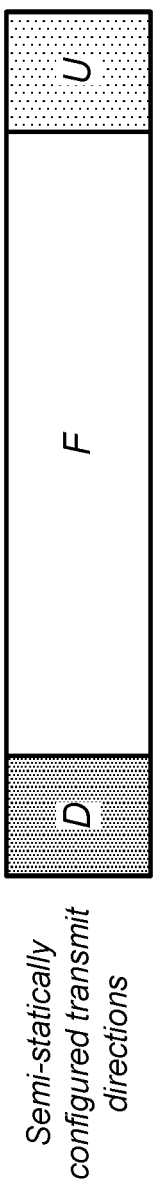
Figure 45:
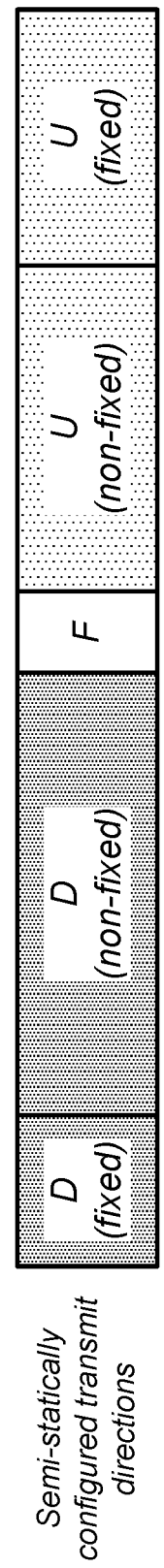

In the flexible approach of FIG. 31, there are two options relative to the possibility of overriding transmit direction in the downlink portion (D) and/or in the uplink portion (U). In a first option, as shown in FIG. 44, no overriding is allowed. In this option, the downlink portion must be used as downlink, and the uplink portion must be used as uplink. The transmit direction(s) of the flexible portion is (are) determined later by dynamic physical layer configuration information. In a second option, as shown in FIG. 45, overriding is allowed only for non-fixed resources. The non-fixed downlink section occurs in a terminal part of the downlink portion. The non-fixed uplink section occurs in an initial part of the uplink portion.

In the fixed configuration approach, one may support override of transmit direction(s) by designating one or more consecutive slots at the end of the downlink portion as non-fixed downlink, as shown in configurations 6 and 7 of FIG. 46. These non-fixed resources are subject to override of transmit direction by dynamic physical layer configuration information. Similarly, one or more consecutive slots at the beginning of the uplink portion may be designated as non-fixed uplink, as shown in configuration 6 of FIG. 46.

Method for Flexible Approach

In one set of embodiments, a method 4700 for operating a user equipment device may include the operations shown in FIG. 47. (The method 4700 may also include any subset of the features, elements and embodiments described above and described below in connection with FIGS. 48-49.)

At 4710, a radio of the user equipment device may receive TDD configuration information, wherein the TDD configuration information includes parameters that define a semi-static TDD configuration for a frame structure. The parameters may include:
- a frame length specifying a duration of the frame structure;
- a first length specifying a duration of a downlink portion of the frame structure,
- wherein the downlink portion occupies an initial position within the frame structure;
- a second length specifying a duration of an uplink portion of the frame structure,
- wherein the uplink portion occupies a terminal position within the frame structure.

An intermediate portion of the frame structure occurs after the downlink portion and before the uplink portion, wherein TDD structure of the intermediate portion is not determined by the TDD configuration information. TDD structure for a given time interval determines how the UE is to handle each symbol time of the time interval, e.g., whether to transmit or receive or do nothing during the symbol time.

The radio may include a baseband processor that performs the above described method (or any other method described herein). The baseband processor may be coupled to an RF transceiver, and configured to (a) generate a baseband transmit signal that is converted into an RF transmit signal by the RF transceiver, and/or, (b) operate on a baseband receive signal provided by the RF transceiver in response to an RF receive signal.

In some embodiments, the method 4700 also includes, in response to receiving the TDD configuration information, performing TDD operation including: (a) receiving, by the radio, downlink data from within the downlink portion of the frame structure; and (b) transmitting, by the radio, uplink data within the uplink portion of the frame structure.

In some embodiments, the method 4700 also includes: receiving one or more physical layer signals (such as SFI and/or DCI) that dynamically determine the TDD structure of the intermediate portion; and performing TDD operation over the intermediate portion based on the dynamically determined TDD structure.

In some embodiments, the one or more physical layer signals include user-specific downlink control information (DCI) and a slot format indicator (SFI), wherein the slot format indicator is included in a group common PDCCH. If the transmission direction defined for a given slot of the frame structure by the user-specific DCI is inconsistent with the transmission direction defined for the given slot by the SFI, the radio may perform TDD operation (e.g., transmission or reception) based on the user-specific DCI.

In some embodiments, the one or more physical layer signals include downlink control information (DCI), wherein the DCI includes a first parameter that specifies slot distance between resource grant information and corresponding downlink data (e.g., downlink data that occupies downlink resources identified by the resource grant information).

In some embodiments, the one or more physical layer signals include downlink control information (DCI), wherein the DCI includes a second parameter that specifies slot distance between downlink data and an uplink acknowledgement of the downlink data.

In some embodiments, the one or more physical layer signals include downlink control information (DCI), wherein the DCI includes a third parameter that specifies slot distance between resource grant information and corresponding uplink data (e.g., uplink data that occupies uplink resources identified by the resource grant information).

In some embodiments, the one or more physical layer signals include downlink control information (DCI), wherein the DCI includes a fourth parameter that specifies slot distance between uplink data and a downlink acknowledgement of the uplink data.

In some embodiments, the one or more physical layer signals include downlink control information (DCI) located in a slot of the downlink portion of the frame structure.

In some embodiments, the one or more physical layer signals include downlink control information (DCI) located in a slot of the intermediate portion.

In some embodiments, the one or more physical layer signals include a slot format indicator, wherein the slot format indicator is received by the radio from a group common PDDCH of a given slot of the frame structure. The slot format indicator may indicate a direction of transmission for at least a portion of the given slot.

In some embodiments, the method 4700 may also include performing TDD operation for each frame in a sequence of frames based on the semi-static TDD configuration. For each of the frames of the sequence, the TDD structure of the intermediate portion of the frame may be determined by corresponding dynamic configuration information provided in one or more slots of the frame.

In some embodiments, the downlink portion includes an initial subportion and a following subportion, wherein the initial subportion is configured for downlink transfer with no possibility of dynamic override to different TDD status (e.g., downlink centric, uplink, uplink centric, blank, side link, etc.), wherein the following subportion is configured for downlink transfer with possibility of dynamic override to different TDD status.

In some embodiments, the method 4700 may also include receiving a physical layer signal (such as SFI and/or DCI) indicating override of at least a subset of the following subportion to TDD status other than said downlink transfer.

In some embodiments, the uplink portion includes a first subportion and a final subportion, wherein the first subportion is configured for uplink transfer with possibility of dynamic override to different TDD status (e.g., downlink, downlink centric, uplink centric, blank, side link, etc.), wherein the final subportion is configured for uplink transfer with no possibility of dynamic override to different TDD status.

In some embodiments, the method 4700 may also include receiving a physical layer signal indicating override of at least a subset of the final subportion to TDD status other than uplink transfer.

In some embodiments, the downlink portion is configured for downlink transfer without possibility of dynamic override to TDD status different from downlink transfer, and, the uplink portion is configured for uplink transfer without possibility of dynamic override to TDD status different from uplink transfer.

In some embodiments, the user equipment device receives the TDD configuration information from a first base station that operates on a first frequency channel, in which case the method 4700 may also include applying a time shift to slots of a current radio frame. The time shift may depends on an indicator of a TDD configuration being used by a second base station that operates on a second frequency channel that is frequency adjacent to the first frequency channel. After the time shift, a current semi-static TDD configuration of radio frame conforms to a TDD configuration of 3GPP LTE.

In some embodiments, the first length is specified in terms of a first number of whole slots and a non-negative number x of symbols in a transition slot, and the second length is specified in terms of a second number of whole slots and a non-negative number z of symbols in the transition slot. Symbols of the transition slot not occurring in either the first x symbols of the transition slot or the last z symbols of the transition slot may be gap symbols.

In some embodiments, the first number, the number x, the second number and the number z are configured to achieve agreement with a TDD configuration of 3GPP LTE.

In some embodiments, the intermediate portion includes a gap region, wherein a length of the gap region is received by the UE through higher layer signaling.

In some embodiments, the intermediate portion includes a gap region, wherein a length of the gap region is less than 0.0714 ms.

In some embodiments, the frame length corresponds to one slot.

In some embodiments, the frame length indicates a time value from the set {10 ms, 5 ms, 2 ms, 1 ms, 0.5 ms, 0.25 ms, 0.125 ms}.

In some embodiments, the TDD configuration information is included in a physical layer signal (such as downlink control information).

In some embodiments, a plurality of copies of the TDD configuration information are received. The base station transmits a plurality of copies to increase the probability of successful decoding of the TDD configuration information.

In some embodiments, the TDD configuration information includes a time at which the radio is to start using the semi-static TDD configuration for TDD operation.

Method for Fixed Approach

In one set of embodiments, a method 4800 for operating a user equipment device may include the operations shown in FIG. 48. (The method 4800 may also include any subset of the features, elements and embodiments described above and described below in connection with FIG. 49.)

At 4810, a radio of the user equipment device may receive a TDD configuration index, wherein the TDD configuration index has a value selected from a predefined set of values, wherein the values of the predefined set identify respective semi-static TDD configurations, wherein a first subset of the values of the predefined set identify semi-static TDD configurations that agree up to time shift (cyclic or non-cyclic) with respective TDD configurations of 3GPP LTE.

In some embodiments, the method 4800 may also include, when the value of the TDD configuration index is in the first subset, performing TDD operation based on the semi-static TDD configuration that corresponds to the value, wherein said performing the TDD operation includes applying a time shift to slots for a current frame, wherein an amount of the time shift depends on said value.

In some embodiments, the predefined set includes a second subset of values, disjoint from the first subset. For each value in the second subset, the corresponding semi-static TDD configuration may include:
  an initial portion including one or more consecutive slots for downlink transfer;
  a terminal portion including one more consecutive slots for uplink transfer; and
  an intermediate portion including one or more consecutive slots whose TDD structure is to be dynamically determined by physical layer configuration information.

In some embodiments, the method 4800 may also include, in response to determining that the value of the TDD configuration index is in the second subset, performing TDD operation including: (a) receiving, by the radio, downlink data from one or more symbols of the initial portion; and (b) transmitting, by the radio, uplink data within one or more symbols of the terminal portion.

In some embodiments, the physical layer configuration information includes downlink control information.

In some embodiments, the physical layer configuration information includes a slot format indicator occurring in a group common PDDCH.

In some embodiments, the physical layer configuration information includes both downlink control information (DCI) and a slot format indicator (SFI).

In some embodiments, the predefined set includes a third subset (e.g., disjoint from the first and second subsets), wherein, for each value in the third subset, the corresponding semi-static TDD configuration includes only a single flexible slot whose TDD structure is dynamically determined by physical layer configuration information.

In some embodiments, the predefined set includes a fourth subset, wherein, for each value in the fourth subset, the corresponding semi-static TDD configuration includes in time order:
- a first portion including one or more consecutive slots, wherein the first portion is assigned for downlink transfer without possibility of dynamic override to TDD status other than downlink transfer; and
- a second portion including one or more consecutive slots, wherein the second portion is assigned for downlink transfer with possibility of dynamic override to TDD status other than downlink transfer.

In some embodiments, for each value in the fourth subset, the corresponding semi-static TDD configuration also includes in time order:
- a third portion including one or more consecutive slots, wherein the third portion is assigned for uplink transfer with possibility of dynamic override to TDD status other than uplink transfer, wherein the third portion occurs after the second portion in time; and
- a fourth portion including one or more consecutive slots, wherein the fourth portion is assigned for uplink transfer without possibility of dynamic override to TDD status other than uplink transfer.

In some embodiments, the semi-static TDD configurations corresponding to the values of the predetermined set are partitioned into groups corresponding to respective subcarrier spacings.

In some embodiments, the semi-static TDD configuration corresponding to the values of the predetermined set are partitioned into collections corresponding to different periodicities in time.

Dynamic TDD Configuration via Physical Layer Signaling

In one set of embodiments, a method 4900 for operating a user equipment device may include the operations shown in FIG. 49. (The method 4900 may also include any subset of the features, elements and embodiments described above.)

At 4910, a radio of the user equipment device may receive physical layer configuration information from a first of a plurality of slots in a current frame, wherein the physical layer configuration information dynamically determines TDD status (e.g., transfer direction) for at least a portion of an indicated slot of the current frame, wherein the indicated slot is the first slot or a second slot occurring after the first slot in the current frame.

In some embodiments, the method 4900 may also include performing downlink reception or uplink transmission in said portion of the indicated slot based on the dynamically determined TDD status.

In some embodiments, the physical layer configuration information includes a slot format indicator, wherein the slot format indicator is included in a group common PDCCH of the first slot. In one embodiment, the method 4900 also includes receiving, by the radio, downlink control information assigning a time-frequency resource in said at least a portion of the indicated slot to the user equipment device, wherein a transmission direction indicated by the downlink control information is always consistent with a transmission direction indicated by the TDD status.

In some embodiments, the physical layer configuration information includes downlink control information (DCI). (For example, the DCI may be included in the PDCCH of the first slot.)

In some embodiments, the DCI includes a parameter that specifies a non-negative slot distance between the first slot and the indicated slot.

In some embodiments, the parameter indicates that: resource grant information (e.g., a grant of downlink resources) is included in the first slot; and corresponding downlink data is included in the indicated slot.

In some embodiments, the parameter indicates that: downlink data (e.g., PDSCH data) is included in the first slot; and an uplink acknowledgement of the downlink data is included in the indicated slot.

In some embodiments, the parameter indicates that: resource grant information (e.g., a grant of uplink resources) is included in the first slot; and corresponding uplink data is included in the indicated slot.

In some embodiments, the parameter indicates that: uplink data is included in the first slot; and a downlink acknowledgement of the uplink data is included in the indicated slot.

In some embodiments, the TDD status determined by the physical layer configuration information overrides a TDD status determined by previously received semi-static configuration information.

In some embodiments, the indicated slot (or a portion thereof) has been previously configured as being flexible in its direction of transfer by previously received semi-static configuration information.

In some embodiments, the TDD status is selected from a set of TDD statuses including uplink transfer and downlink transfer.

In some embodiments, the set of TDD statuses also includes: uplink centric transfer; downlink centric transfer; side link transfer; and reserved for future use.

Slot Format Indicator

In one set of embodiments, slot format indicator (SFI) is information that signals slot format(s) for one or more slots. SFI may describe how resources are being used. For example, SFI may indicate that a slot is used for sending downlink signals, or indicate that the upcoming three slots are used for DL, DL, UL, respectively.

SFI and Periodic Signals

In some embodiments, SFI may be useful mainly for non-scheduled UEs. Unlike a scheduled UE, which by definition has received DCI, a non-scheduled UE does not have DCI. Thus, the non-scheduled UE cannot be sure of the transmission direction of a current slot. (The transmission direction might have been changed by DCI addressed to another UE, which the non-scheduled UE would not normally receive.) If there is any periodic signal (such as CSI-RS or SRS or CSI report) configured for a non-scheduled UE in the current slot, the non-scheduled UE should first know the transmission direction of the current slot, to determine whether to, e.g., receive CSI-RS or transmit SRS. In this case, it is assumed that the transmission direction of a resource in which a periodic signal is configured can be changed. If this is not the case, e.g., if a periodic signal is always transmitted in a fixed resource of which transmission direction is not allowed to change, then there may not be any clear case that SFI is beneficial to the non-scheduled UE. It may be too restrictive from a resource utilization perspective to not allow change of transmission direction for such resource where a periodic signal is scheduled.

In some embodiments, NR allows change of transmission direction of a resource in which a periodic signal such as CSI-RS or SRS is configured. The change of transmission direction may be realized by dynamic L1 signaling. UEs, especially non-scheduled UEs may receive the dynamic L1 signaling in order to determine transmission direction for the resource.

Issues to Consider in the Design of SFI

In defining SFI, there may be two important cases to consider:
  NR coexists with LTE in adjacent channel; and
  NR only (no coexistence with LTE).

In the second case (the NR only case), there is not much restriction in the design of SFI. However, in the first case, the LTE TDD configuration should be considered in designing SFI since if NR does not provide UL/DL transmission direction configuration matching that of LTE, then they (e.g., the gNB of NR and the eNB of LTE) could potentially introduce cross link interference (CLI) to each other, degrading the performance of both RATs. (Cross link interference would occur when the NR cell and the LTE cell are simultaneously transmitting in opposite directions, e.g., when the NR cell transmits/receives while the LTE cell is receiving/transmitting.)

Another important factor which affects the design of SFI is mode of UL/DL transmission direction assignment. It has already been agreed that NR should support both semi-static and dynamic assignments of UL/DL transmission direction. In the semi-static assignment case, SFI in at least some embodiments may be similar to the static LTE-TDD configuration defined in Release 8 LTE. In the dynamic TDD case, SFI may be similar to the dynamic TDD configuration defined in R12 eIMTA. Different modes of UL/DL transmission direction assignment are discussed in the section titled "UL/DL Transmission Direction Assignment for NR".

Resource Type

In some embodiments, the following five different types of resources may be defined for NR.
  (1) DL: a resource in which transmission direction is downlink.
  (2) UL: a resource in which transmission direction is uplink.
  (3) Flexible: a resource in which transmission direction is determined later by other signals.
  (4) Reserved: a resource in which UE is not allowed to transmit or receive. The reserved status of a resource cannot be overridden by other signals.
  (5) Gap: a resource which is used for DL to UL transition.

The network can signal the above five different types of resources to UE through different types of signaling method, e.g., RRC, SFI, or DCI. Note that a given slot could have one or more types of resource in it.

UL/DL Transmission Direction Assignment for NR

Semi-static UL/DL Assignment

In some embodiments, the network may support semi-static assignment of UL/DL transmission direction configuration. In semi-static assignment, the UL/DL transmission direction is semi-statically configured by RRC signaling and hardly changed. This kind of semi-static setting is preferred when the network has neighboring cells close to each other. In such a scenario, adjacent cells transmitting in different directions could introduce significant cross link interference (CLI) if two neighboring gNBs perform scheduling without being aware of each other's transmission direction.

Period for Configuration

In one set of embodiments, the gNB and UEs are designed to support periodicities including 0.5 ms, 1 ms, 2 ms, 5 ms, 10 ms for semi-static assignment. (In at least some of those embodiments, the supported periodicities also include roughly 0.125 ms and roughly 0.25 ms.) This means that the sets of configurations corresponding to the supported periods need to be defined. Various periods could be used with different sub-carrier spacing or with different slot durations. 10 ms and 5 ms may be necessary for NR to generate UL/DL transmission direction assignment matching that of LTE. Shorter periods such as 0.5 ms, 1 ms and 2 ms could be used for larger subcarrier spacing with shorter DL-to-UL turnaround time.

Structure of Configuration

In at least some embodiments, a single period may have both a DL transmission part and a UL transmission part with a gap in between. A set of configurations could have various patterns with different ratios of temporal length for DL, gap and UL. FIG. 50 shows three different examples of configurations with different UL:DL ratios.

Transmission Direction Alignment

In semi-static assignment, there are two types of signals indicating transmission direction: RRC signal for semi-static assignment, and DCI. RRC signal is used for configuring semi-static assignment, and DCI is used for scheduling PDSCH/PUSCH. In some embodiments, the transmission direction indicated by RRC and the transmission direction indicated by DCI should be aligned, i.e., agree with each other. That is, there should be no conflict between them in semi-static assignment. From UE perspective, this means that UE can assume the transmission direction indicated by RRC signaling always matches with that in DCI (if any).

Thus, in some embodiments of semi-static assignment, the transmission direction indicated by RRC signaling should be aligned with that in DCI.

Unified Approach

The role of UL/DL configuration may be similar to that of SFI. There are subtle differences in context. The term "UL/DL transmission direction assignment" usually has been used when meaning long-persisting configurations in the context of semi-static assignment, while the term "SFI" has been used when meaning rather short lived configuration in the context of dynamic TDD. However, there may be no need to use two different terms and instead they could be unified into a single framework.

In some embodiments, a subset of the slot formats supported by SFI may be defined to be UL/DL configurations for the semi-static case.

Dynamic Assignment

Framework for Dynamic UL/DL Assignment

In some embodiments, a framework for NR's dynamic UL/DL assignment may be envisioned that is based on periodic monitoring of dynamically changing SFI, where the monitoring period could be semi-statically configured. According to one embodiment, an SFI transmitted at the beginning of the period indicates at least the slot formats of all the slots belonging to the period.

Thus, in some embodiments, for dynamic UL/DL transmission direction assignment, one or more of the following may be proposed:
  (a) UE is configured to periodically monitor for SFI.
  (b) Network can send SFI in the first slot of every period.
  (c) The transmitted SFI in the current period indicates the slot formats of slots at least in the current period.

(d) The monitoring period can be configured, e.g., by RRC signaling.

(e) If UE fails to receive the SFI and no DCI sent, the UE can simply use the slot format(s) defined by the last received SFI.

(f) Alternatively, if the UE fails to receive the SFI and no DCI is sent, the UE can treat the current period as reserved or flexible.

Period of SFI Transmission

Note that the period determines how fast the network can adapt to time varying traffic demand in the dynamic case. The shorter the period, the faster it can adapt. To make NR comparable to LTE eIMTA, at least 5 ms and 10 ms periods need to be supported. To support even higher adaptability, 1 ms can be supported, which corresponds to one slot when the subcarrier spacing is 15 kHz. In some embodiments, the period may be configured through RRC signaling.

In some embodiments, for dynamic UL/DL transmission direction configuration:

NR supports a set of SFI transmission periods; and

NR supports periods of at least 1 ms, 5 ms, and 10 ms.

Overriding Transmission Direction

There may be at least two options regarding overriding capability. A first option is that DCI may not override SFI. In this case, the transmission direction indicated by DCI should always match with the transmission direction indicated by SFI. A second option is to allow the overriding of SFI by DCI. The second approach provides more dynamic operation. The remainder of this section may refer to the second option.

In some embodiments, there may be a working assumption (WA) that the network can override by DCI a flexible resource indicated in SFI. One motivation for this WA is to provide higher flexibility in resource usage. When the network sends an SFI that covers, e.g., the upcoming 5 slots, the SFI can indicate some slots as flexible. Those flexible slots could be later overridden by DCI to DL or UL. If they are not overridden, the flexible slots could be treated as reserved resources.

One thing to consider is the protection of a periodic signal such as CSI-RS or SRS or CSI report. Suppose a periodic signal is configured in a set of slots, and one of these slots is indicated as flexible by SFI. In this case, if not all the symbols of the slot are configured to support the periodic signal, then, the remaining symbols of the slot could be used for uplink and/or downlink data transmission. The flexible status of this remaining resource could be overridden to uplink or downlink by DCI. Thus, it is up to the network whether it can protect periodic signal transmission/reception. In this way, the network can utilize flexible resources while protecting periodic signals.

Figure 51A:
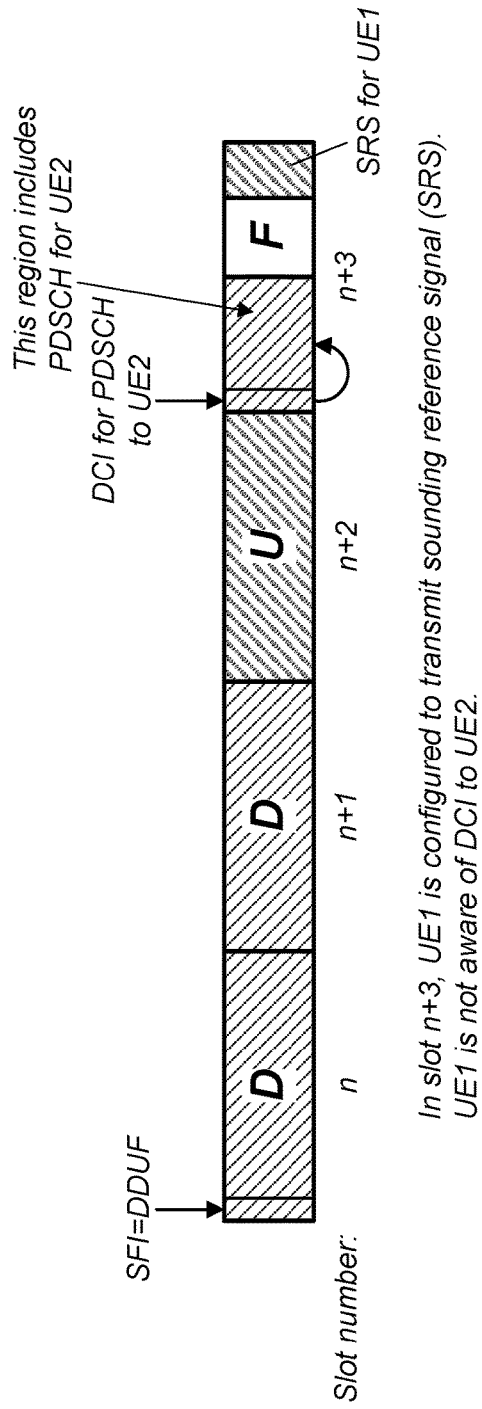
FIGS. 51A and 51B illustrate an embodiment where DCI overrides the transmission direction indicated by SFI in slot n+3 while protecting a configured periodic signal, according to some embodiments.
Figure 51B:
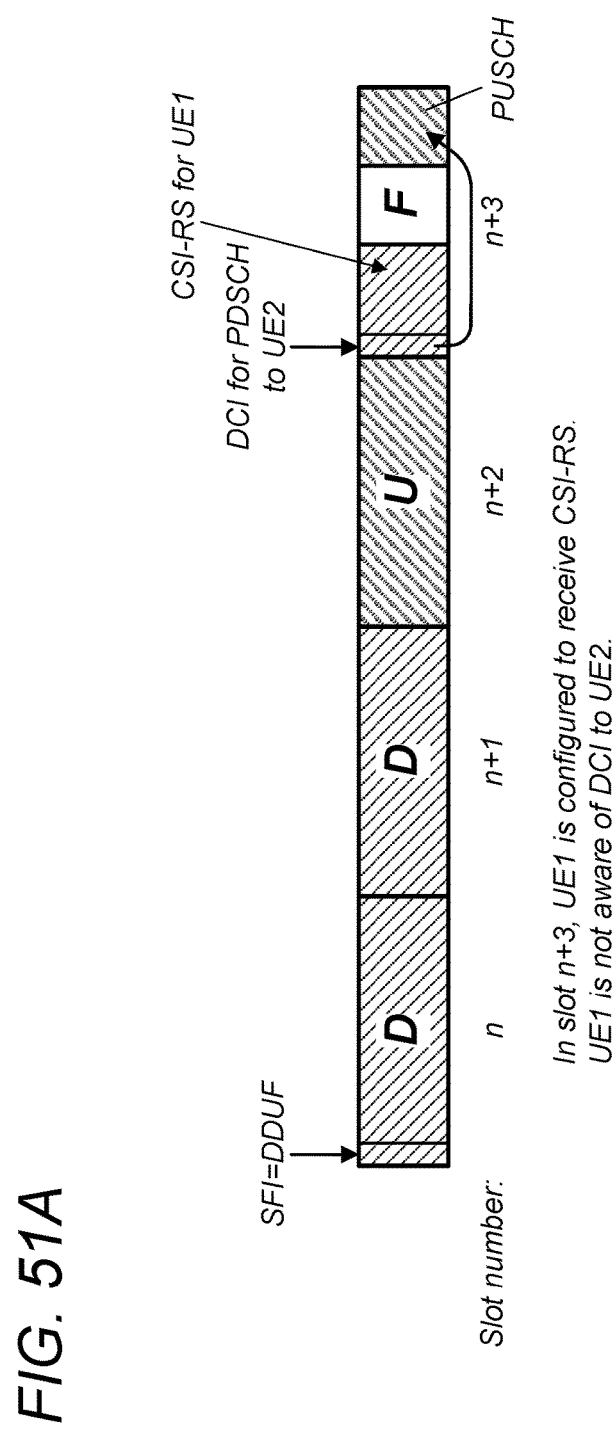

FIGS. 51A and 51B illustrate an embodiment where DCI overrides the transmission direction indicated by SFI in slot n+3 while protecting a configured periodic signal.

In some embodiments, for dynamic UL/DL assignment, DCI may be configured to override to either DL or UL the resource(s) indicated as flexible by SFI.

In some embodiments, NR should also support a mechanism for changing the transmission direction of a resource that is configured for periodic signal transmission/reception. This could be achieved again with SFI. If UE finds that (a) a transmission direction (one of DL or UL) indicated by the SFI for resources where a periodic signal is configured is different from (b) a transmission direction of the periodic signal, then the UE should stop receiving/sending the periodic signal.

In some embodiment, for dynamic UL/DL assignment: if SFI indicates a change in the transmission direction of resources that were configured for a periodic signal, the periodic signal is canceled. That is, the UEs that are supposed to transmit/receive the periodic signal in the resources should cancel transmission/reception of the periodic signal in the resources.

The next question is whether to allow the DCI to change the transmission direction of resources that were indicated as DL or UL by SFI. In this case, changing transmission direction may be avoided since this means that UEs cannot identify the transmission direction from the SFI alone. That is, a non-scheduled UE cannot assume that the transmission direction is the same as indicated by SFI since there is a possibility that it is changed by the DCI. This is problematic, especially when periodic signals are configured.

In some embodiments, for dynamic UL/DL assignment, DCI cannot change the transmission direction of resources that were indicated as DL or UL by SFI.

Hybrid Assignment

In some embodiments, the network may support hybrid assignment. Hybrid assignment may involve semi-static assignment and an overriding mechanism using SFI or DCI. Thus, there may be three different pieces of information, each indicating a transmission direction. In some embodiments, SFI and DCI should be aligned in transmission direction regardless of the relative timing with which the UE has received them. Thus, in at least some embodiments, if DCI and SFI are valid information in slot N, then, the transmission direction indicated by the DCI should match the transmission direction indicated by the SFI. This matching condition may be desired since SFI is mainly for non-scheduled UEs, and the network should provide correct information to non-scheduled UEs.

In some embodiments, for hybrid UL/DL assignment, the network may allow overriding the RRC configured transmission direction by SFI and/or DCI. In this case, SFI and DCI should indicate the same transmission direction.

Figure 52:
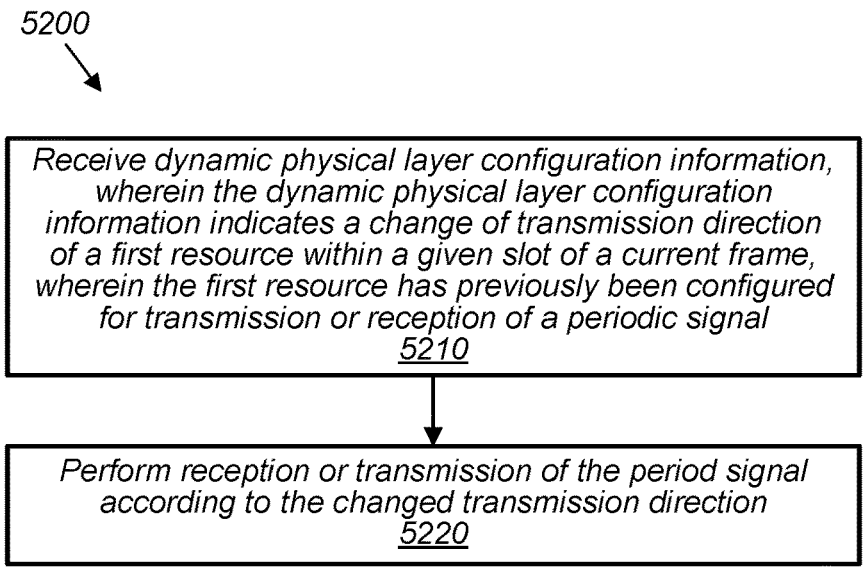

In one set of embodiments, a method 5200 for operating a user equipment device may include the operations shown in FIG. 52. (The method 5200 may also include any subset of the features, elements and embodiments described above and described below in connection with FIGS. 53-60.)

At 5210, a radio of the user equipment device may receive dynamic physical layer configuration information, wherein the dynamic physical layer configuration information indicates a change of transmission direction of a first resource within a given slot of a current frame, wherein the first resource has previously been configured for transmission or reception of a periodic signal.

At 5220, the radio may perform reception or transmission of the periodic signal according to the changed transmission direction.

In some embodiments, the periodic signal is a channel state information reference signal (CSI-RS), a sounding reference signal (SRS), or a CSI report.

In some embodiments, the CSI-RS is a zero power CSI-RS (ZP CSI-RS) or a non-zero power CSI-RS (NZP CSI-RS).

In some embodiments, the dynamic physical layer configuration information is a slot format indicator included in a group common PDCCH of the given slot or a previous slot of the current frame.

In some embodiments, the dynamic physical layer configuration information is downlink control information (DCI).

Figure 53:
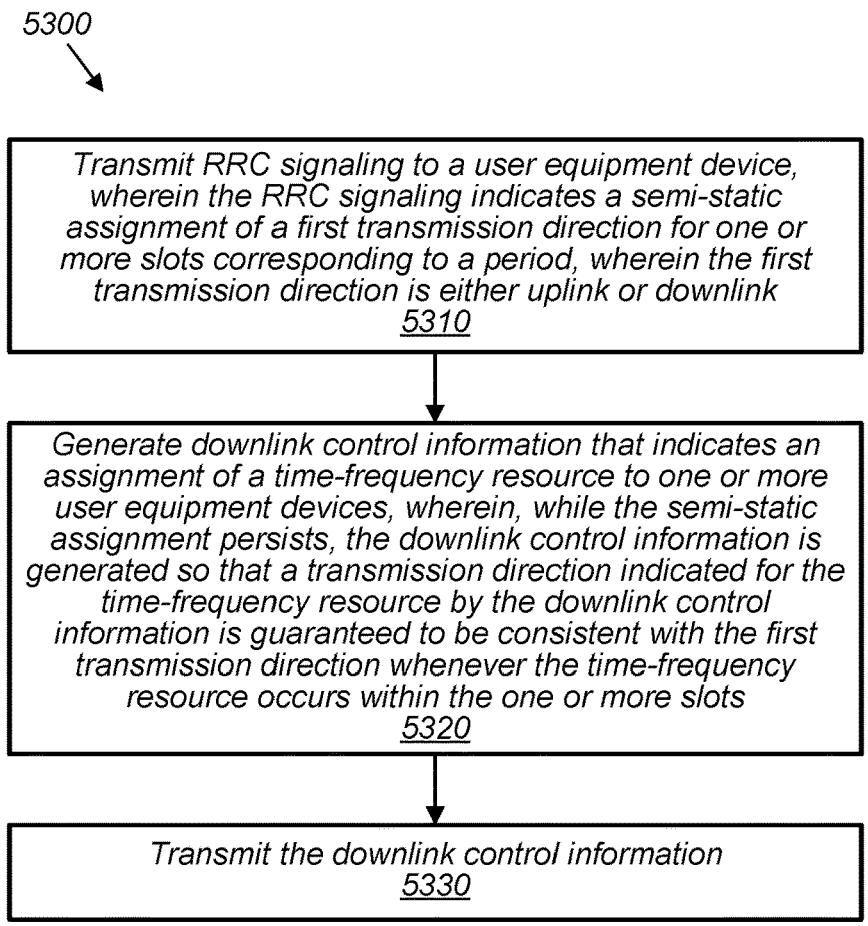

In one set of embodiments, a method 5300 for operating a base station may include the operations shown in FIG. 53. (The method 5300 may also include any subset of the features, elements and embodiments described above and described below in connection with FIGS. 54-60.)

At 5310, a transmitter of the base station may transmit RRC signaling to a user equipment device, wherein the RRC signaling indicates a semi-static assignment of a first transmission direction for one or more slots corresponding to a period, wherein the first transmission direction is either uplink or downlink.

At 5320, the transmitter (or a processor coupled to the transmitter) may generate downlink control information that indicates an assignment of a time-frequency resource to one or more user equipment devices, wherein, while the semi-static assignment persists, the downlink control information is generated so that a transmission direction indicated for the time-frequency resource by the downlink control information is guaranteed to be consistent with the first transmission direction whenever the time-frequency resource occurs within the one or more slots.

At 5330, the transmitter may transmit the downlink control information.

Figure 54:
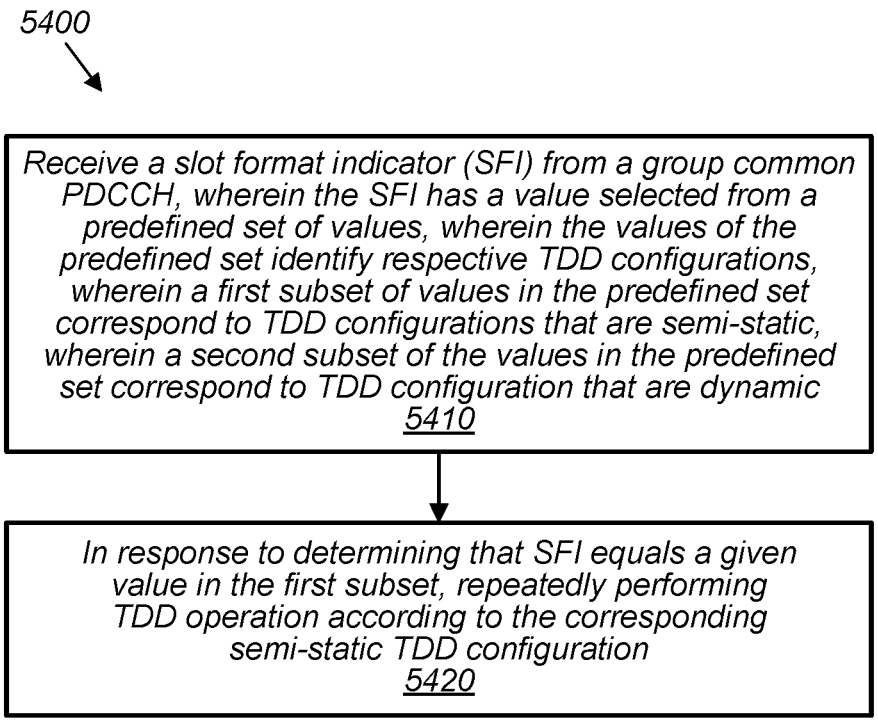

In one set of embodiments, a method 5400 for operating a user equipment device may include the operations shown in FIG. 54. (The method 5400 may also include any subset of the features, elements and embodiments described above and described below in connection with FIGS. 55-60.)

At 5410, a radio of the user equipment device may receive a slot format indicator (SFI) from a group common PDCCH, wherein the SFI has a value selected from a predefined set of values, wherein the values of the predefined set identify respective TDD configurations, wherein a first subset of values in the predefined set correspond to TDD configurations that are semi-static, wherein a second subset of the values in the predefined set correspond to TDD configuration that are dynamic.

At 5420, in response to determining that SFI equals a given value in the first subset, the radio may repeatedly perform TDD operation according to the corresponding semi-static TDD configuration.

Figure 55:
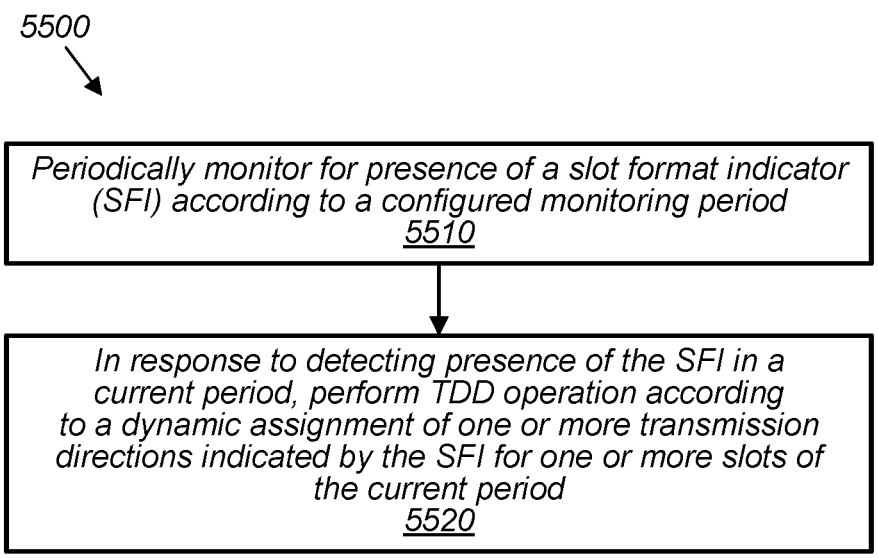

In one set of embodiments, a method 5500 for operating a user equipment device may include the operations shown in FIG. 55. (The method 5500 may also include any subset of the features, elements and embodiments described above and described below in connection with FIGS. 56-60.)

At 5510, a radio of the user equipment device may periodically monitor for presence of a slot format indicator (SFI) according to a configured monitoring period.

At 5520, in response to detecting presence of the SFI in a current period, the radio may perform TDD operation according to a dynamic assignment of one or more transmission directions indicated by the SFI for one or more slots of the current period.

In some embodiments, the method 5500 may also include: in response to (a) a failure to detect the SFI in a second period and (b) a determination that downlink control information (DCI) targeting a given slot has not been sent by a serving base station, performing transmission or reception, by the radio, in the given slot based on a transmission direction indicated by a previously received SFI.

In some embodiments, the method 5500 may also include: in response to (a) a failure to detect the SFI in a second period and (b) a determination that downlink control information (DCI) targeting a given slot has not been sent by a serving base station, disabling transmission and reception by the radio during the given slot.

In one set of embodiments, a method 5600 for operating a base station may include the operations shown in FIG. 56. (The method 5600 may also include any subset of the features, elements and embodiments described above and described below in connection with FIGS. 57-60.)

At 5610, a radio of the base station may periodically transmit a slot format indicator according to a transmission period, wherein each transmission of the slot format indicator indicates a corresponding dynamic assignment of one or more transmission directions for one or more slots in a corresponding frame with length equal to the transmission period.

At 5620, for a current frame corresponding to a current transmission of the slot format indicator, the radio may perform TDD operation for the one or more slots of the current frame based on the dynamic assignment indicated by the current transmission of the slot format indicator.

In some embodiments, the transmission period is selected from a set of periods including at least 1 ms, 5 ms and 10 ms.

In some embodiments, the method 5600 may also include: for a next frame corresponding to a next transmission of the slot format indicator, performing TDD operation for the one or more slots of the next frame based on the dynamic assignment indicated by the next transmission of the slot format indicator, wherein the dynamic assignment indicated by the next transmission of the slot format indicator is different from the dynamic assignment indicated by the current transmission of the slot format indicator.

In one set of embodiments, a method 5700 for operating a user equipment device may include the operations shown in FIG. 57. (The method 5700 may also include any subset of the features, elements and embodiments described above and described below in connection with FIGS. 58-60.)

At 5710, a radio of the user equipment device may receive downlink control information that assigns a time-frequency resource set to the user equipment device and indicates a transmission direction for the time-frequency resource set, wherein the indicated transmission direction overrides flexible status indicated for the time-frequency resource set by a previously received slot format indicator.

At 5720, the radio may perform transmission or reception in the time-frequency resource set according to the indicated transmission direction.

In some embodiments, the time-frequency resource set is a PDSCH for the user equipment device, wherein the indicated transmission direction is downlink.

In some embodiments, the time-frequency resource set is a PUSCH for the user equipment device, wherein the indicated transmission direction is uplink.

Figure 58:
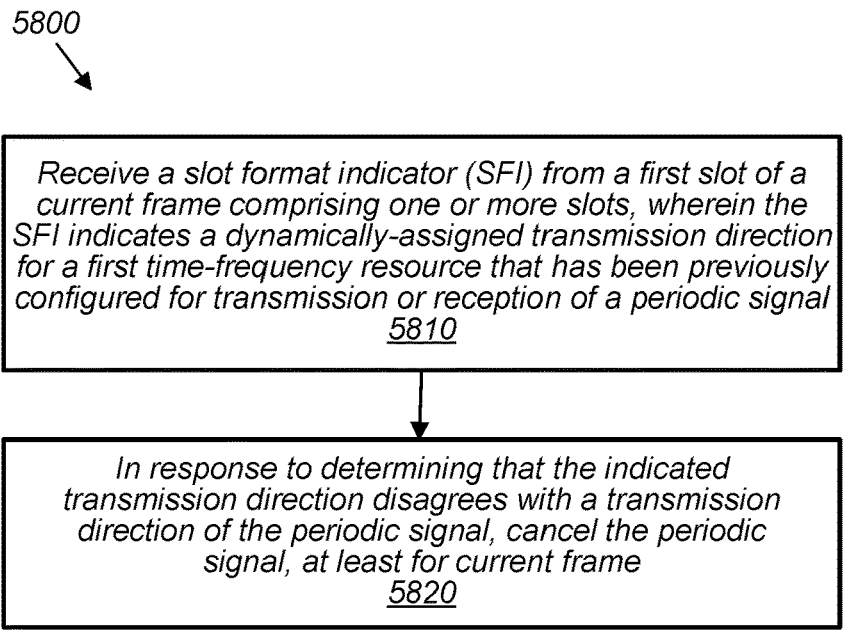

In one set of embodiments, a method 5800 for operating a user equipment device may include the operations shown in FIG. 58. (The method 5800 may also include any subset of the features, elements and embodiments described above and described below in connection with FIGS. 59-60.)

At 5810, a radio of the user equipment device may receive a slot format indicator (SFI) from a first slot of a current frame including one or more slots, wherein the SFI indicates a dynamically-assigned transmission direction for a first time-frequency resource that has been previously configured for transmission or reception of a periodic signal.

At 5820, in response to determining that the indicated transmission direction disagrees with a transmission direction of the periodic signal, the radio may cancel the periodic signal, at least for current frame.

In some embodiments, the periodic signal is a channel state information reference signal (CSI-RS), wherein said canceling the periodic signal includes not receiving the CSI-RS.

In some embodiments, the CSI-RS is a zero power CSI-RS (ZP CSI-RS) or a non-zero power CSI-RS (NZP CSI-RS).

In some embodiments, the periodic signal is a sounding reference signal (SRS) or a CSI report, wherein said canceling the periodic signal includes not transmitting the sounding reference signal or the CSI report.

Figure 59:
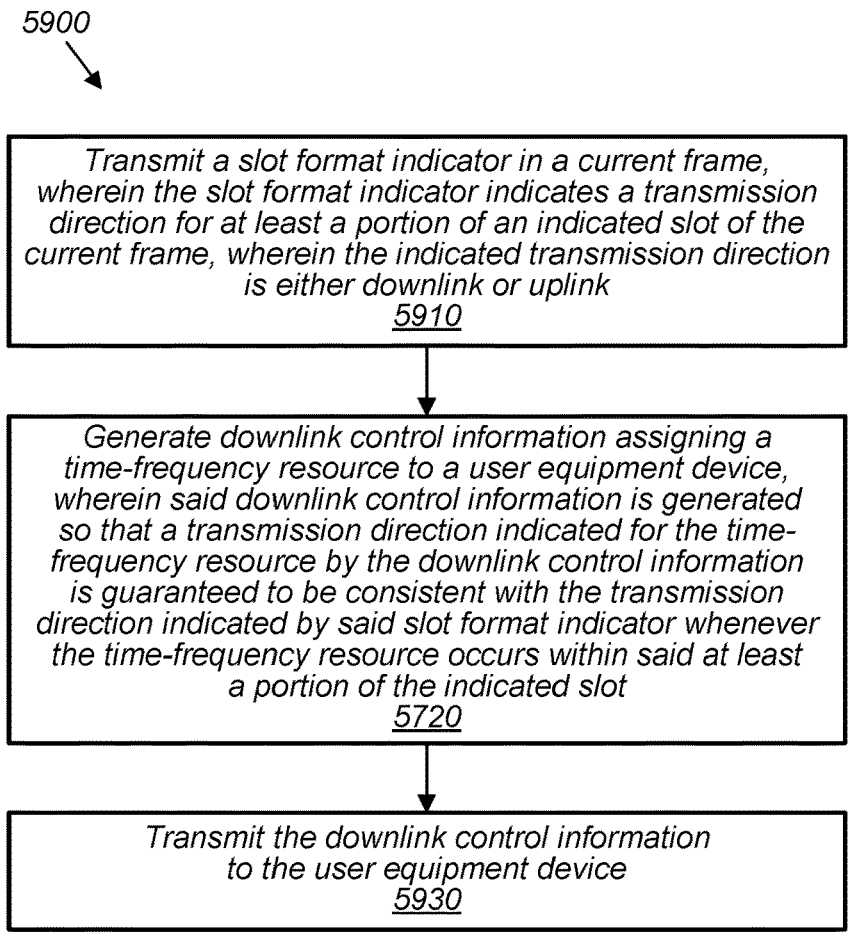
Figure 60:
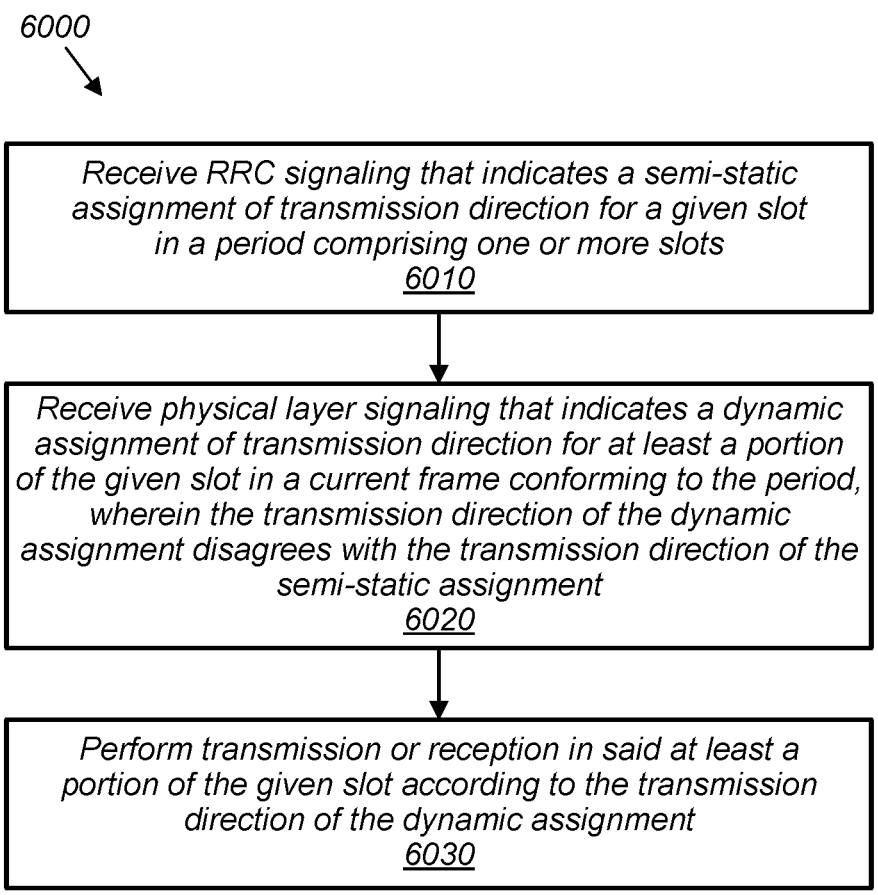

In one set of embodiments, a method 5900 for operating a base station may include the operations shown in FIG. 59. (The method 5900 may also include any subset of the features, elements and embodiments described above and described below in connection with FIG. 60.)

At 5910, a transmitter of the base station may transmit a slot format indicator in a current frame, wherein the slot format indicator indicates a transmission direction for at least a portion of an indicated slot of the current frame, wherein the indicated transmission direction is either downlink or uplink.

At 5920, the transmitter (or a processor coupled to the transmitter) may generate downlink control information assigning a time-frequency resource to a user equipment device, wherein said downlink control information is generated so that a transmission direction indicated for the time-frequency resource by the downlink control information is guaranteed to be consistent with the transmission direction indicated by said slot format indicator whenever the time-frequency resource occurs within said at least a portion of the indicated slot.

At 5930, the transmitter may transmit the downlink control information to the user equipment device.

In some embodiments, the slot format indicator is included in a group common PDCCH of a first slot of the current frame.

In some embodiments, the slot format indicator also indicates a flexible status for another portion of the current frame, wherein the other portion is disjoint from said at least a portion of the indicated slot, the method further including: generating additional downlink control information assigning a time-frequency resource within the other portion of the current frame to the user equipment device or another user equipment device, wherein said additional downlink control information is generated so that a transmission direction indicated by the downlink control information for the other time-frequency resource (a) is either downlink or uplink, and (b) overrides the flexible status for said other time-frequency resource; and transmitting the additional downlink control information.

In some embodiments, the method may also include transmitting another slot format indicator in a next frame, wherein the other slot format indicator indicates a flexible status for a portion of a next frame, the method further including: generating additional downlink control information assigning a time-frequency resource in the next frame to the user equipment device or another user equipment device, wherein said additional downlink control information is generated so that a transmission direction indicated by the downlink control information for the time-frequency resource in the next frame (b) is either downlink or uplink, and (b) overrides the flexible status for said time frequency resource in the next frame; and transmitting the additional downlink control information.

In one set of embodiments, a method 6000 for operating a user equipment device may include the operations shown in FIG. 6000. (The method 6000 may also include any subset of the features, elements and embodiments described above.)

At 6010, a radio of the user equipment device may receive RRC signaling that indicates a semi-static assignment of transmission direction for a given slot in a period including one or more slots.

At 6020, the radio may receive physical layer signaling that indicates a dynamic assignment of transmission direction for at least a portion of the given slot in a current frame conforming to the period, wherein the transmission direction of the dynamic assignment disagrees with the transmission direction of the semi-static assignment.

At 6030, the radio may perform transmission or reception in said at least a portion of the given slot according to the transmission direction of the dynamic assignment.

In some embodiments, the physical layer signaling includes a slot format indicator and/or downlink control information.

In some embodiments, the physical layer signaling includes downlink control information.

In some embodiments, whenever said physical layer signaling includes both a slot format indicator and downlink control information, the slot format indicator and the downlink control information agree in the transmission direction indicated for said at least a portion of the given slot.

Exemplary Embodiments

In the following further exemplary embodiments are provided.

One set of embodiments may include method for operating a user equipment device, the method including: receiving, by a radio of the user equipment device, TDD configuration information, wherein the TDD configuration information includes parameters that define a semi-static TDD configuration for a frame structure, wherein the parameters include: a frame length specifying a duration of the frame structure; a first length specifying a duration of a downlink portion of the frame structure, wherein the downlink portion occupies an initial position within the frame structure; and a second length specifying a duration of an uplink portion of the frame structure, wherein the uplink portion occupies a terminal position within the frame structure; wherein an intermediate portion of the frame structure occurs after the downlink portion and before the uplink portion, wherein TDD structure of the intermediate portion is not determined by the TDD configuration information.

In some embodiments, the method further includes: in response to receiving the TDD configuration information, performing TDD operation including: receiving, by the radio, downlink data from within the downlink portion of the frame structure; and transmitting, by the radio, uplink data within the uplink portion of the frame structure.

In some embodiments, the method further includes: receiving one or more physical layer signals that dynamically determine the TDD structure of the intermediate portion; and performing TDD operation over the intermediate portion based on the dynamically determined TDD structure.

In some embodiments, the one or more physical layer signals include user-specific downlink control information (DCI) and a slot format indicator (SFI), wherein the slot format indicator is included in a group common PDCCH, wherein, if the transmission direction defined for a given slot of the frame structure by the user-specific DCI is inconsistent with the transmission direction defined for the given slot by the SFI, the radio performs TDD operation based on the user-specific DCI.

In some embodiments, the one or more physical layer signals include downlink control information (DCI), wherein the DCI includes a first parameter that specifies slot distance between resource grant information and corresponding downlink data.

In some embodiments, the one or more physical layer signals include downlink control information (DCI), wherein the DCI includes a second parameter that specifies slot distance between downlink data and an uplink acknowledgement of the downlink data.

In some embodiments, wherein the one or more physical layer signals include downlink control information (DCI), wherein the DCI includes a third parameter that specifies slot distance between resource grant information and corresponding uplink data.

In some embodiments, the one or more physical layer signals include downlink control information (DCI), wherein the DCI includes a fourth parameter that specifies slot distance between uplink data and a downlink acknowledgement of the uplink data.

In some embodiments, the one or more physical layer signals include downlink control information (DCI) located in a slot of the downlink portion of the frame structure.

In some embodiments, the one or more physical layer signals include downlink control information (DCI) located in a slot of the intermediate portion.

In some embodiments, the one or more physical layer signals include a slot format indicator, wherein the slot format indicator is received by the radio from a group common PDDCH of a given slot of the frame structure, wherein the slot format indicator indicates a direction of transmission for at least a portion of the given slot.

In some embodiments, the method further includes: performing TDD operation for each frame in a sequence of frames based on the semi-static TDD configuration, wherein, for each of the frames of the sequence, the TDD structure of the intermediate portion of the frame is determined by corresponding dynamic configuration information provided in one or more slots of the frame.

In some embodiments, the downlink portion includes an initial subportion and a following subportion, wherein the initial subportion is configured for downlink transfer with no possibility of dynamic override to different TDD status; wherein the following subportion is configured for downlink transfer with possibility of dynamic override to different TDD status.

In some embodiments, the method further includes: receiving a physical layer signal indicating override of at least a subset of the following subportion to TDD status other than said downlink transfer.

In some embodiments, the uplink portion includes a first subportion and a final subportion, wherein the first subportion is configured for uplink transfer with possibility of dynamic override to different TDD status, wherein the final subportion is configured for uplink transfer with no possibility of dynamic override to different TDD status.

In some embodiments, the method further includes: receiving a physical layer signal indicating override of at least a subset of the final subportion to TDD status other than uplink transfer.

In some embodiments, the downlink portion is configured for downlink transfer without possibility of dynamic override to TDD status different from downlink transfer, wherein the uplink portion is configured for uplink transfer without possibility of dynamic override to TDD status different from uplink transfer.

In some embodiments, the user equipment device receives the TDD configuration information from a first base station that operates on a first frequency channel, the method further including: applying a time shift to slots of a current radio frame, wherein the time shift depends on an indicator of a TDD configuration being used by a second base station that operates on a second frequency channel that is frequency adjacent to the first frequency channel, wherein, after the time shift, a current semi-static TDD configuration of radio frame conforms to a TDD configuration of 3GPP LTE.

In some embodiments, the first length is specified in terms of a first number of whole slots and a non-negative number x of symbols in a transition slot, wherein said second length is specified in terms of a second number of whole slots and a non-negative number z of symbols in the transition slot, wherein symbols of the transition slot not occurring in either the first x symbols of the transition slot or the last z symbols of the transition slot are gap symbols.

In some embodiments, the first number, the number x, the second number and the number z are configured to achieve agreement with a TDD configuration of 3GPP LTE.

In some embodiments, the intermediate portion includes a gap region, wherein a length of the gap region is received through higher layer signaling.

In some embodiments, the intermediate portion includes a gap region, wherein a length of the gap region is less than 0.0714 ms.

In some embodiments, the frame length corresponds to one slot.

In some embodiments, the frame length indicates a time value from the set given by {10 ms, 5 ms, 2 ms, 1 ms, 0.5 ms, 0.25 ms, 0.125 ms}.

In some embodiments, the TDD configuration information is included in a physical layer signal.

In some embodiments, a plurality of copies of the TDD configuration information are received, to increase the probability of successful decoding of the TDD configuration information.

In some embodiments, the TDD configuration information includes a time at which the radio is to start using the semi-static TDD configuration for TDD operation.

One set of embodiments may include a method for operating a user equipment device, the method including: receiving, by a radio of the user equipment device, a TDD configuration index, wherein the TDD configuration index has a value selected from a predefined set of values, wherein the values of the predefined set identify respective semi-static TDD configurations, wherein a first subset of the values of the predefined set identify semi-static TDD configurations that agree up to time shift with respective TDD configurations of 3GPP LTE.

In some embodiments, the method further includes: when the value of the TDD configuration index is in the first subset, performing TDD operation based on the semi-static TDD configuration that corresponds to the value, wherein said performing the TDD operation includes applying a time shift to slots for a current frame, wherein an amount of the time shift depends on said value.

In some embodiments, the predefined set includes a second subset of values, disjoint from the first subset, wherein, for each value in the second subset, the corresponding semi-static TDD configuration includes: an initial portion including one or more consecutive slots for downlink transfer; a terminal portion including one more consecutive slots for uplink transfer; and an intermediate portion including one or more consecutive slots whose TDD structure is to be dynamically determined by physical layer configuration information.

In some embodiments, the method further includes: in response to determining that the value of the TDD configuration index is in the second subset, performing TDD operation including: receiving, by the radio, downlink data from one or more symbols of the initial portion; and transmitting, by the radio, uplink data within one or more symbols of the terminal portion.

In some embodiments, the physical layer configuration information includes downlink control information.

In some embodiments, the physical layer configuration information includes a slot format indicator occurring in a group common PDDCH.

In some embodiments, the physical layer configuration information includes both downlink control information (DCI) and a slot format indicator (SFI).

In some embodiments, the predefined set includes a third subset, wherein, for each value in the third subset, the corresponding semi-static TDD configuration includes only a single flexible slot whose TDD structure is dynamically determined by physical layer configuration information.

In some embodiments, the predefined set includes a fourth subset, wherein, for each value in the fourth subset, the corresponding semi-static TDD configuration includes in time order: a first portion including one or more consecutive slots, wherein the first portion is assigned for downlink transfer without possibility of dynamic override to TDD status other than downlink transfer; a second portion including one or more consecutive slots, wherein the second portion is assigned for downlink transfer with possibility of dynamic override to TDD status other than downlink transfer.

In some embodiments, for each value in the fourth subset, the corresponding semi-static TDD configuration also includes in time order: a third portion including one or more consecutive slots, wherein the third portion is assigned for uplink transfer with possibility of dynamic override to TDD status other than uplink transfer, wherein the third portion occurs after the second portion in time; a fourth portion including one or more consecutive slots, wherein the fourth portion is assigned for uplink transfer without possibility of dynamic override to TDD status other than uplink transfer.

In some embodiments, the semi-static TDD configurations corresponding to the values of the predetermined set are partitioned into groups corresponding to respective subcarrier spacings.

In some embodiments, the semi-static TDD configuration corresponding to the values of the predetermined set are partitioned into collections corresponding to different periodicities in time.

One set of embodiments includes a method for operating a user equipment device, the method including: receiving, by a radio of the user equipment device, physical layer configuration information from a first of a plurality of slots in a current frame, wherein the physical layer configuration information dynamically determines TDD status for at least a portion of an indicated slot of the current frame, wherein the indicated slot is the first slot or a second slot occurring after the first slot in the current frame.

In some embodiments, the method further includes: performing downlink reception or uplink transmission in said portion of the indicated slot based on the dynamically determined TDD status.

In some embodiments, the physical layer configuration information includes a slot format indicator, wherein the slot format indicator is included in a group common PDCCH of the first slot.

In some embodiments, the method further includes receiving, by the radio, downlink control information assigning a time-frequency resource in said at least a portion of the indicated slot to the user equipment device, wherein a transmission direction indicated by the downlink control information is always consistent with a transmission direction indicated by the TDD status.

In some embodiments, the physical layer configuration information includes downlink control information (DCI).

In some embodiments, the DCI includes a parameter that specifies a non-negative slot distance between the first slot and the indicated slot.

In some embodiments, the parameter indicates that: resource grant information is included in the first slot; and corresponding downlink data is included in the indicated slot.

In some embodiments, the parameter indicates that: downlink data is included in the first slot; and an uplink acknowledgement of the downlink data is included in the indicated slot.

In some embodiments, the parameter indicates that: resource grant information is included in the first slot; and corresponding uplink data is included in the indicated slot.

In some embodiments, the parameter indicates that: uplink data is included in the first slot; and a downlink acknowledgement of the uplink data is included in the indicated slot.

In some embodiments, the TDD status determined by the physical layer configuration information overrides a TDD status determined by previously received semi-static configuration information.

In some embodiments, the indicated slot or a portion thereof has been previously configured as being flexible in its direction of transfer by previously received semi-static configuration information.

In some embodiments, the TDD status is selected from a set of TDD statuses including uplink transfer and downlink transfer.

In some embodiments, the set of TDD statuses also includes: uplink centric transfer; downlink centric transfer; side link transfer; and reserved for future use.

One set of embodiments may include a method for operating a user equipment device, the method including: receiving, by a radio of the user equipment device, dynamic physical layer configuration information, wherein the dynamic physical layer configuration information indicates a change of transmission direction of a first resource within a given slot of a current frame, wherein the first resource has previously been configured for transmission or reception of a periodic signal; and performing, by the radio, reception or transmission of the periodic signal according to the changed transmission direction.

In some embodiments, the periodic signal is a channel state information reference signal (CSI-RS), a sounding reference signal (SRS), or a CSI report.

In some embodiments, the CSI-RS is a zero power CSI-RS (ZP CSI-RS) or a non-zero power CSI-RS (NZP CSI-RS).

In some embodiments, the dynamic physical layer configuration information is a slot format indicator included in a group common PDCCH of the given slot or a previous slot of the current frame.

In some embodiments, the dynamic physical layer configuration information is downlink control information (DCI).

One set of embodiments may include a method for operating a base station, the method including: transmitting, by a transmitter of the base station, RRC signaling to a user equipment device, wherein the RRC signaling indicates a semi-static assignment of a first transmission direction for one or more slots corresponding to a period, wherein the first transmission direction is either uplink or downlink; generating downlink control information that indicates an assignment of a time-frequency resource to one or more user equipment devices, wherein, while the semi-static assignment persists, the downlink control information is generated so that a transmission direction indicated for the time-frequency resource by the downlink control information is guaranteed to be consistent with the first transmission direction whenever the time-frequency resource occurs within the one or more slots; and transmitting, by the transmitter, the downlink control information.

One set of embodiments may include a method for operating a user equipment device, the method including: receiving, by a radio of the user equipment device, a slot format indicator (SFI) from a group common PDCCH, wherein the SFI has a value selected from a predefined set of values, wherein the values of the predefined set identify respective TDD configurations, wherein a first subset of values in the predefined set correspond to TDD configurations that are semi-static, wherein a second subset of the values in the predefined set correspond to TDD configuration that are dynamic; in response to determining that SFI equals a given value in the first subset, repeatedly performing TDD operation, by the radio, according to the corresponding semi-static TDD configuration.

One set of embodiments may include a method for operating a user equipment device, the method including: periodically monitoring, by a radio of the user equipment device, for presence of a slot format indicator (SFI) according to a configured monitoring period; in response to detecting presence of the SFI in a current period, performing TDD operation, by the radio, according to a dynamic assignment of one or more transmission directions indicated by the SFI for one or more slots of the current period.

In some embodiments, the method may further include in response to (a) a failure to detect the SFI in a second period and (b) a determination that downlink control information (DCI) targeting a given slot has not been sent by a serving base station, performing transmission or reception, by the radio, in the given slot based on a transmission direction indicated by a previously received SFI.

In some embodiments, the method may further include: in response to (a) a failure to detect the SFI in a second period and (b) a determination that downlink control information (DCI) targeting a given slot has not been sent by a serving base station, disabling transmission and reception by the radio during the given slot.

One set of embodiments includes a method for operating a base station, the method including: periodically transmitting, by a radio of the base station, a slot format indicator according to a transmission period, wherein each transmission of the slot format indicator indicates a corresponding dynamic assignment of one or more transmission directions for one or more slots in a corresponding frame with length equal to the transmission period; and for a current frame corresponding to a current transmission of the slot format indicator, performing, by the radio, TDD operation for the one or more slots of the current frame based on the dynamic assignment indicated by the current transmission of the slot format indicator.

In some embodiments, the transmission period is selected from a set of periods including at least 1 ms, 5 ms and 10 ms.

In some embodiments, the method further includes: for a next frame corresponding to a next transmission of the slot format indicator, performing TDD operation for the one or more slots of the next frame based on the dynamic assignment indicated by the next transmission of the slot format indicator, wherein the dynamic assignment indicated by the next transmission of the slot format indicator is different from the dynamic assignment indicated by the current transmission of the slot format indicator.

One set of embodiments includes a method for operating a user equipment device, the method including: receiving, by a radio of the user equipment device, downlink control information that assigns a time-frequency resource set to the user equipment device and indicates a transmission direction for the time-frequency resource set, wherein the indicated transmission direction overrides flexible status indicated for the time-frequency resource set by a previously received slot format indicator; and performing transmission or reception in the time-frequency resource set, by the radio, according to the indicated transmission direction.

In some embodiments, the time-frequency resource set is a PDSCH for the user equipment device, wherein the indicated transmission direction is downlink.

In some embodiments, the time-frequency resource set is a PUSCH for the user equipment device, wherein the indicated transmission direction is uplink.

One set of embodiments includes a method for operating a user equipment device, the method including: receiving, by a radio of the user equipment device, a slot format indicator (SFI) from a first slot of a current frame including one or more slots, wherein the SFI indicates a dynamically-assigned transmission direction for a first time-frequency resource that has been previously configured for transmission or reception of a periodic signal; in response to determining that the indicated transmission direction disagrees with a transmission direction of the periodic signal, canceling the periodic signal, at least for current frame.

In some embodiments, the periodic signal is a channel state information reference signal (CSI-RS), wherein said canceling the periodic signal includes not receiving the CSI-RS.

In some embodiments, the CSI-RS is a zero power CSI-RS (ZP CSI-RS) or a non-zero power CSI-RS (NZP CSI-RS).

In some embodiments, the periodic signal is a sounding reference signal (SRS) or a CSI report, wherein said canceling the periodic signal includes not transmitting the sounding reference signal or the CSI report.

One set of embodiments includes a method for operating a base station, the method including: transmitting, by a transmitter of the base station, a slot format indicator in a current frame, wherein the slot format indicator indicates a transmission direction for at least a portion of an indicated slot of the current frame, wherein the indicated transmission direction is either downlink or uplink; generating downlink control information assigning a time-frequency resource to a user equipment device, wherein said downlink control information is generated so that a transmission direction indicated for the time-frequency resource by the downlink control information is guaranteed to be consistent with the transmission direction indicated by said slot format indicator whenever the time-frequency resource occurs within said at least a portion of the indicated slot; and transmitting, by the transmitter, the downlink control information to the user equipment device.

In some embodiments, the slot format indicator is included in a group common PDCCH of a first slot of the current frame.

In some embodiments, the slot format indicator also indicates a flexible status for another portion of the current frame, wherein the other portion is disjoint from said at least a portion of the indicated slot, the method further including: generating additional downlink control information assigning a time-frequency resource within the other portion of the current frame to the user equipment device or another user equipment device, wherein said additional downlink control information is generated so that a transmission direction indicated by the downlink control information for the other time-frequency resource (a) is either downlink or uplink, and (b) overrides the flexible status for said other time-frequency resource; and transmitting the additional downlink control information.

In some embodiments, the method further includes: transmitting another slot format indicator in a next frame, wherein the other slot format indicator indicates a flexible status for a portion of a next frame, the method further including: generating additional downlink control information assigning a time-frequency resource in the next frame to the user equipment device or another user equipment device, wherein said additional downlink control information is generated so that a transmission direction indicated by the downlink control information for the time-frequency resource in the next frame (b) is either downlink or uplink, and (b) overrides the flexible status for said time frequency resource in the next frame; and transmitting the additional downlink control information.

One set of embodiments includes a method for operating a user equipment device, the method including: receiving, by a radio of the user equipment device, RRC signaling that indicates a semi-static assignment of transmission direction for a given slot in a period including one or more slots; receiving, by the radio, physical layer signaling that indicates a dynamic assignment of transmission direction for at least a portion of the given slot in a current frame conforming to the period, wherein the transmission direction of the dynamic assignment disagrees with the transmission direction of the semi-static assignment; performing transmission or reception in said at least a portion of the given slot, by the radio, according to the transmission direction of the dynamic assignment.

In some embodiments, the physical layer signaling includes a slot format indicator and/or downlink control information.

In some embodiments, the physical layer signaling includes downlink control information.

In some embodiments, whenever said physical layer signaling includes both a slot format indicator and downlink control information, the slot format indicator and the downlink control information agree in the transmission direction indicated for said at least a portion of the given slot.

One set of embodiments includes a base station, including: an antenna; a radio operably coupled to the antenna; and a processing element operably coupled to the radio; wherein the antenna, radio, and processing element are configured to implement a method according to any of the preceding claims.

One set of embodiments includes an apparatus, including a processing element configured to implement a method according to any of the preceding claims.

One set of embodiments includes a computer program including instructions for performing any of the methods of any of the preceding method claims.

One set of embodiments includes an apparatus including means for performing any of the method elements of any of the preceding claims.

One set of embodiments includes a method that includes any action or combination of actions as substantially described herein in the Detailed Description.

One set of embodiments includes a method as substantially described herein with reference to each or any combination of the Figures included herein or with reference to each or any combination of paragraphs in the Detailed Description.

One set of embodiments includes a wireless device configured to perform any action or combination of actions as substantially described herein in the Detailed Description.

One set of embodiments includes a wireless device that includes any component or combination of components as described herein in the Detailed Description as included in a wireless device.

One set of embodiments includes a wireless device configured to perform any action or combination of actions as substantially described herein in the Detailed description.

One set of embodiments includes a wireless device that includes any component or combination of components as described herein in the Detailed Description as included in a wireless device.

One set of embodiments includes a non-volatile computer-readable medium that stores instructions that, when executed, cause the performance of any action or combination of actions as substantially described herein in the Detailed Description.

One set of embodiments includes an integrated circuit configured to perform any action or combination of actions as substantially described herein in the Detailed Description.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus configured for implementation in a user equipment device, the apparatus comprising:
one or more processing elements, wherein the one or more processing elements are configured to:
receive TDD configuration information, wherein the TDD configuration information includes parameters that define a semi-static TDD configuration for a frame structure, wherein the parameters include:
a frame length specifying a duration of the frame structure;
a first length specifying a duration of a downlink portion of the frame structure, wherein the downlink portion occupies an initial position within the frame structure, wherein said first length is specified by the semi-static TDD configuration in terms of slots and symbols,
wherein a slot is a specified number of symbols in length; and
a second length specifying a duration of an uplink portion of the frame structure, wherein the uplink portion occupies a terminal position within the frame structure, wherein said second length is specified by the semi-static TDD configuration in terms of slots and symbols;
wherein an intermediate portion of the frame structure occurs after the downlink portion and before the uplink portion, wherein the intermediate portion includes a number of flexible symbols useable for an uplink or downlink direction, wherein a respective direction for each respective symbol of the number of flexible symbols is not determined by the TDD configuration information; and
in response to receiving the TDD configuration information, perform TDD operations including:
receiving downlink data according to the TDD configuration information; and
transmitting uplink data according to the TDD configuration information.

2. The apparatus of claim 1, wherein the one or more processing elements are further configured to:
receive one or more physical layer signals that dynamically determine a TDD structure of the intermediate portion; and
perform TDD operation over the intermediate portion based on the dynamically determined TDD structure.

3. The apparatus of claim 1, wherein the one or more processing elements are further configured to:
perform TDD operation for each frame in a sequence of frames based on the semi-static TDD configuration, wherein, for each of the frames of the sequence, a TDD structure of the intermediate portion of the frame is determined by corresponding dynamic configuration information provided in one or more slots of the frame.

4. The apparatus of claim 1,
wherein the downlink portion includes an initial subportion and a following subportion;
wherein the initial subportion is configured for downlink transfer with no possibility of dynamic override to different TDD status;
wherein the following subportion is configured for downlink transfer with possibility of dynamic override to different TDD status.

5. The apparatus of claim 1, wherein the TDD configuration information is received from a first base station that operates on a first frequency channel, wherein the one or more processing elements are further configured to:
apply a time shift to slots of a current radio frame, wherein the time shift depends on an indicator of a TDD configuration being used by a second base station that operates on a second frequency channel that is frequency adjacent to the first frequency channel, wherein, after the time shift, a current semi-static TDD configuration of radio frame conforms to a TDD configuration of 3GPP LTE.

6. The apparatus of claim 1, wherein said flexible symbols are in a transition slot;
wherein symbols of the transition slot that are neither part of the uplink portion nor the downlink portion are gap symbols.

7. The apparatus of claim 6, wherein the symbols of the downlink portion and the symbols of the uplink portion are configured to achieve agreement with a TDD configuration of 3GPP LTE.

8. The apparatus of claim 1, wherein the TDD configuration information does not conflict with transmission direction indicated by dynamic downlink control information (DCI).

9. The apparatus of claim 1, wherein the TDD configuration information further indicates cancellation of one or more periodic transmissions configured by RRC.

10. The apparatus of claim 1, wherein the one or more processing elements are further configured to:
receive downlink control information (DCI) useable to determine a dynamic TDD structure for at least a portion of a slot, wherein the dynamic TDD structure overrides the semi-static TDD configuration of the intermediate portion without possibility of overriding the uplink and downlink portions of the frame structure specified by the TDD configuration information.

11. A method for operating a user equipment device, the method comprising:
receiving, by a radio of the user equipment device, TDD configuration information, wherein the TDD configuration information includes parameters that define a semi-static TDD configuration for a frame structure, wherein the parameters include:
a frame length specifying a duration of the frame structure;
a first length specifying a duration of a downlink portion of the frame structure, wherein the downlink portion occupies an initial position within the frame structure, wherein said first length is specified by the semi-static TDD configuration in terms of whole slots and symbols, wherein a slot is a specified number of symbols in length; and
a second length specifying a duration of an uplink portion of the frame structure, wherein the uplink portion occupies a terminal position within the frame structure, wherein said second length is specified by the semi-static TDD configuration in terms of whole slots and symbols;
wherein an intermediate portion of the frame structure occurs after the downlink portion and before the uplink portion, wherein the intermediate portion includes a number of flexible symbols useable for an uplink or downlink direction, wherein a respective direction for each respective symbol of the number of flexible symbols is not determined by the TDD configuration information; and in response to receiving the TDD configuration information, perform TDD operations including:
receiving, by the radio, downlink data according to the TDD configuration information; and
transmitting, by the radio, uplink data according to the TDD configuration information.

12. The method of claim 11, further comprising:
receiving one or more physical layer signals that dynamically determine a TDD structure of the intermediate portion; and
performing TDD operation over the intermediate portion based on the dynamically determined TDD structure.

13. The method of claim 11, the method further comprising:
performing TDD operation for each frame in a sequence of frames based on the semi-static TDD configuration, wherein, for each of the frames of the sequence, a TDD structure of the intermediate portion of the frame is determined by corresponding dynamic configuration information provided in one or more slots of the frame.

14. The method of claim 11,
wherein the downlink portion includes an initial subportion and a following subportion;
wherein the initial subportion is configured for downlink transfer with no possibility of dynamic override to different TDD status;
wherein the following subportion is configured for downlink transfer with possibility of dynamic override to different TDD status.

15. A user equipment device (UE), comprising:
a radio;
one or more processing elements coupled to the radio, wherein the one or more processing elements are configured to:
receive, by the radio of the user equipment device, TDD configuration information, wherein the TDD configuration information includes parameters that define a semi-static TDD configuration for a frame structure, wherein the parameters include:
a frame length specifying a duration of the frame structure;
a first length specifying a duration of a downlink portion of the frame structure, wherein the downlink portion occupies an initial position within the frame structure, wherein said first length is specified by the semi-static TDD configuration in terms of slots and symbols,
wherein a slot is a specified number of symbols in length; and
a second length specifying a duration of an uplink portion of the frame structure, wherein the uplink portion occupies a terminal position within the frame structure, wherein said second length is specified by the semi-static TDD configuration in terms of slots and symbols;
wherein an intermediate portion of the frame structure occurs after the downlink portion and before the uplink portion, wherein the intermediate portion includes a number of flexible symbols useable for an uplink or downlink direction, wherein a respective direction for each respective symbol of the number of flexible symbols is not determined by the TDD configuration information; and
in response to receiving the TDD configuration information, perform TDD operations including:
receiving, by the radio, downlink data according to the TDD configuration information; and
transmitting, by the radio, uplink data according to the TDD configuration information.

16. The UE of claim 15, wherein the user equipment device receives the TDD configuration information from a first base station that operates on a first frequency channel, wherein the one or more processing elements are further configured to:
apply a time shift to slots of a current radio frame, wherein the time shift depends on an indicator of a TDD configuration being used by a second base station that operates on a second frequency channel that is frequency adjacent to the first frequency channel, wherein, after the time shift, a current semi-static TDD configuration of radio frame conforms to a TDD configuration of 3GPP LTE.

17. The UE of claim 15, wherein said flexible symbols are in a transition slot;
wherein symbols of the transition slot that are neither part of the uplink portion nor the downlink portion are gap symbols;
wherein the symbols of the downlink portion and the symbols of the uplink portion are configured to achieve agreement with a TDD configuration of 3GPP LTE.

18. The UE of claim 15, wherein the TDD configuration information does not conflict with transmission direction indicated by dynamic downlink control information (DCI).

19. The UE of claim 15, wherein the TDD configuration information further indicates cancellation of one or more periodic RRC transmissions.

20. The UE of claim 15, wherein the one or more processing elements are further configured to:
receive downlink control information (DCI) useable to determine a dynamic TDD structure for at least a portion of a slot, wherein the dynamic TDD structure overrides the semi-static TDD configuration of the intermediate portion without possibility of overriding the uplink and downlink portions of the frame structure specified by the TDD configuration information.

* * * * *